United States Patent [19]

Ono et al.

[11] Patent Number: 5,389,480

[45] Date of Patent: Feb. 14, 1995

[54] ELECTROPHOTOGRAPHIC PHOTORECEPTOR

[75] Inventors: Hitoshi Ono, Yokohama; Atsuo Saita, Machida, both of Japan

[73] Assignee: Mitsubishi Kasei Corporation, Tokyo, Japan

[21] Appl. No.: 154,445

[22] Filed: Nov. 19, 1993

Related U.S. Application Data

[63] Continuation-in-part of Ser. No. 953,848, Sep. 30, 1992, abandoned.

[30] Foreign Application Priority Data

| Oct. 2, 1991 | [JP] | Japan | 3-255341 |
| Oct. 8, 1991 | [JP] | Japan | 3-260865 |
| Oct. 22, 1991 | [JP] | Japan | 3-274277 |

[51] Int. Cl.[6] ............................. G03G 5/06
[52] U.S. Cl. ........................ 430/59; 430/56; 430/73; 430/76; 430/77
[58] Field of Search .......... 430/56, 59, 73, 76, 430/77

[56] References Cited

U.S. PATENT DOCUMENTS

| 4,278,747 | 7/1981 | Murayama et al. | 430/82 |
| 4,367,273 | 1/1983 | Murayama et al. | 430/56 |
| 4,485,160 | 11/1984 | Suzuki et al. | 430/59 |
| 4,987,045 | 1/1991 | Suzuki et al. | 430/59 |
| 5,079,119 | 1/1992 | Suzuki et al. | 430/59 |
| 5,080,991 | 1/1992 | Ono et al. | 430/73 |
| 5,089,366 | 2/1992 | Haino et al. | 430/59 |
| 5,166,438 | 11/1992 | Hashimoto et al. | 430/59 |
| 5,168,025 | 1/1992 | Ono et al. | 430/59 |

FOREIGN PATENT DOCUMENTS

| 232854 | 8/1987 | European Pat. Off. |
| 337307 | 10/1989 | European Pat. Off. |

*Primary Examiner*—Christopher D. Rodee
*Attorney, Agent, or Firm*—Oblon, Spivak, McClelland, Maier, & Neustadt

[57] ABSTRACT

An electrophotographic photoreceptor comprising an electrically conductive substrate and a photosensitive layer formed thereon, wherein the photosensitive layer contains at least one member selected from the group consisting of compounds of the formula (I), (II), and (III) as defined in the specification.

(I)

(II)

(Abstract continued on next page.)

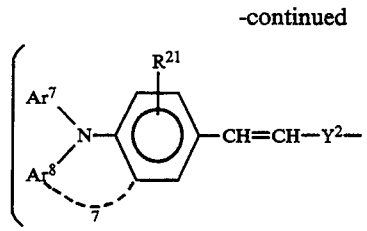 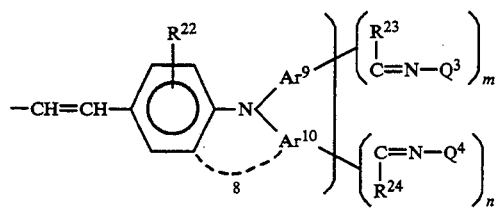
10 Claims, 5 Drawing Sheets

ELECTROPHOTOGRAPHIC PHOTORECEPTOR

This application is a continuation in part of U.S. patent application Ser. No. 07/953,848, filed Sep. 30, 1992, now abandoned and incorporated entirely herein by reference.

The present invention relates to an electrophotographic photoreceptor. More particularly, it relates to a highly sensitive electrophotographic photoreceptor having a photosensitive layer containing an organic photoconductive material.

Heretofore, inorganic photoconductive substances such as selenium, cadmium sulfide and zinc oxide have been widely used for photosensitive layers of electrophotographic photoreceptors. However, selenium and cadmium sulfide are required to be recovered as poisonous substances, and selenium tends to be crystallized by heat and thus is poor in the heat resistance. Cadmium sulfide and zinc oxide are poor in moisture resistance, and zinc oxide lacks in printing resistance. Therefore, efforts have been made for the development of a new photoreceptor. Recently, a research for the use of organic photoconductive materials for photosensitive layers of electrophotographic photoreceptors has found some progress, and some of them have been practically employed. As compared with inorganic materials, the organic photoconductive materials have advantages such that they are light in weight, they can easily be formed into films, preparation of photoreceptors is thereby easy, and transparent photoreceptors can be produced depending upon their types.

Recently, so-called function-separated photoreceptors wherein functions to generate electric charge carriers and to transport the generated carriers are performed by separate compounds, have been the main objects for development, since such function-separated photoreceptors are effective for high sensitivity, and organic photoreceptors of this type have been practically developed.

As a medium for transporting electric charge carriers, it is possible to employ a polymer photoconductive compound such as polyvinyl carbazole. Otherwise, it is possible to employ a low molecular weight photoconductive compound by dispersing and dissolving such a compound in a binder polymer. It is particularly convenient to use an organic low molecular weight photoconductive compound, since it is thereby possible to select as the binder a polymer excellent in the film-forming properties, the flexibility and the adhesive properties, and it is readily possible to obtain a photoreceptor excellent in the mechanical properties (see e.g. Japanese Unexamined Patent Publications No. 196767/1985, No. 218652/1985, No. 233156/1985, No. 48552/1988 and No. 267552/1991). However, it has been difficult to find out a compound suitable for the preparation of a highly sensitive photoreceptor.

The present inventors have conducted extensive researches on low molecular weight photoconductive compounds which are capable of presenting electrophotographic photoreceptors having high sensitivity and high durability and as a result, have found that certain compounds are suitable for this purpose. The present invention has been accomplished on the basis of this discovery.

Thus, the present invention provides an electrophotographic photoreceptor comprising an electrically conductive substrate and a photosensitive layer formed thereon, wherein said photosensitive layer contains at least one member selected from the group consisting of compounds of the following formulas (I), (II) and (III):

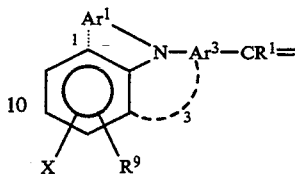

(I)

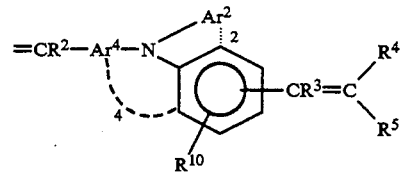

wherein X is a hydrogen atom or a group of $-CR^6=C(R^7)R^8$; each of $Ar^1$ and $Ar^2$ which may be the same or different, is an alkyl group which may have substituents, an aryl group which may have substituents, or a heterocyclic group which may have substituents; each of $Ar^3$ and $Ar^4$ which may be the same or different, is an arylene group which may have substituents, or a bivalent heterocyclic group which may have substituents; each of $R^1$, $R^2$, $R^3$, $R^4$, $R^5$, $R^6$, $R^7$ and $R^8$ which may be the same or different is a hydrogen atom, an alkyl group which may have substituents, an aryl group which may have substituents, or a heterocyclic group which may have substituents (provided that when either one of $R^4$ and $R^5$, or $R^7$ and $R^8$, is a hydrogen atom or an alkyl group, the other is an aryl group or a heterocyclic group); each of $R^9$ and $R^{10}$ which may be the same or different, is a hydrogen atom, a halogen atom, an alkyl group which may have substituents, an alkoxy group which may have substituents, or a substituted amino group; dotted line 1 indicates that $Ar^1$ may bond as shown by the dotted line to the aromatic group bonded to the nitrogen atom to form a structure of the formula (A-III) or (A-IV), dotted line 2 indicates that $Ar^2$ may bond as shown by the dotted line to the aromatic group bonded to the nitrogen atom to form a structure of the formula (A-V) or (A-VI), dotted line 3 indicates that $Ar^3$ may bond as shown by the dotted line to the aromatic group bonded to the nitrogen atom to form a structure of the formula (A-VII) or (A-VIII), and dotted line 4 indicates that $Ar^4$ may bond as shown by the dotted line to the aromatic group bonded to the nitrogen atom to form a structure of the formula (A-IX) or (A-X):

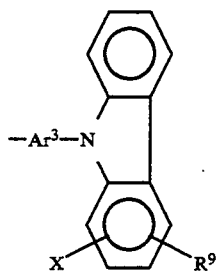

(A-III)

-continued
(A-IV)
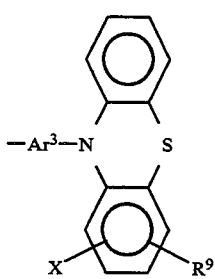
(A-V)
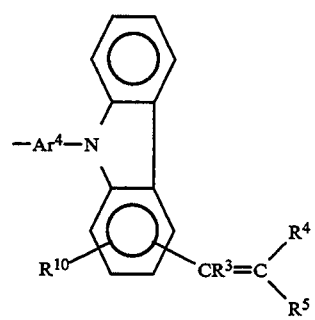
(A-VI)
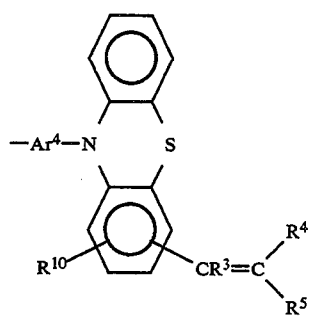
(A-VII)
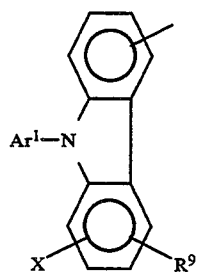
(A-VIII)
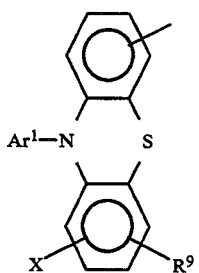
-continued
(A-IX)
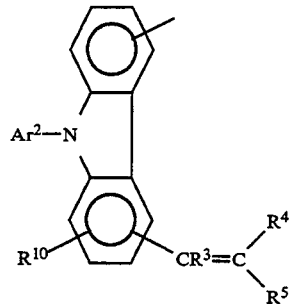
(A-X)
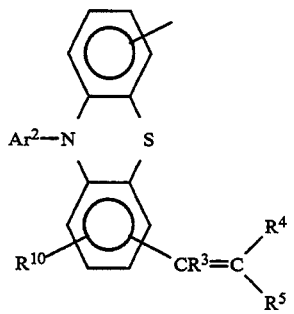
(II)
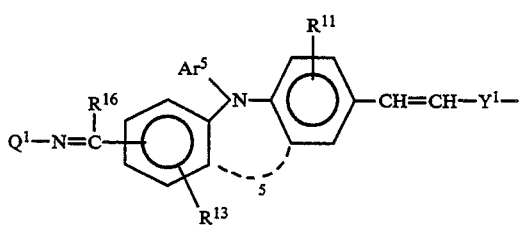
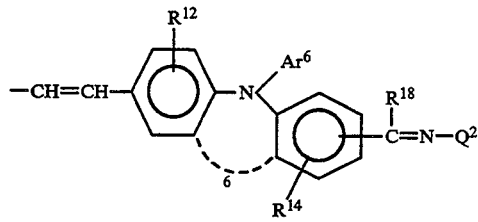
wherein $Q^1$ is any one of the groups of the following formulas (B-III), (B-VI) or (B-VII); $Q^2$ is any one of the groups of the following formulas (B-VI), (B-VII) or (B-VIII):
(B-III)
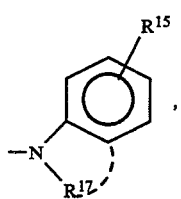
(B-IV)
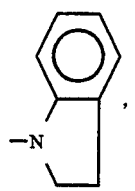

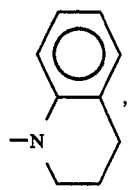 (B-V)

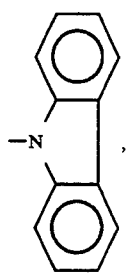 (B-VI)

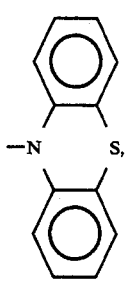 (B-VII)

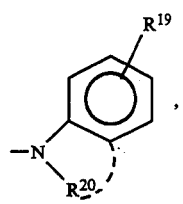 (B-VIII)

(When $R^{17}$ or $R^{20}$ is an alkyl group, $R^{17}$ or $R^{20}$ may be bonded to a benzene ring as indicated by the dotted line, thus making the formula B-IV or B-V.)

$Y^1$ is an aliphatic linking group which may have substituents, and the main chain of the linking group may contain an oxygen atom or a carbon-carbon double bond; each of $Ar^5$ and $Ar^6$ which may be the same or different, is an alkyl group which may have substituents, an aryl group which may have substituents or a heterocyclic group which may have substituents; each of $R^{11}$, $R^{12}$, $R^{13}$, $R^{14}$, $R^{15}$ and $R^{19}$ which may be the same or different, is a hydrogen atom, an alkyl group which may have substituents, a halogen atom, an alkoxy group which may have substituents, or a substituted amino group; each of $R^{16}$ and $R^{18}$ which may be the same or different, is a hydrogen atom, an alkyl group which may have substituents, an aryl group which may have substituents, or a heterocyclic group which may have substituents; each of $R^{17}$ and $R^{20}$ which may be the same or different, is an aryl group which may have substituents, a heterocyclic group which may have substituents, or an alkyl group which may have substituents; dotted line 5 indicates that the two phenyl groups bonded to the same nitrogen atom may bond as shown by the dotted line to form a structure of the following formula (B-IX) or (B-XI), and dotted line 6 indicates that the two phenyl groups bonded to the same nitrogen atom may bond as shown by the dotted line to form a structure of the following formula (B-X) or (B-XII):

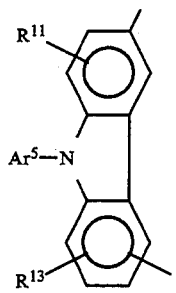 (B-IX)

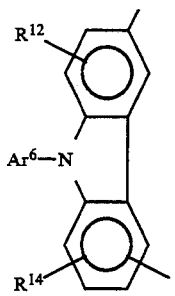 (B-X)

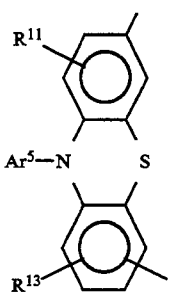 (B-XI)

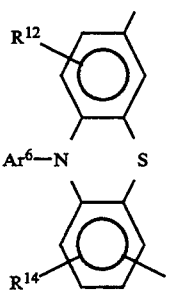 (B-XII)

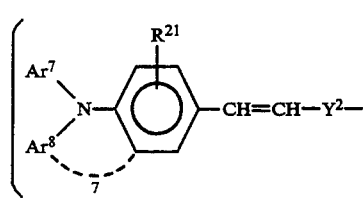 (III)

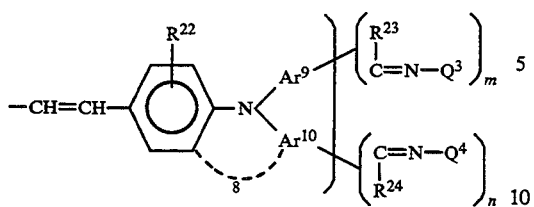

wherein $Q^3$ is any one of the groups of the following formulas (C-II), (C-V) or (C-VI); $Q^4$ is any one of the groups of the following formulas (C-V), (C-VI) or (C-VII):

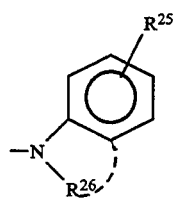 (C-II)

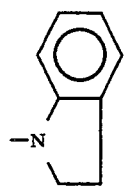 (C-III)

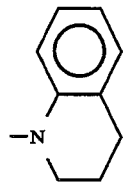 (C-IV)

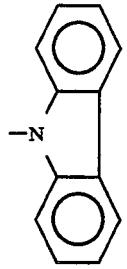 (C-V)

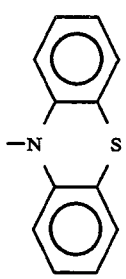 (C-VI)

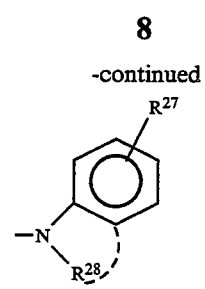 (C-VII)

(When $R^{26}$ or $R^{28}$ is an alkyl group, $R^{26}$ or $R^{28}$ may be bonded to a benzene ring as indicated by the dotted line, thus making the formula C-III or C-IV.)

$Y^2$ is an arylene group which may have substituents, or a bivalent heterocyclic group which may have substituents; each of $Ar^7$, $Ar^9$, $R^{26}$ and $R^{28}$ which may be the same or different, is an alkyl group which may have substituents, an aryl group which may have substituents or a heterocyclic group which may have a substituents; each of $Ar^8$ and $Ar^{10}$ which may be the same or different, is an aryl group which may have substituents, or a heterocyclic group which may have substituents; each of $R^{21}$, $R^{22}$, $R^{25}$ and $R^{27}$ which may be the same or different, is a hydrogen atom, a halogen atom, an alkyl group which may have substituents, an alkoxy group which may have substituents, or a substituted amino group; each of $R^{23}$ and $R^{24}$ which may be the same or different, is a hydrogen atom, an alkyl group which may have substituents, an aryl group which may have substituents, or a heterocyclic group which may have substituents; dotted line 7 indicates that $Ar^8$ may bond to the benzene ring to which $R^{21}$ is bonded, as shown by the dotted line to form a structure of the following formula (C-VIII) or (C-IX), and dotted line 8 indicates that $Ar^{10}$ may bond to the benzene ring to which $R^{22}$ is bonded, as shown by the dotted line to form a structure of the following formula (C-X) or (C-XI):

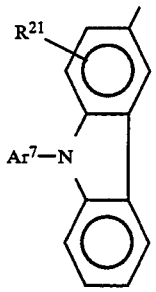 (C-VIII)

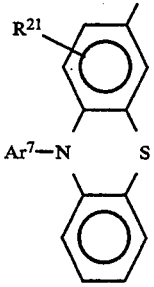 (C-IX)

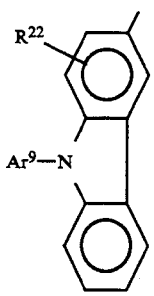
(C-X)

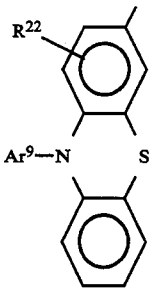
(C-XI)

and each of m and n is an integer of 0 or 1 and $m+n \geq 1$.

Figure 1:
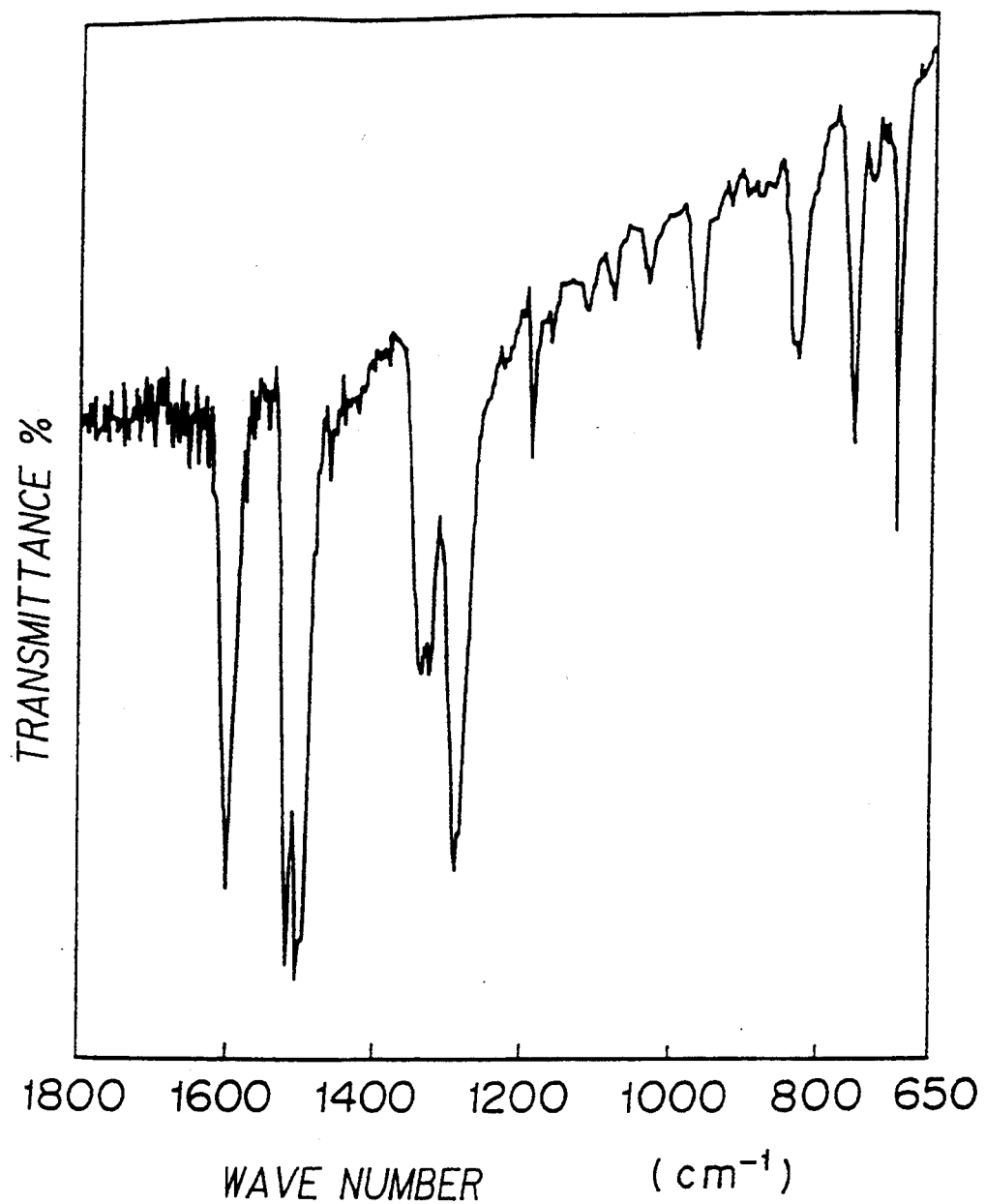
FIG. 1 is an infrared absorption spectrum of the stilbene compound obtained in Preparation Example 2.

Now, the present invention will be described in detail with reference to the preferred embodiments.

In the electrophotographic photoreceptor of the present invention, the photosensitive layer contains at least one member selected from the group consisting of compounds of the above formulas (I), (II) and (III).

In the above formula (I), X is a hydrogen atom or a group of $-CR^6=C(R^7)R^8$.

Each of $Ar^1$ and $Ar^2$ which may be the same or different, is an alkyl group such as a methyl group, an ethyl group or a propyl group; an aryl group such as a phenyl group, a naphthyl group or an anthracenyl group; or a heterocyclic group such as a pyrrolyl group, a thiophenyl group, a furyl group or a carbazolyl group, particularly preferably a phenyl group. The alkyl group, the aryl group and the heterocyclic group may, respectively, have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $Ar^3$ and $Ar^4$ which may be the same or different, is an arylene group such as a phenylene group, a naphthylene group or an anthracenylene group; or a bivalent heterocyclic group such as a pyrrolidene group, a thienylidene group or a furylidene group, particularly preferably a phenylene group or a naphthylene group. The arylene group and the bivalent heterocyclic group may, respectively, have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $R^1$, $R^2$, $R^3$, $R^4$, $R^5$, $R^6$, $R^7$ and $R^8$ which may be the same or different, is a hydrogen atom; an alkyl group such as a methyl group, ar thyl group or a propyl group; an aryl group such as a phenyl group, a naphthyl group or an anthracenyl group; or a heterocyclic group such as a pyrrolyl group, a thiophenyl group, a furyl group or a carbazolyl group. The alkyl group, the aryl group and the heterocyclic group may, respectively, have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

However, when one of $R^4$ and $R^5$, or one of $R^7$ and $R^8$, is a hydrogen atom or an alkyl group, the other is an aryl group or a heterocyclic group.

Each of $R^9$ and $R^{10}$ which may be the same or different, is a hydrogen atom; a halogen atom such as a chlorine atom, a bromine atom or an iodine atom; an alkyl group such as a methyl group or a propyl group; an alkoxy group such as a methoxy group, an ethoxy group or a propyloxy group; a dialkylamino group such as a dimethylamino group; a diarylamino group such as a diphenylamino group; a diaralkylamino group such as a dibenzylamino group; a di-heterocyclic amino group such as a dipyridylamino group; a diallylamino group; or a di-substituted amino group having an optional combination of the above substituents for the amino groups, particularly preferably, a hydrogen atom, a methyl group or a methoxy group. The alkyl group and the alkoxy group may have substituents. Such substituents may, for example, be a hydroxyl group; a halogen atom such as a chlorine atom, a bromine atom or a iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Dotted line 1 indicates that $Ar^1$ may bond as shown by the dotted line to the aromatic group bonded to the nitrogen atom to form a structure of the above formula (A-III) or (A-IV), dotted line 2 indicates that $Ar^2$ may bond as shown by the dotted line to the aromatic group bonded to the nitrogen atom to form a structure of the above formula (A-V) or (A-VI), dotted line 3 indicates that $Ar^3$ may bond as shown by the dotted line to the aromatic group bonded to the nitrogen atom to form a structure of the above formula (A-VII) or (A-VIII), and dotted line 4 indicates that $Ar^4$ may bond as shown by the dotted line to the aromatic group bonded to the nitrogen atom to form a structure of the above formula (A-IX) or (A-X).

Now, typical examples of the stilbene compound of the formula (I) will be given, but it should be understood that the stilbene compound useful in the present invention is by no means restricted to such specific examples.

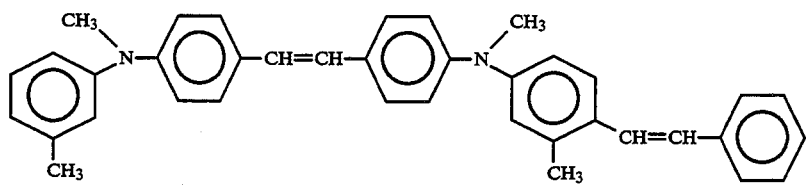

(Compound No. 1-1)

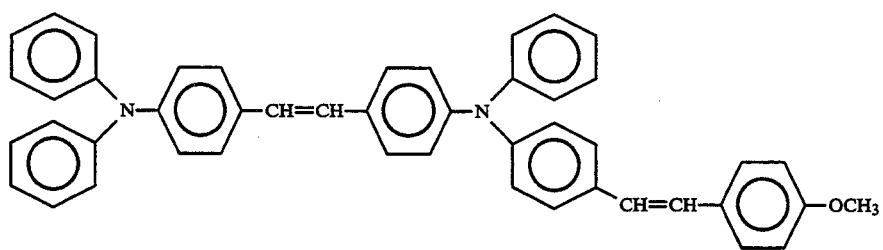

(Compound No. 1-2)

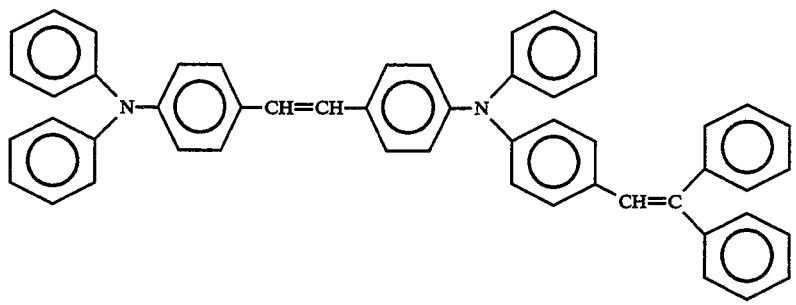

(Compound No. 1-3)

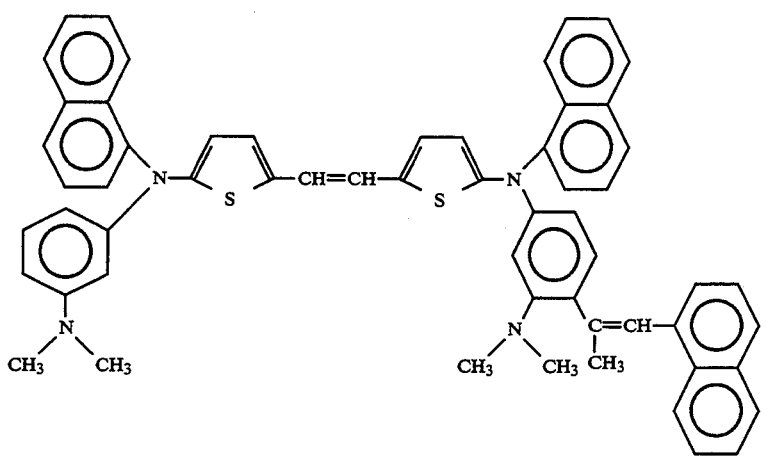
(Compound No. 1-4)
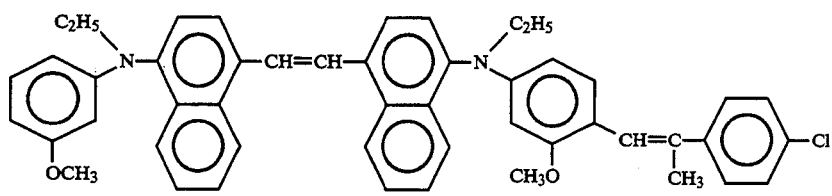
(Compound No. 1-5)
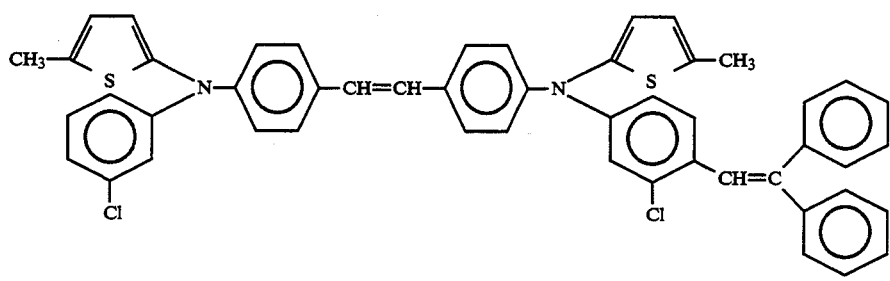
(Compound No. 1-6)
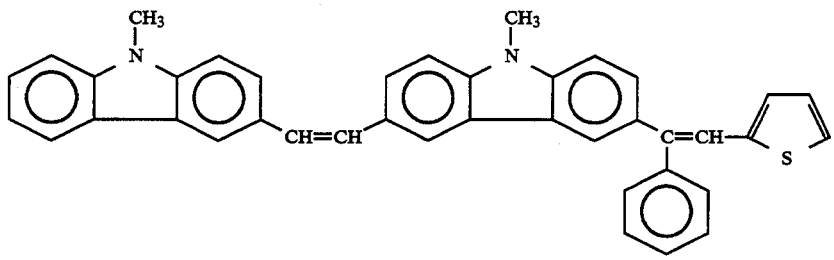
(Compound No. 1-7)
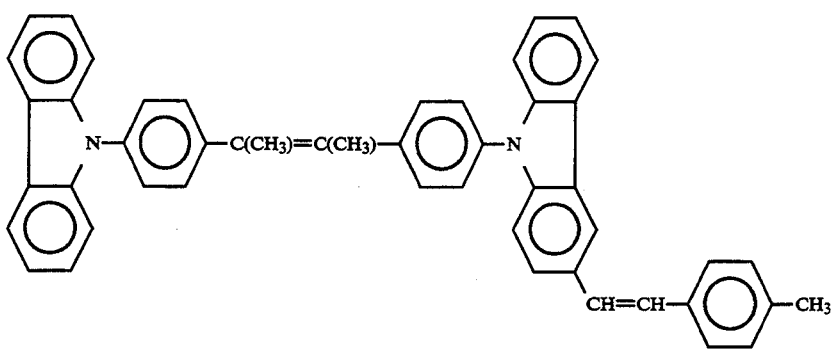
(Compound No. 1-8)

-continued
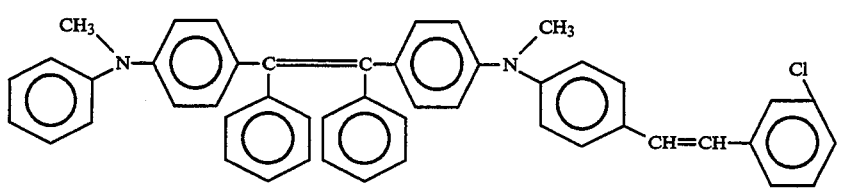
(Compound No. 1-9)
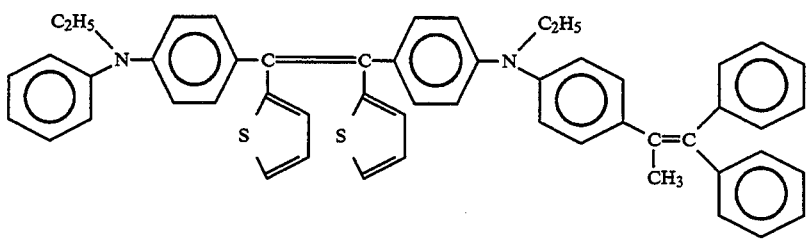
(Compound No. 1-10)
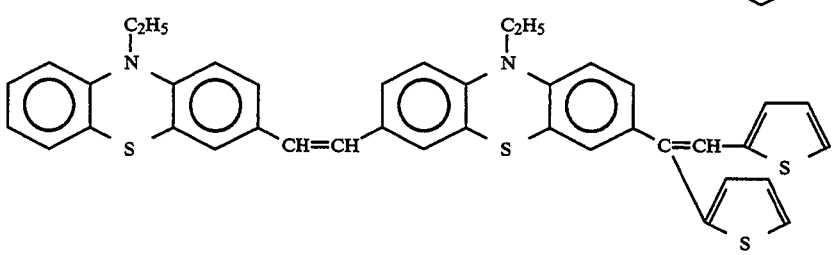
(Compound No. 1-11)
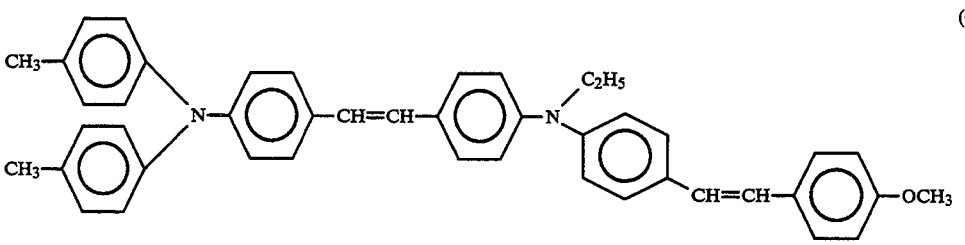
(Compound No. 1-12)
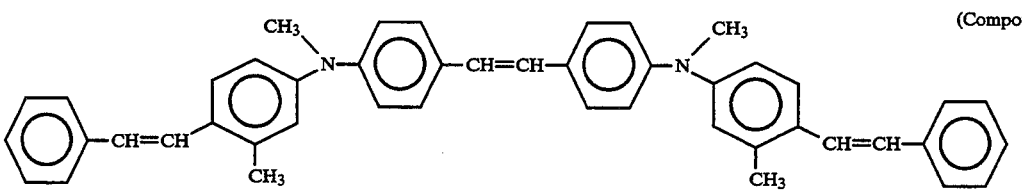
(Compound No. 1-13)
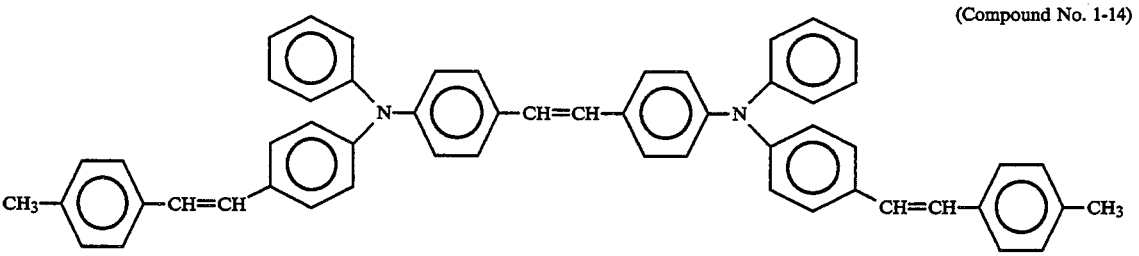
(Compound No. 1-14)
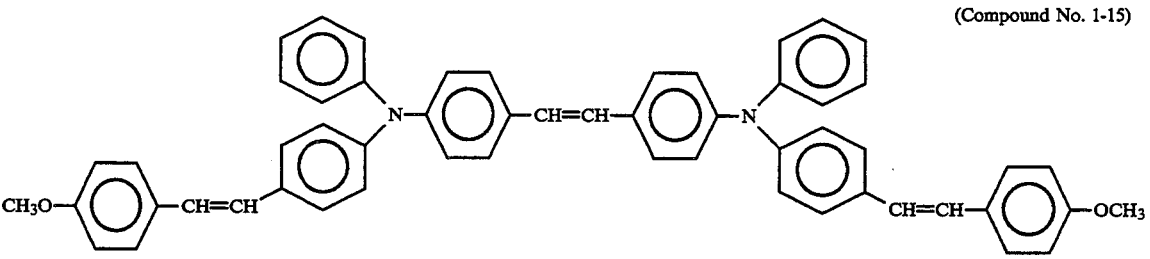
(Compound No. 1-15)

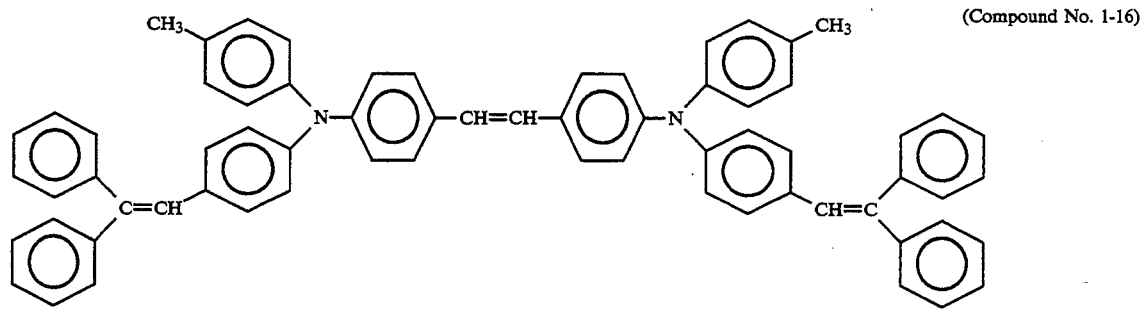
(Compound No. 1-16)
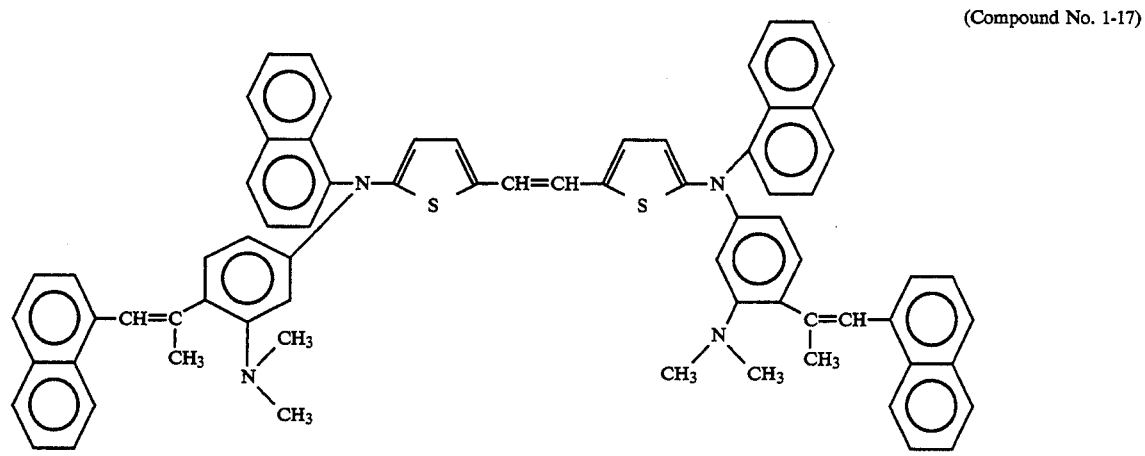
(Compound No. 1-17)
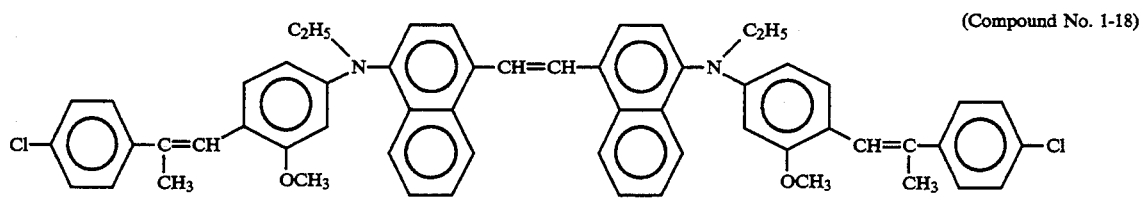
(Compound No. 1-18)
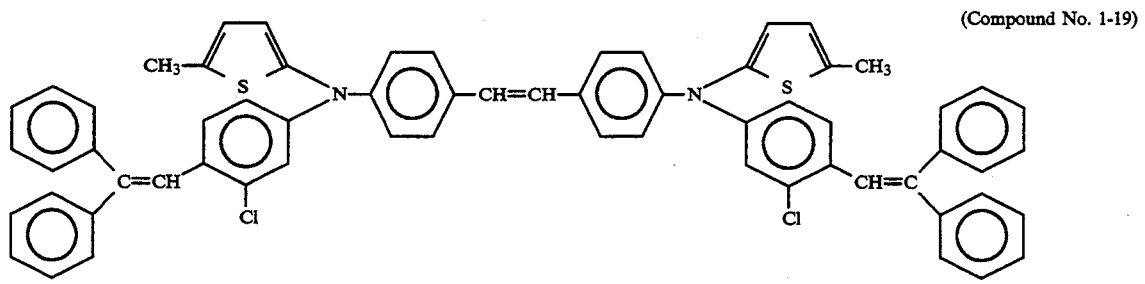
(Compound No. 1-19)
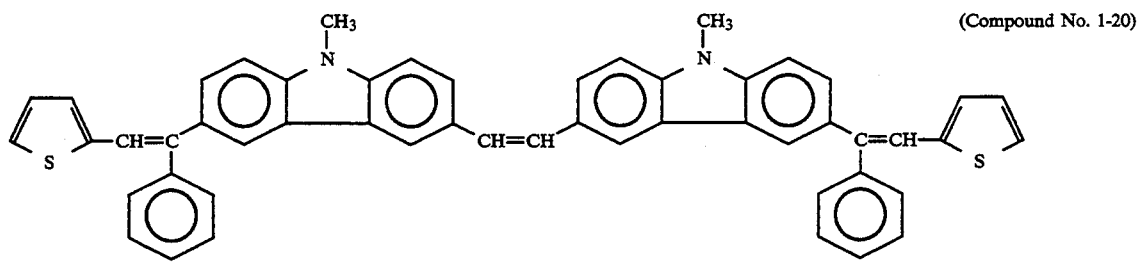
(Compound No. 1-20)

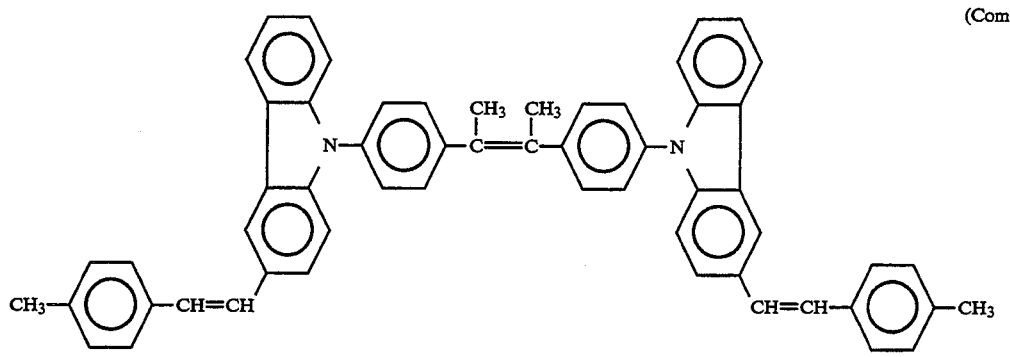
(Compound No. 1-21)
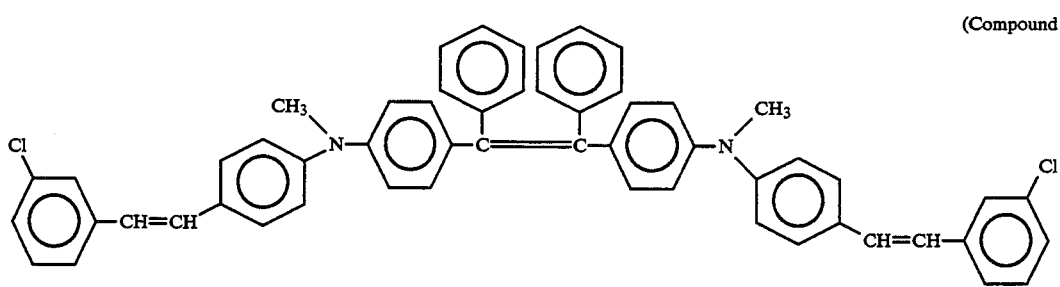
(Compound No. 1-22)
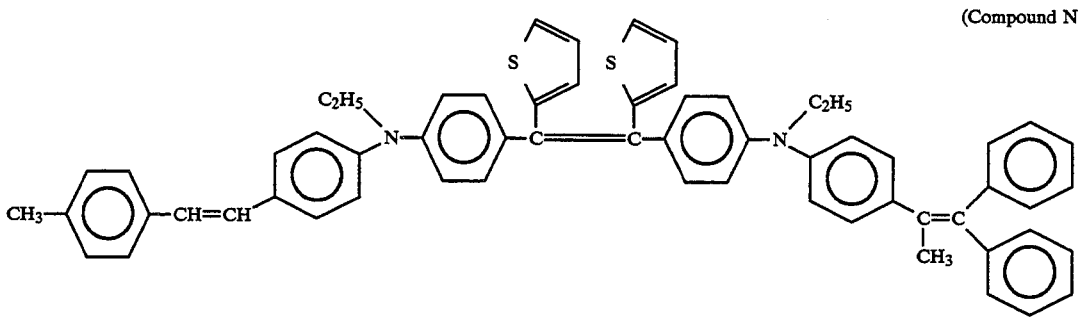
(Compound No. 1-23)
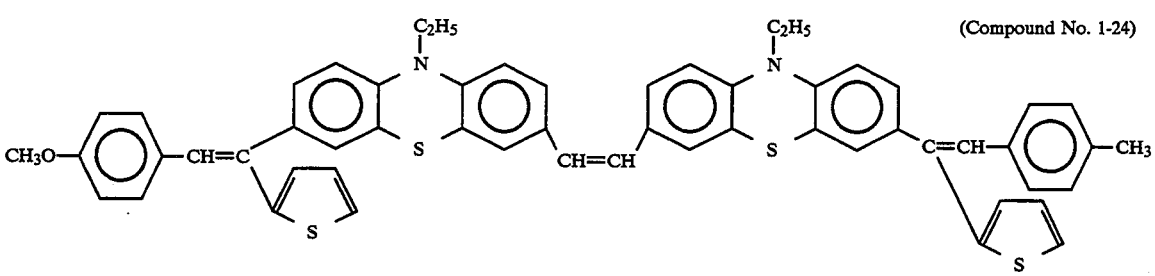
(Compound No. 1-24)
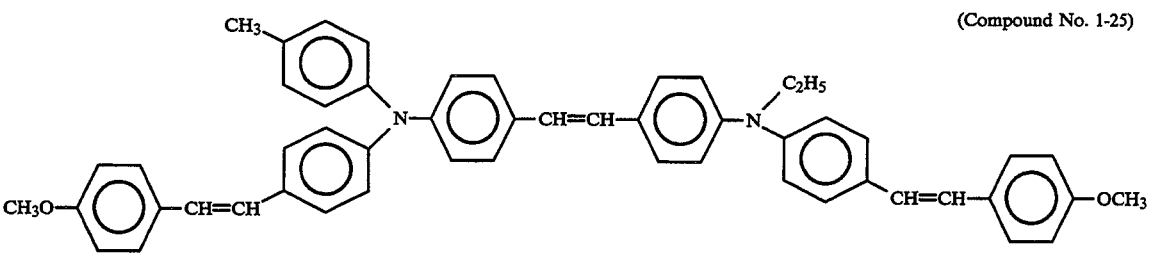
(Compound No. 1-25)

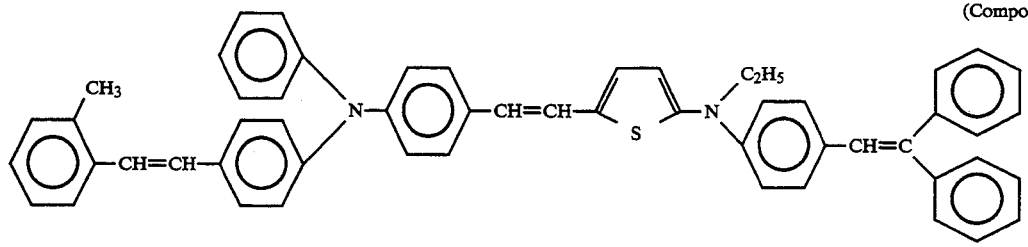

(Compound No. 1-26)

In the above formula (II), $Q^1$ is any one of the groups of the following formulas (B-III), (B-VI) or (B-VII); and $Q^2$ is any one of the groups of the following formulas (B-VI), (B-VII) or (B-VIII):

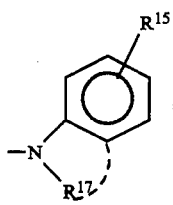  (B-III)

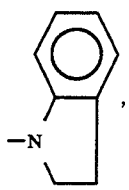  (B-IV)

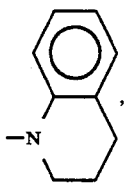  (B-V)

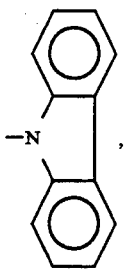  (B-VI)

(B-VII)

(B-VIII)

(When $R^{17}$ or $R^{20}$ is an alkyl group, $R^{17}$ or $R^{20}$ may be bonded to a benzene ring as indicated by the dotted line, thus making the formula B-IV or B-V.)

$Y^1$ is an aliphatic linking group which may have substituents including a lower alkyl group such as a methyl group or an ethyl group, a lower alkoxy group such as a methoxy group or an ethoxy group, a halogen atom such as a chlorine atom or a bromine atom and an aryl group such as a phenyl group or a naphthyl group. The alkyl group, the alkoxy group and the aryl group may have substituents, and such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or dinaphthylamino group; a diaralkylamino group such as a dibenzylamino group or a diphenethylamino group; a di-heterocyclic amino group such as a dipyridylamino group or a di-thienylamino group; a diallylamino group; or a di-substituted amino group having an optional combination of the above substituents for the amino groups.

Further, an oxygen atom or a carbon-carbon double bond may be present in the main chain of the linking group. When the main chain of the linking group is made solely of carbon, the constituting carbon number is preferably from 1 to 9. In some cases, a hydrocarbon ring such as cyclohexane ring may be formed on the $Sp^3$ carbon in the chain of the linking group.

Further, when an oxygen atom is present in the main chain of the linking group, it may take a form of an ether bond whereby the constituting carbon chain length is preferably from 1 to 9.

Each of $Ar^5$ and $Ar^6$ which may be the same or different, is an alkyl group such as a methyl group, an ethyl group or a propyl group; an aryl group such as a phenyl group, a naphthyl group or an anthracenyl group; or a heterocyclic group such as a pyrrolyl group, a thiophenyl group, a furyl group or a carbazolyl group, particularly preferably a phenyl group. The alkyl group, the aryl group and the heterocyclic group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $R^{11}$, $R^{12}$, $R^{13}$, $R^{14}$, $R^{15}$ and $R^{19}$ which may be the same or different, is a hydrogen atom; a halogen atom such as a chlorine atom, a bromine atom or an iodine atom; an alkyl group such as a methyl group, an ethyl group or a propyl group; an alkoxy group such as a methoxy group, an ethoxy group or a propyloxy group; or a substituented amino group such as a dimethylamino or a diethylamino group. The alkyl group and the alkoxy group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $R^{16}$ and $R^{18}$ which may be the same or different, is a hydrogen atom; an alkyl group such as a methyl group, an ethyl group or a propyl group; an aryl group such as a phenyl group, a naphthyl group or an anthracenyl group; or a heterocyclic group such as a thienyl group or furyl group. Particularly preferred is a hydrogen atom or a methyl group. The alkyl group, the aryl group and the heterocyclic group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $R^{17}$ and $R^{20}$ which may be the same or different, is an aryl group such as a phenyl group, a naphthyl group or an anthracenyl group; a heterocyclic group such as a pyrrolyl group, a thienyl group, a furyl group or a carbazolyl group, particularly preferably a phenyl group or a naphthyl group; or an alkyl group such as a methyl group, an ethyl group. The aryl group, the heterocyclic group and the alkyl group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Dotted line 5 indicates that the two phenyl groups bonded to the same nitrogen atom may bond to each other as shown by the dotted line to form a structure of the following formula (B-IX) or (B-XI), and dotted line 6 indicates that the two phenyl groups bonded to the same nitrogen atom may bond to each other as shown by the dotted line to form a structure of the following formula (B-X) or (B-XII):

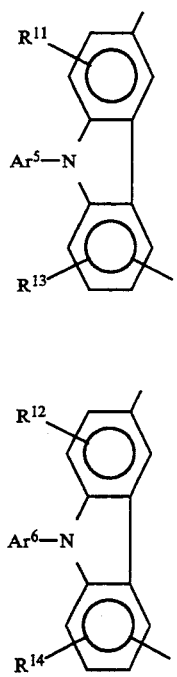
(B-IX)
(B-X)
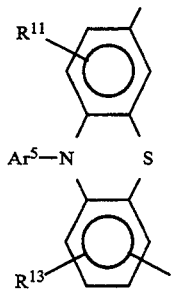
(B-XI)
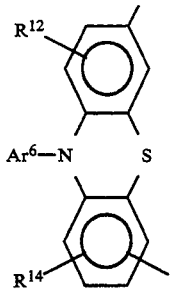
(B-XII)
Now, typical examples of the bishydrazone compound of the formula (II) will be given, but it should be understood that the bishydrazone compound to be used in the present invention is by no means restricted to such specific examples.

(Compound (No. 2-1)
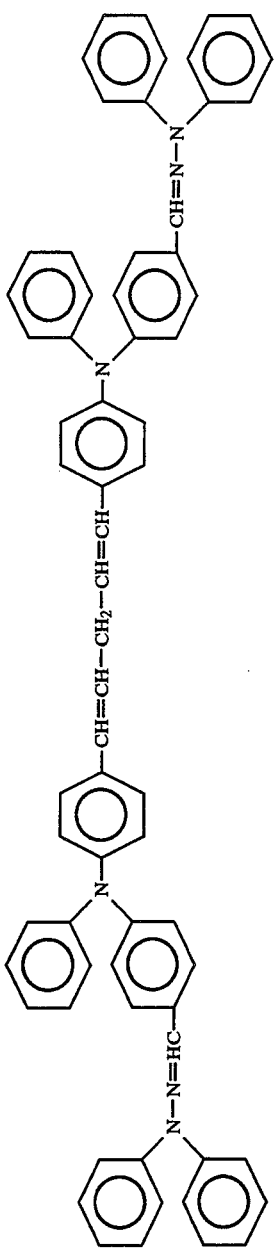
(Compound No. 2-2)
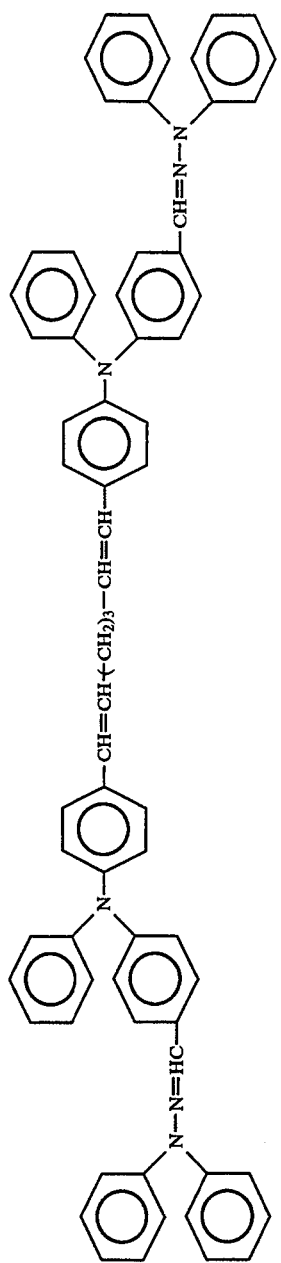
(Compound No. 2-3)
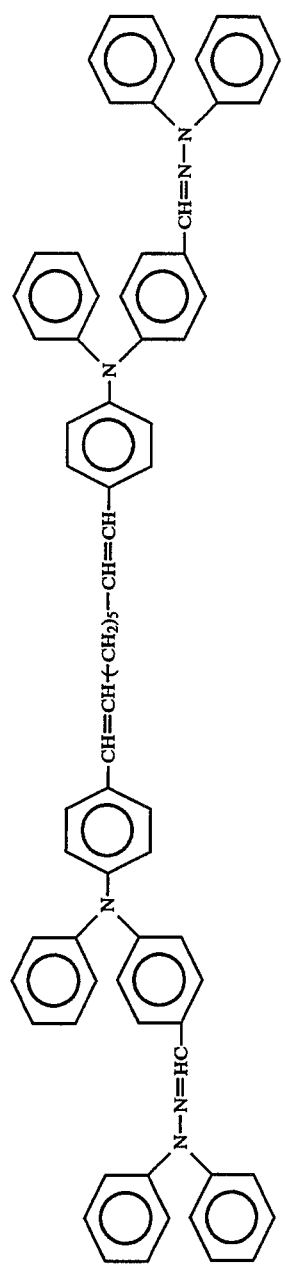

(Compound No. 2-4)
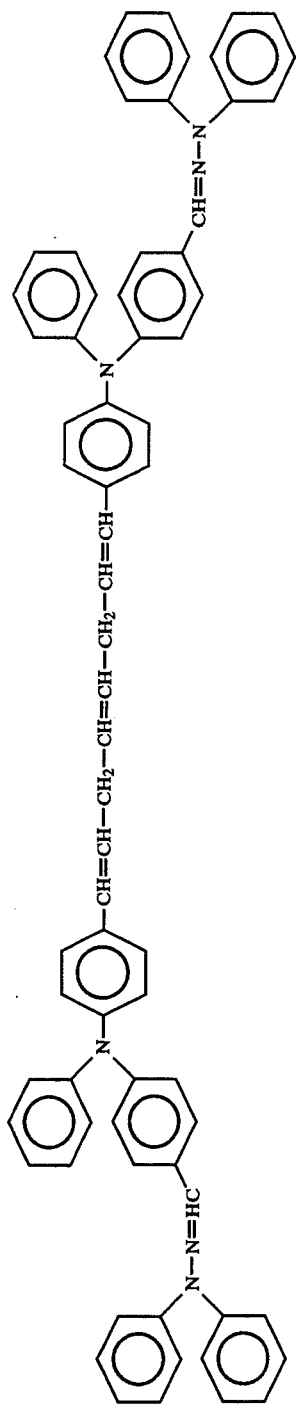
(Compound No. 2-5)
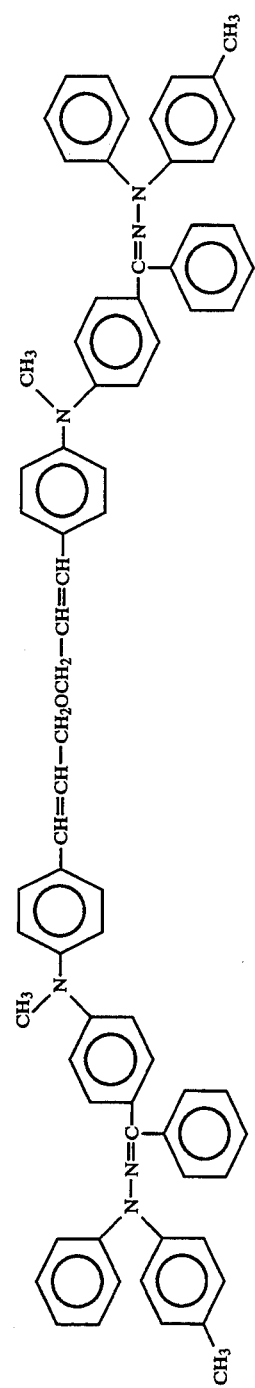
(Compound No. 2-6)
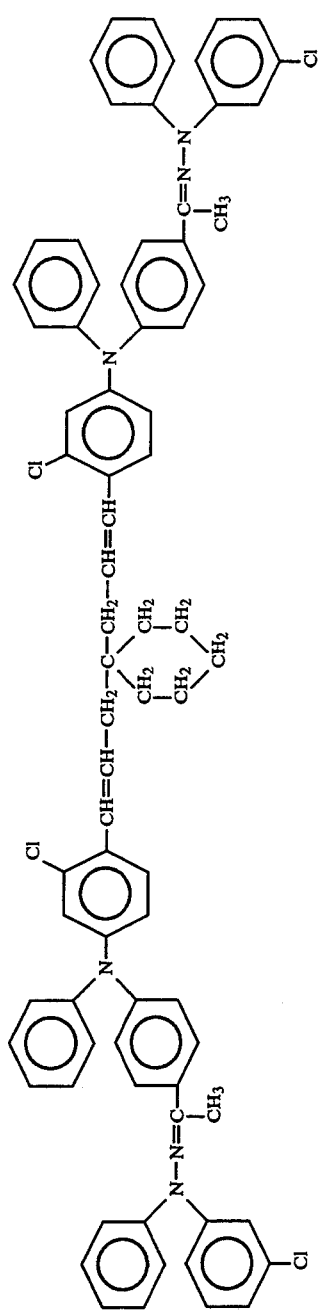

-continued
(Compound No. 2-7)
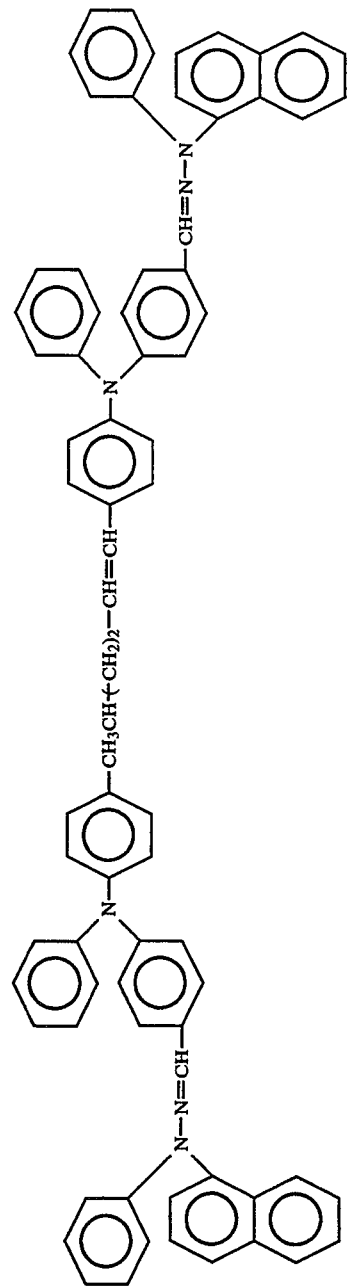
(Compound No. 2-8)
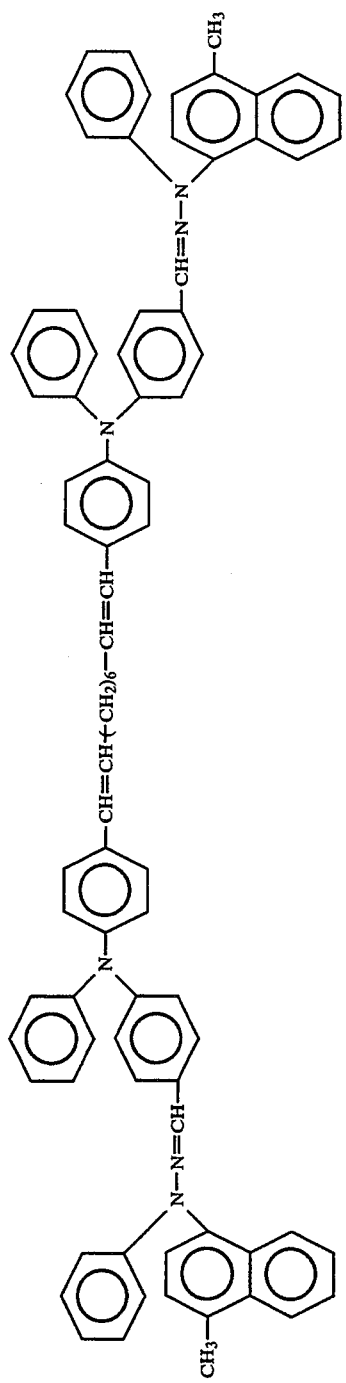
(Compound No. 2-9)
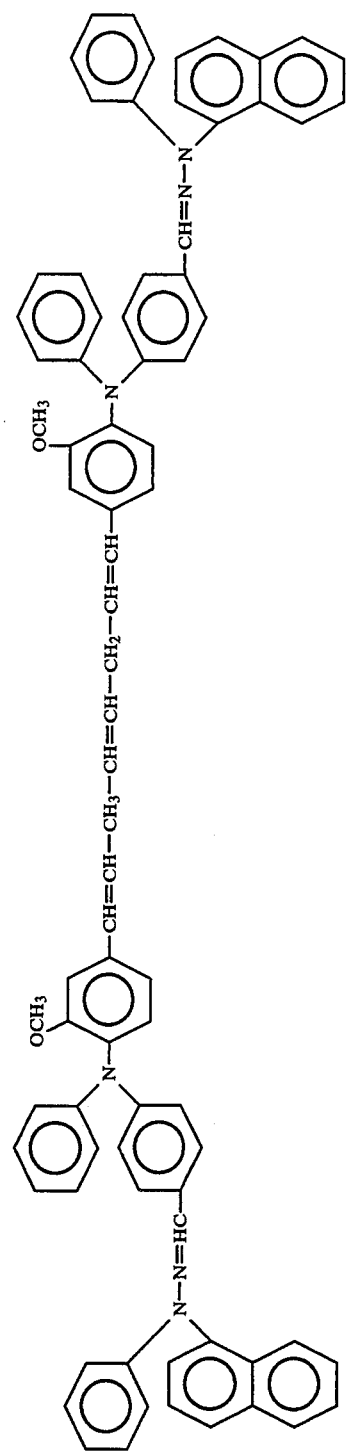

-continued
(Compound No. 2-10)
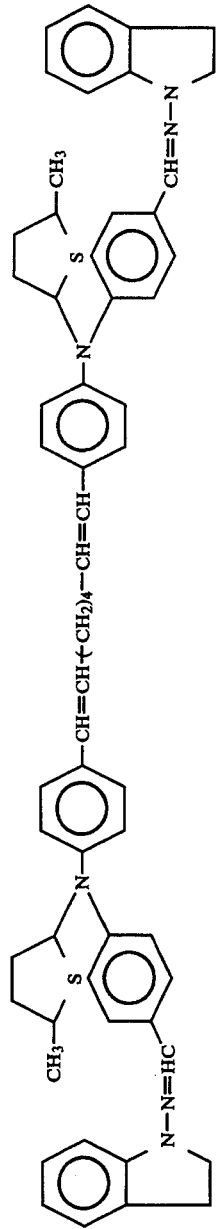
(Compound No. 2-11)
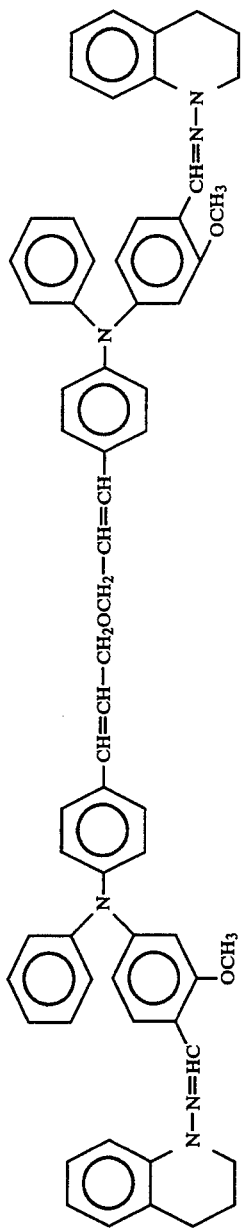
(Compound No. 2-12)
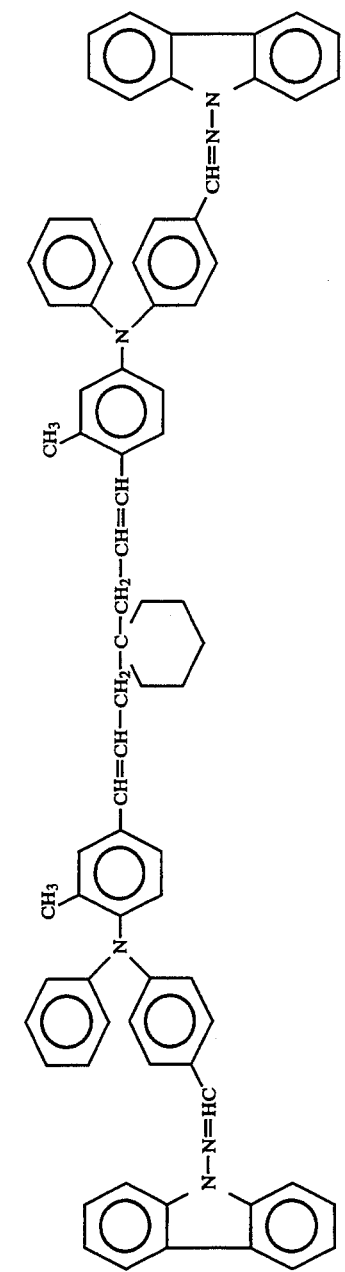

-continued
(Compound No. 2-13)
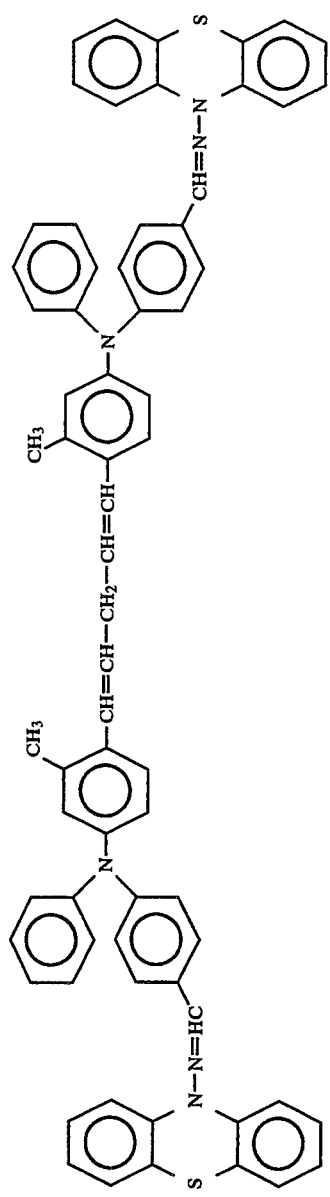
(Compound No. 2-14)
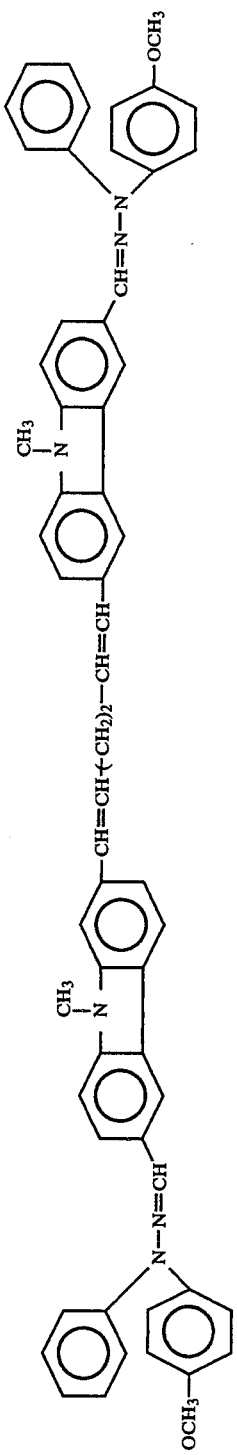
(Compound No. 2-15)
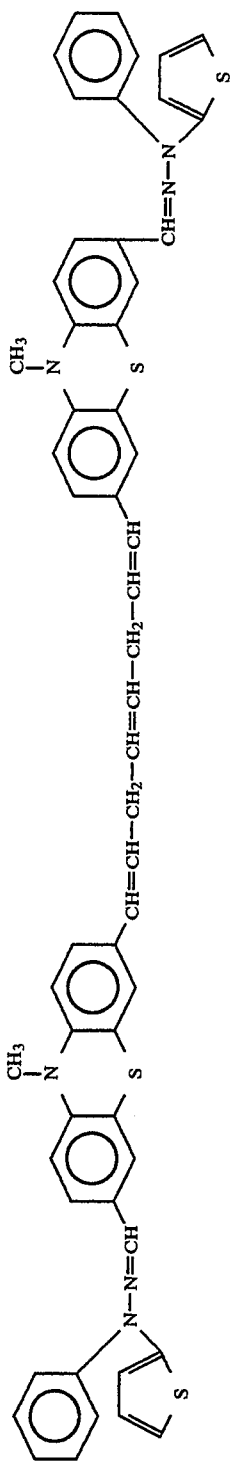

-continued
(Compound No. 2-16)
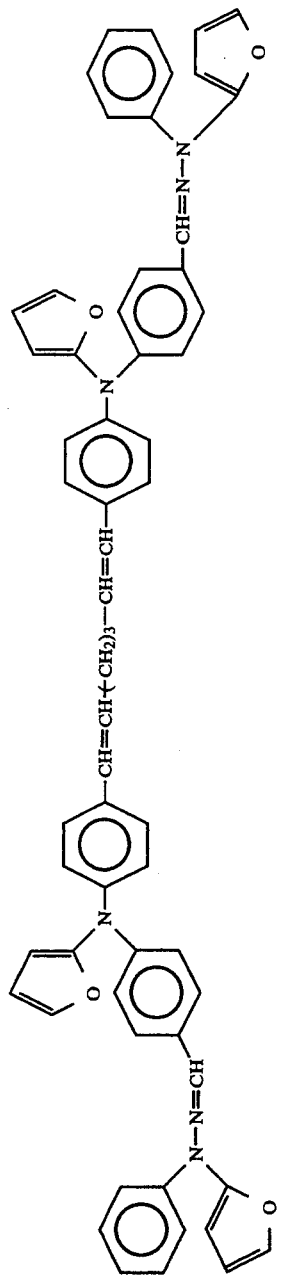
(Compound No. 2-17)
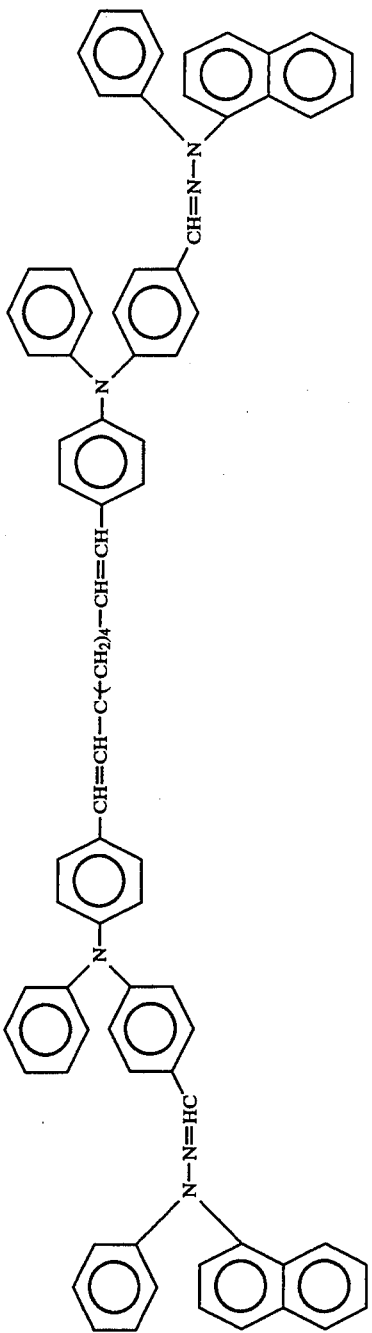
(Compound No. 2-18)
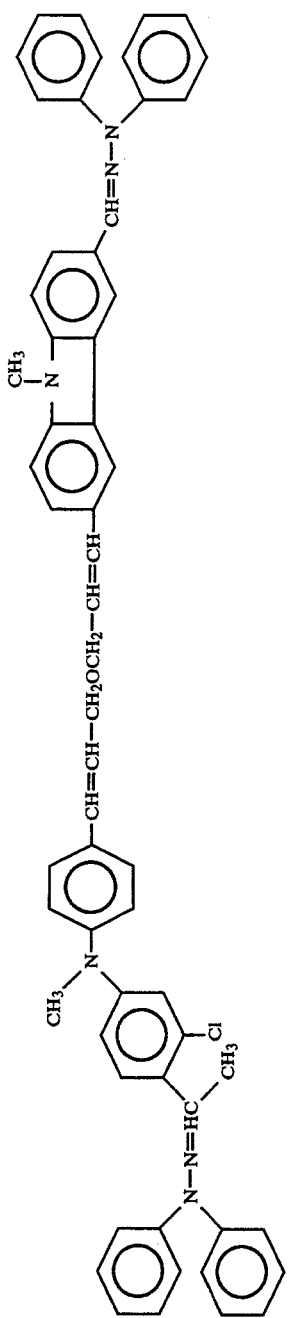

(Compound No. 2-19)
(Compound No. 2-20)
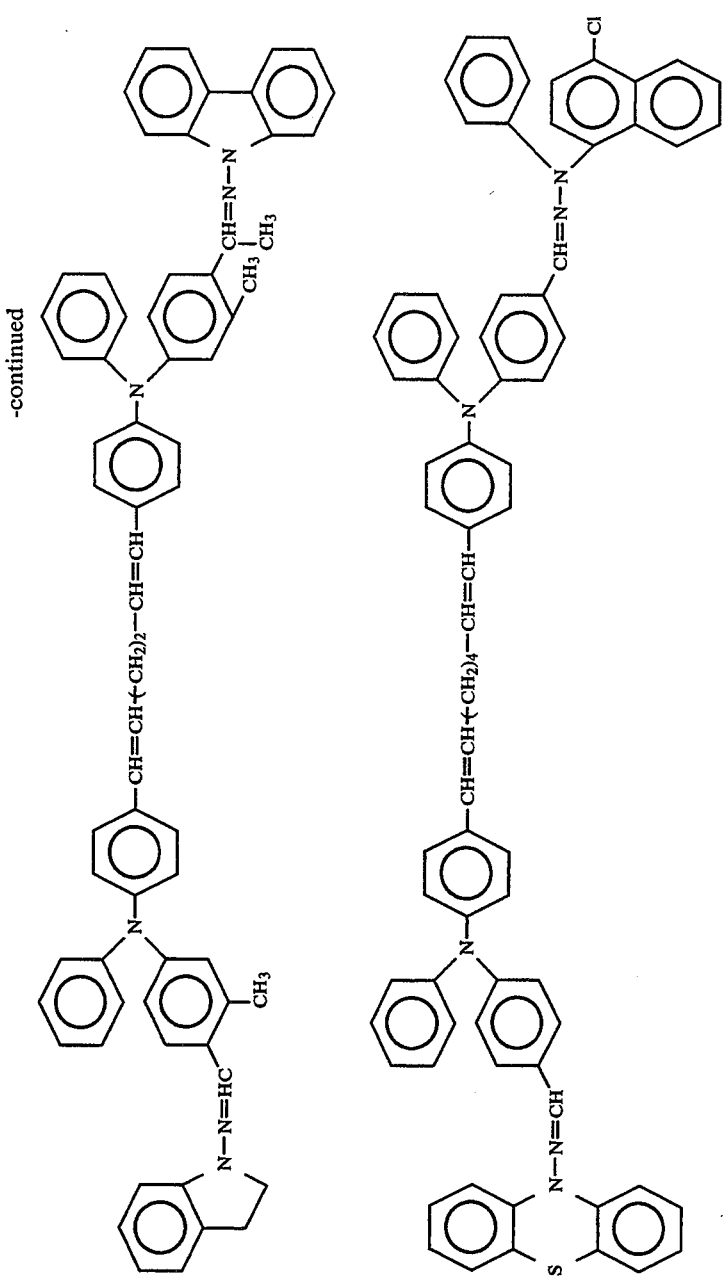

In the above formula (III), $Q^3$ is any one of the groups of the following formulas (C-II) to (C-VI); and $Q^4$ is any one of the groups of the following formulas (C-III) to (C-VII):

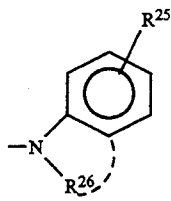 (C-II)

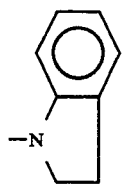 (C-III)

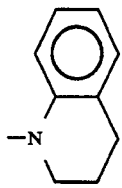 (C-IV)

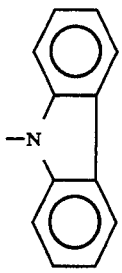 (C-V)

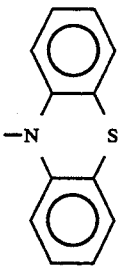 (C-VI)

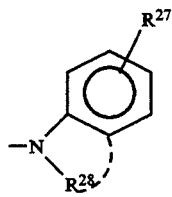 (C-VII)

(When $R^{26}$ or $R^{28}$ is an alkyl group, $R^{26}$ or $R^{28}$ may be bonded to a benzene ring as indicated by the dotted line, thus making the formula C-III or C-IV.)

$Y^2$ is an arylene group such as a phenylene group, a naphthylene group, an anthracenylene group; or a bivalent heterocyclic group such as a pyrrolidene group, a thienylidene group or a furylidene group. The arylene group and the bivalent heterocyclic group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $Ar^7$, $Ar^9$, $R^{26}$ and $R^{28}$ which may be the same or different, is an alkyl group such as a methyl group, an ethyl group, a propyl group, a butyl group or a hexyl group; an aryl group such as a phenyl group, a naphthyl group or an anthracenyl group; or a heterocyclic group such as a pyrrolyl group, a thienyl group, a furyl group or a carbazolyl group. The alkyl group, the aryl group and the heterocyclic group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $Ar^8$ and $R^{10}$ which may be the same or different, is an aryl group such as a phenyl group, a naphthyl group or an anthracenyl group; or a heterocyclic group such as a pyrrolyl group, a thienyl group, a furyl group or a carbazolyl group. The aryl group and the heterocyclic group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Particularly preferred is each of $Ar^7$, $Ar^8$, $Ar^9$ and $Ar^{10}$ being a phenyl group which may have substituents.

Each of $R^{21}$, $R^{22}$, $R^{25}$ and $R^{27}$ which may be the same or different, is a hydrogen atom; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; or a substituted amino group such as a dimethylamino group or a diethylamino group. The alkyl group and the alkoxy group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Each of $R^{23}$ and $R^{24}$ which may be the same or different, is a hydrogen atom; an alkyl group such as a methyl group, an ethyl group, a propyl group, a butyl group or a hexyl group; an aryl group such as a phenyl group, a naphthyl group or an anthracenyl group; or a heterocyclic group such as a pyrrolyl group, a thienyl group, a furyl group or a carbazolyl group. The alkyl group, the aryl group and the heterocyclic group may have substituents. Such substituents may, for example, be a hydroxyl group; a halogen atom such as a chlorine atom, a bromine atom or an iodine atom; an alkyl group such as a methyl group, an ethyl group, a propyl group, a butyl group or a hexyl group; an alkoxy group such as a methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; a dialkylamino group such as a dimethylamino group or a diethylamino group; a diarylamino group such as a diphenylamino group or a dinaphthylamino group; a diaralkylamino group such as a dibenzylamino group or a diphenethylamino group; a di-heterocyclic amino group such as a dipyridylamino group or a dithienylamino group; a diallylamino group; or a di-substituted amino group having an optional combination of the above-mentioned substituents for the amino groups.

Further, dotted line 7 indicates that $Ar^8$ may bond as shown by the dotted line to the benzene ring to which $R^{21}$ is bonded, to form a structure of the following formula (C-VIII) or (C-IX), and dotted line 8 indicates that $Ar^{10}$ may bond as shown by the dotted line to the benzene ring to which $R^{22}$ is bonded, to form a structure of the following formula (C-X) or (C-XI):

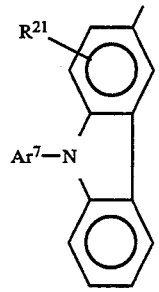

(C-VIII)

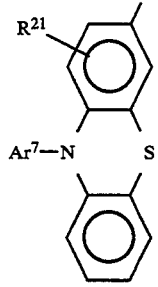

(C-IX)

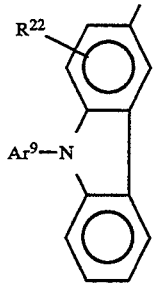

(C-X)

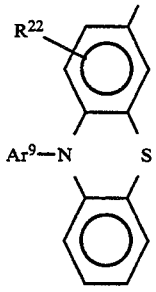

(C-XI)

Each of m and n is an integer of 0 or 1, and $m+n \geq 1$.

In the above formula (III), the bonding position of each of $-C(R^{23})=N-Q^3$ and $-C(R^{24})=N-Q^4$ is at any one of the atoms capable of having substituents in the bracket ( ) in the formula (III) and usually at any one of the atoms capable of having substituents within Ar⁷, Ar⁸, Ar⁹, Ar¹⁰ and Y², or at any one of the carbon atoms of —CH=CH— bonded to Y².

Now, typical examples of the hydrazone compound of the formula (III) will be given, but it should be understood that the hydrazone compound to be used in the present invention is by no means restricted to such specific examples.

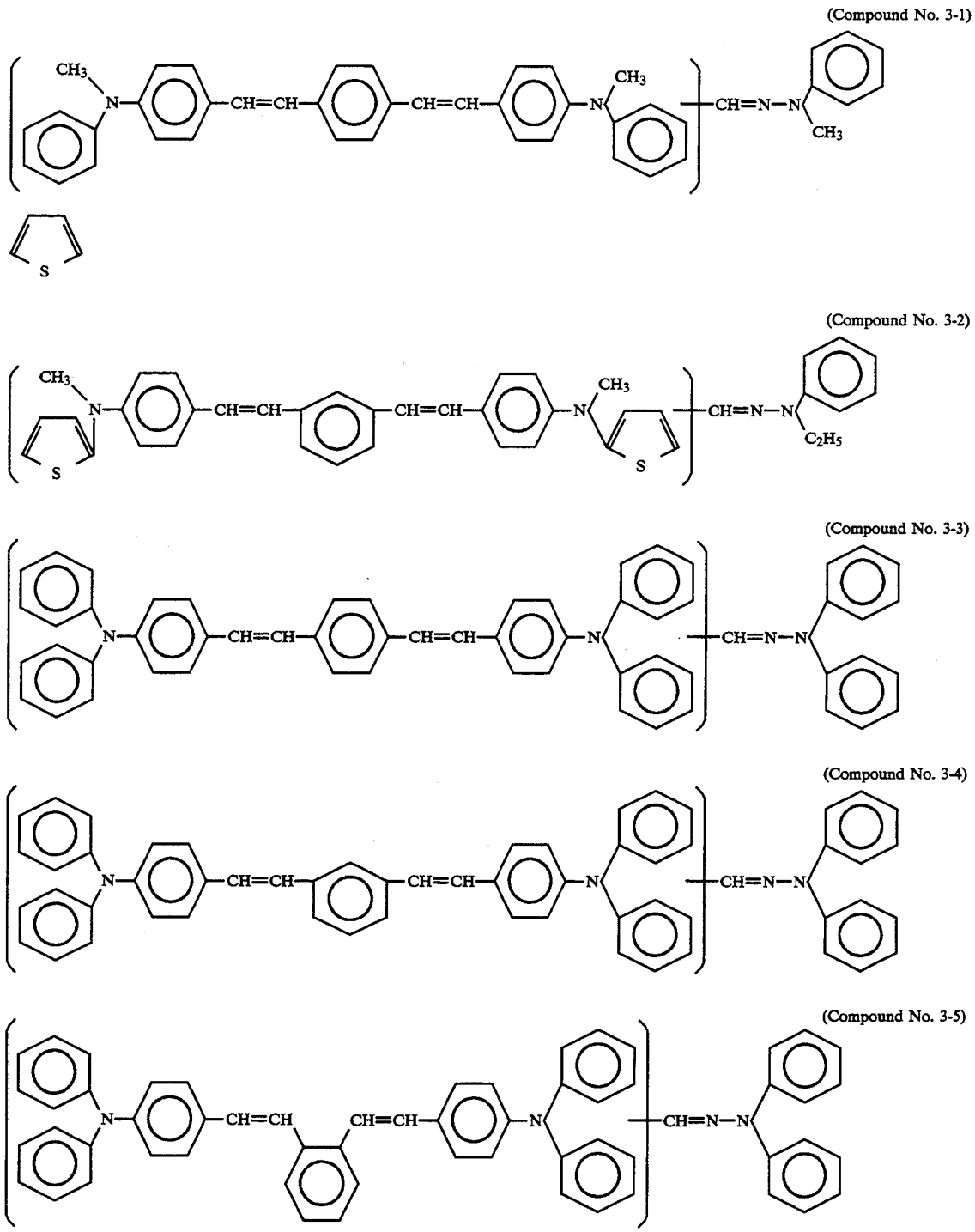

-continued
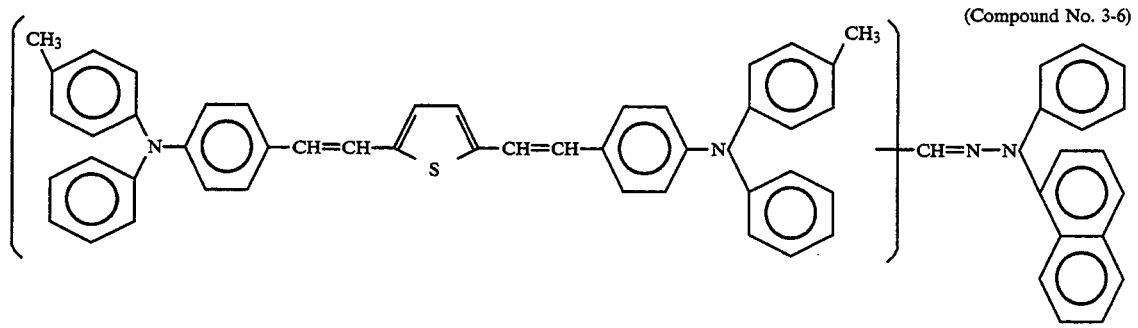
(Compound No. 3-6)
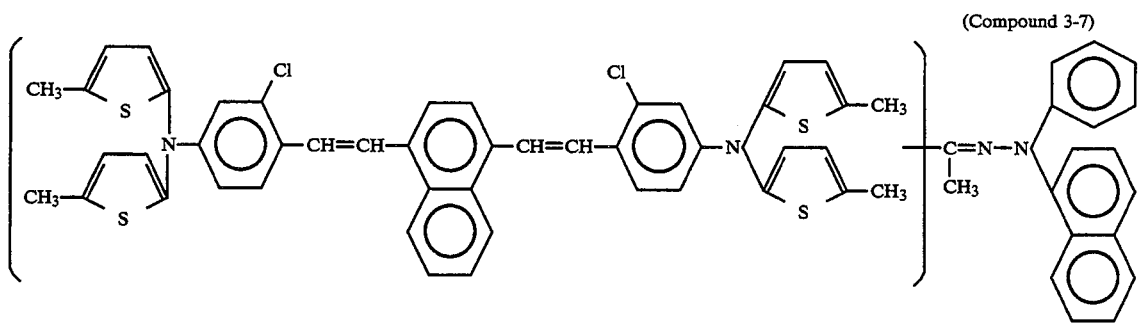
(Compound 3-7)
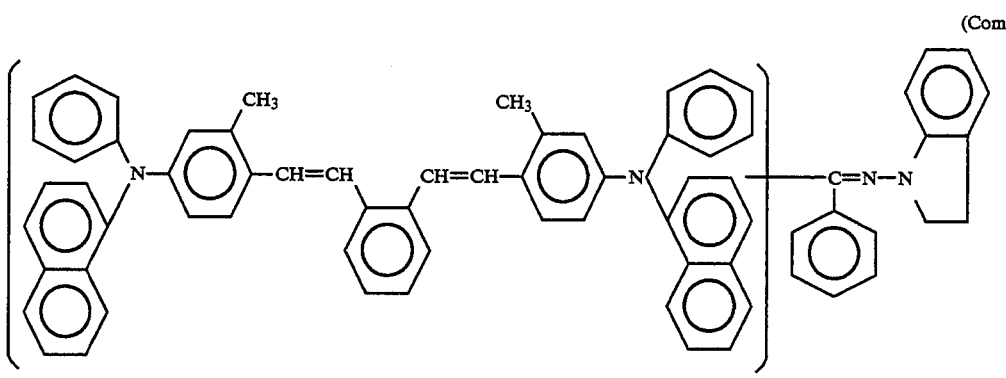
(Compound No. 3-8)
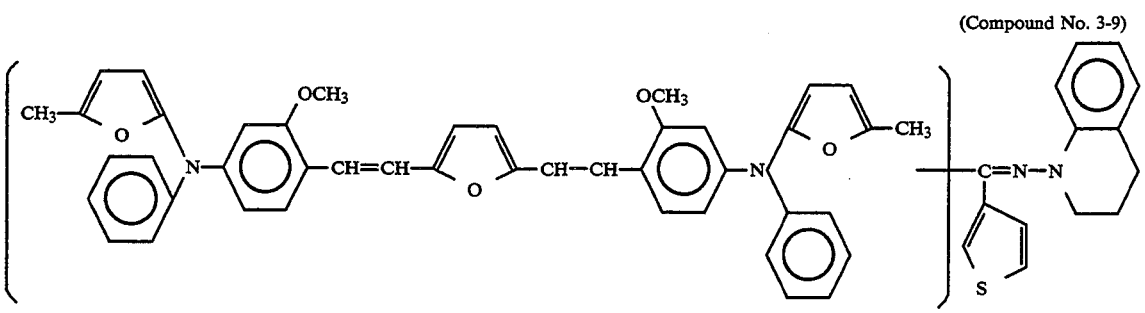
(Compound No. 3-9)
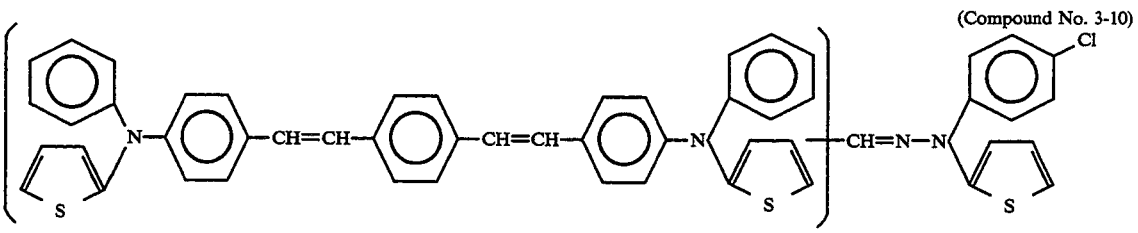
(Compound No. 3-10)

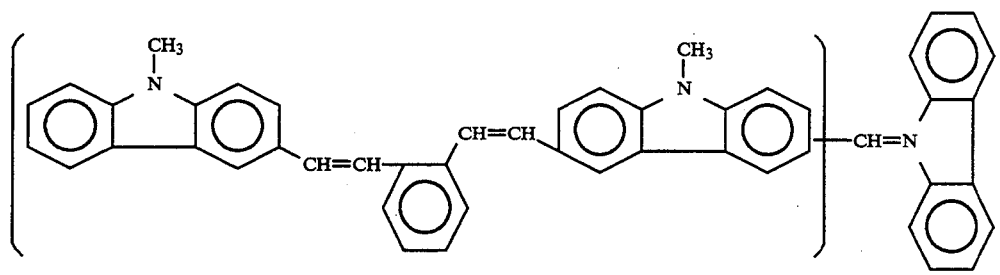
(Compound No. 3-11)
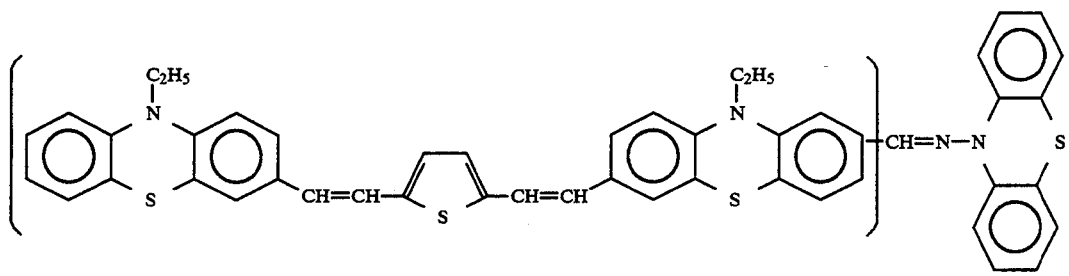
(Compound No. 3-12)
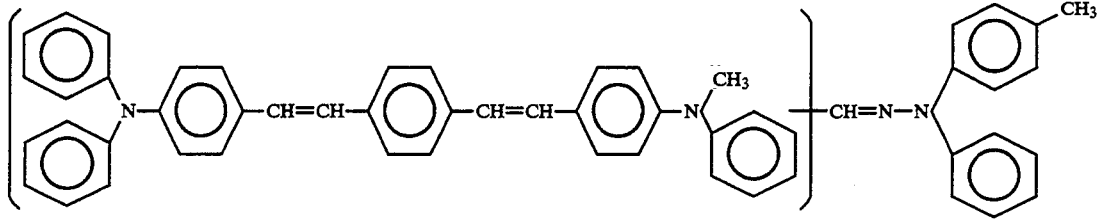
(Compound No. 3-13)
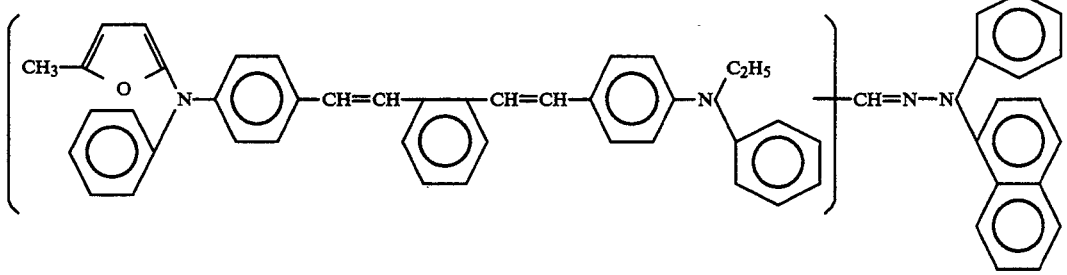
(Compound No. 3-14)
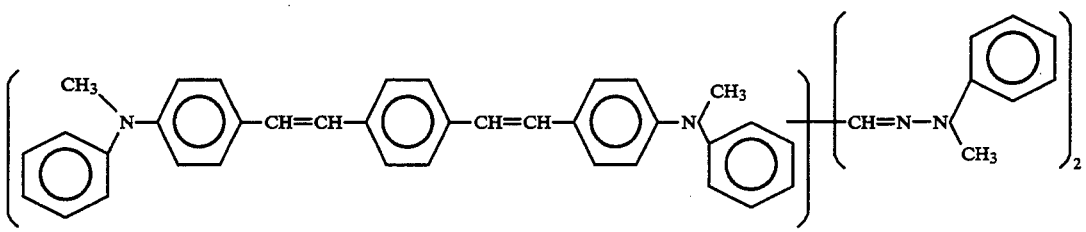
(Compound No. 3-16)

-continued
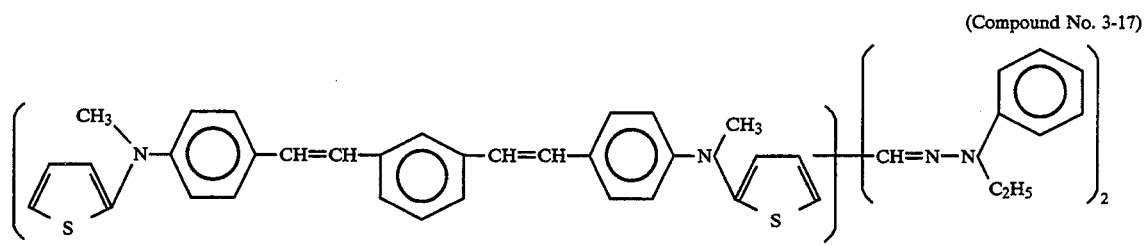
(Compound No. 3-17)
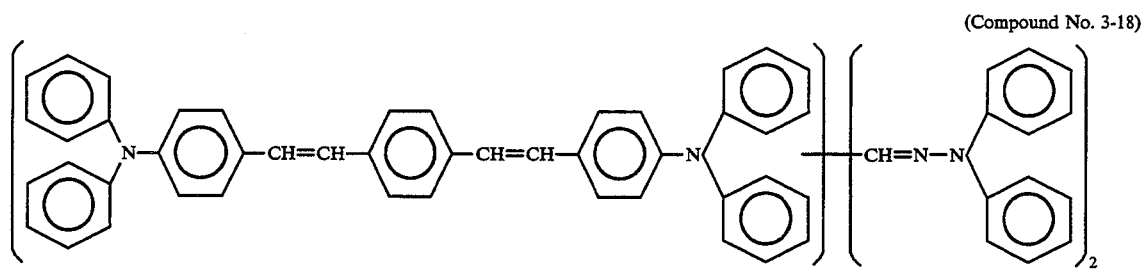
(Compound No. 3-18)
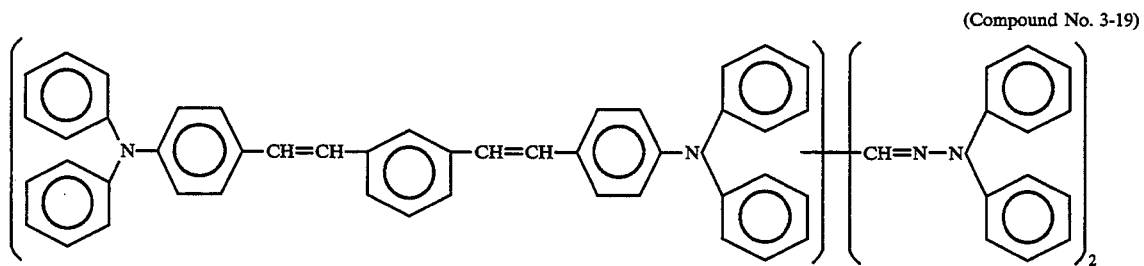
(Compound No. 3-19)
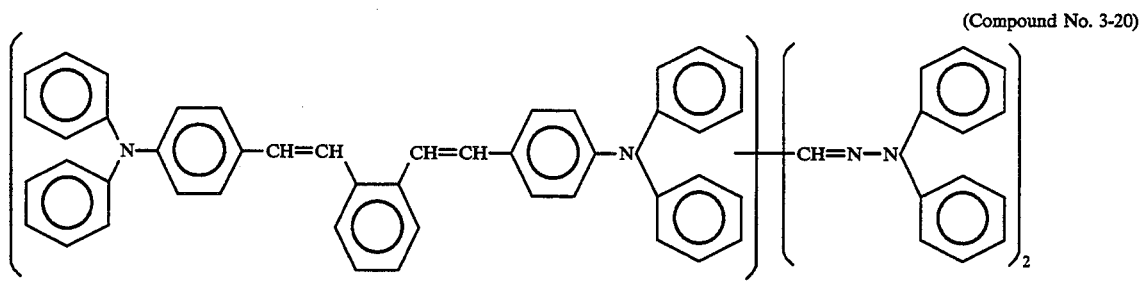
(Compound No. 3-20)
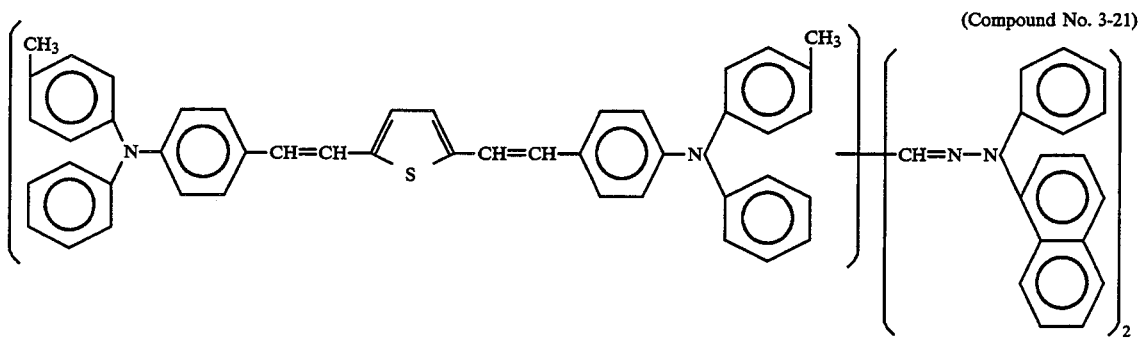
(Compound No. 3-21)

(Compound No. 3-22)
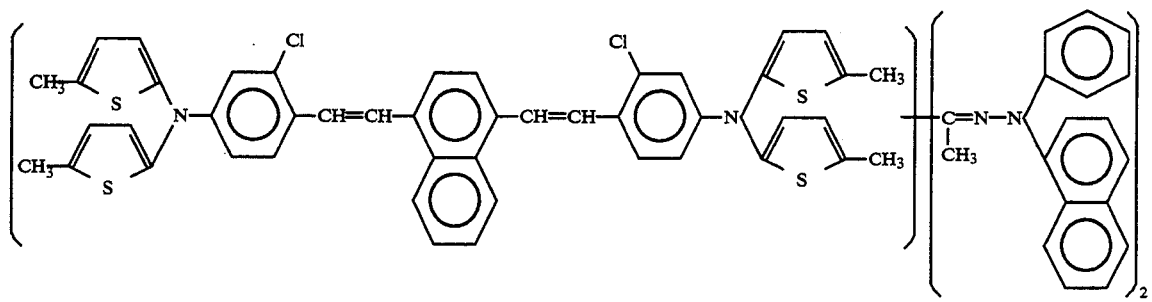
(Compound No. 3-23)
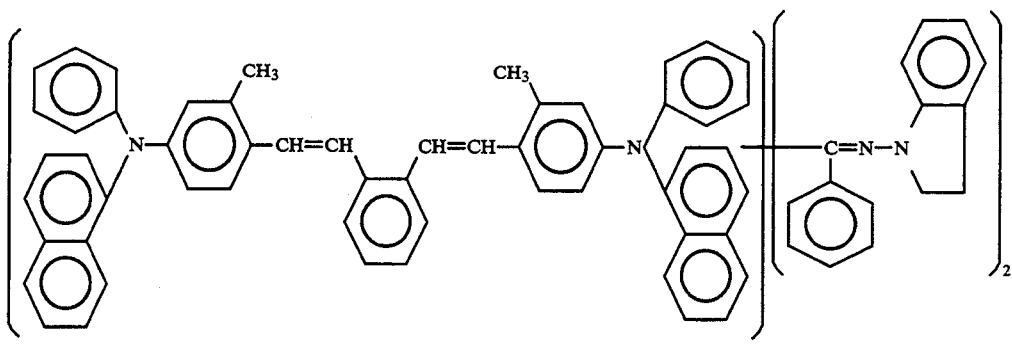
(Compound No. 3-24)
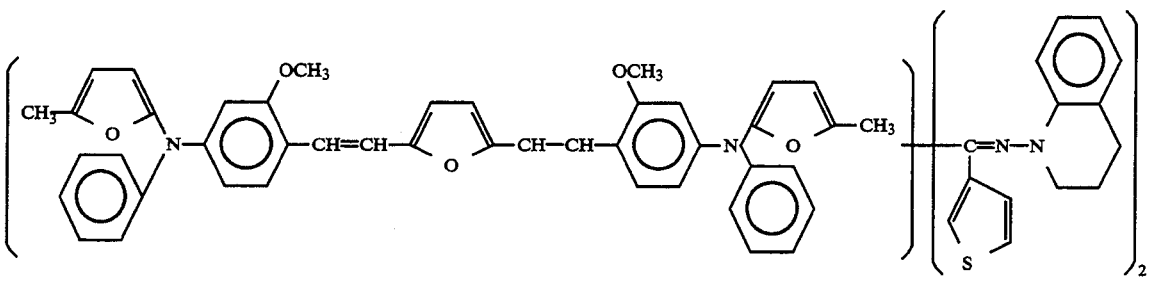
(Compound No. 3-25)
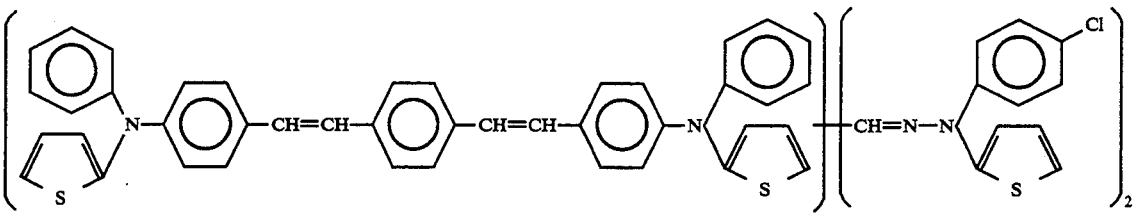
(Compound No. 3-26)
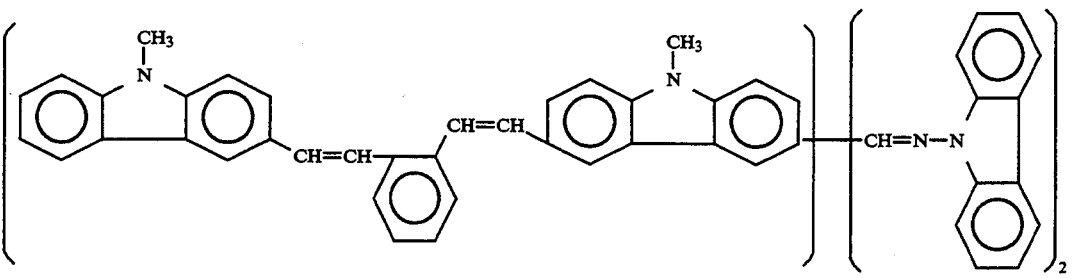

-continued
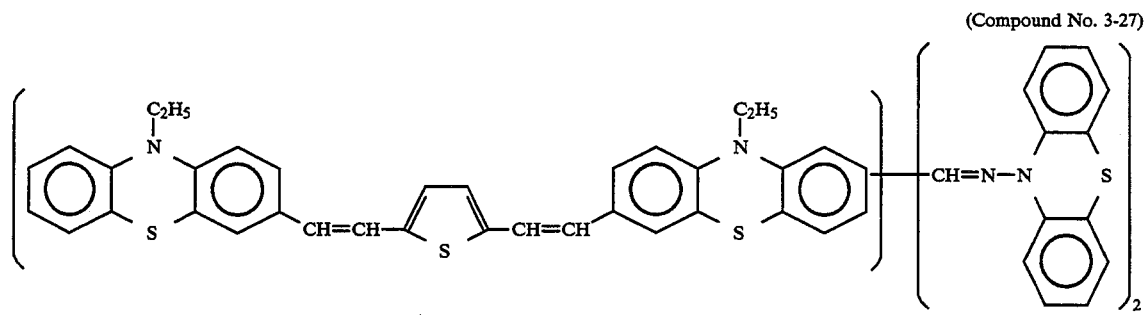
(Compound No. 3-27)
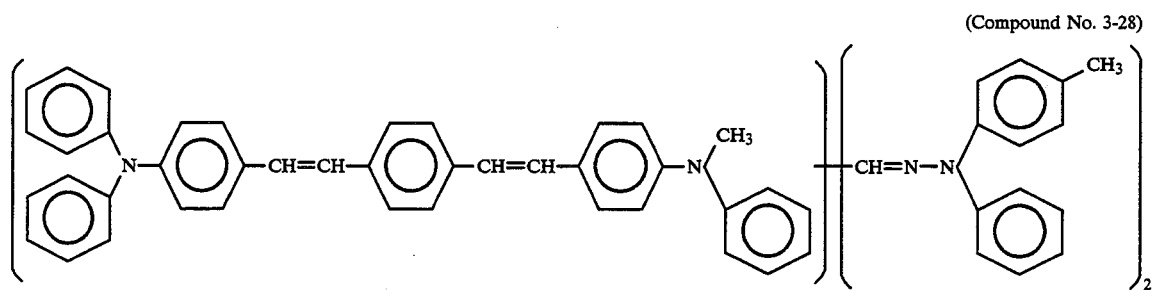
(Compound No. 3-28)
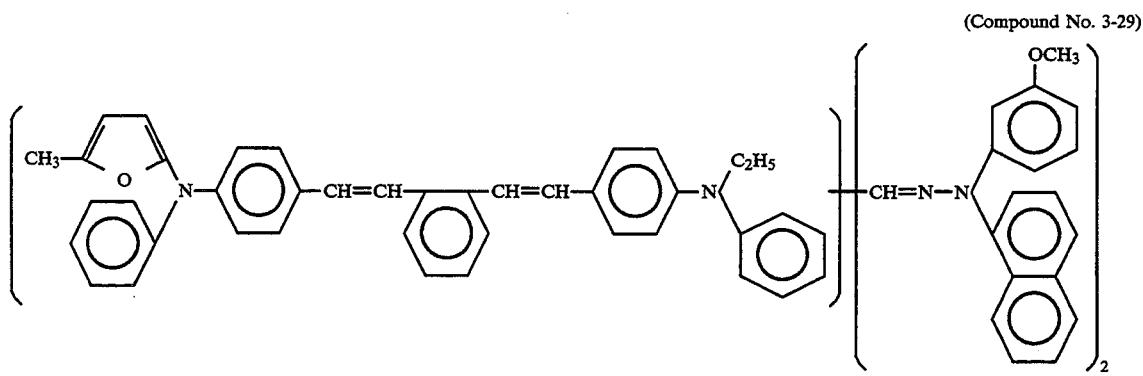
(Compound No. 3-29)
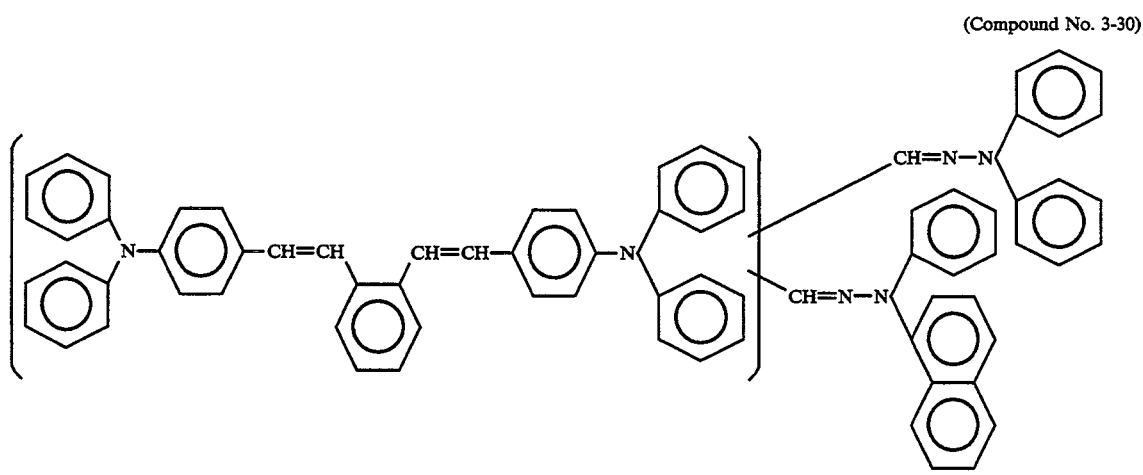
(Compound No. 3-30)

(Compound No. 3-31)
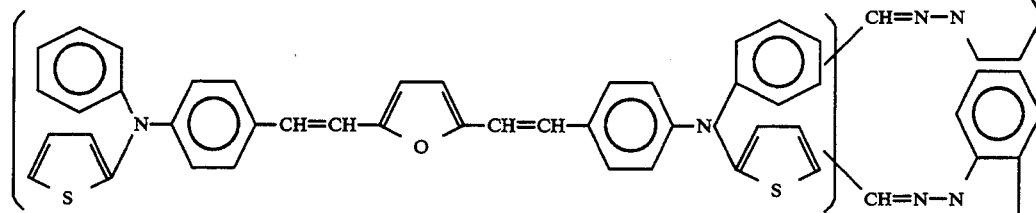
(Compound No. 3-32)
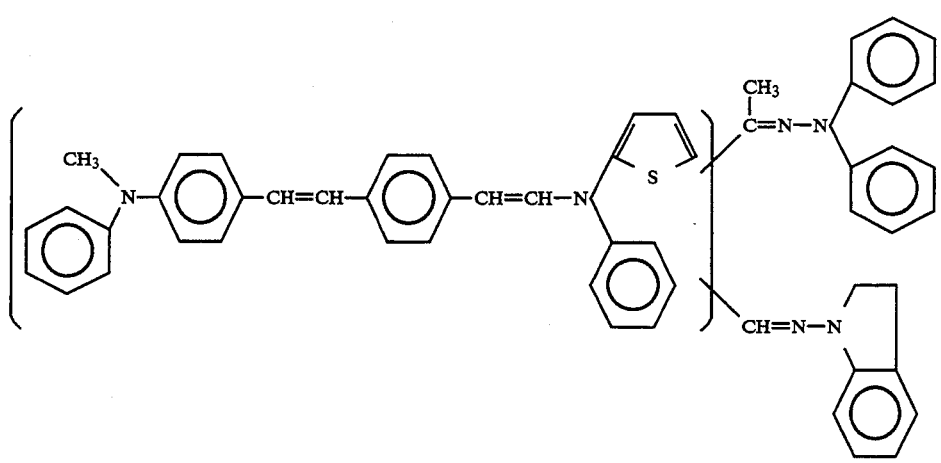
(Compound No. 3-33)
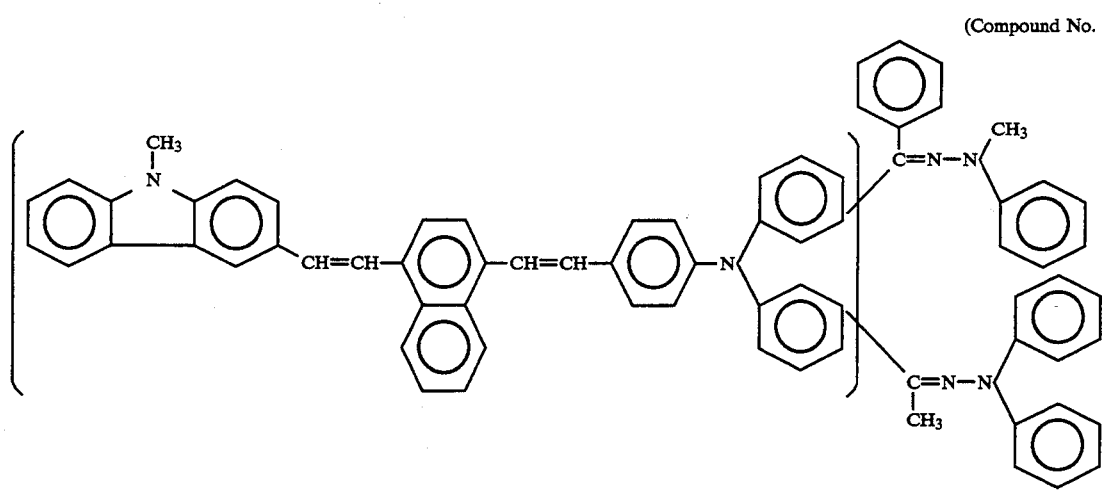
(A-III)
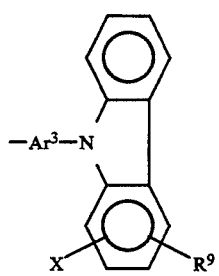

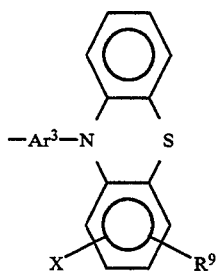
(A-IV)
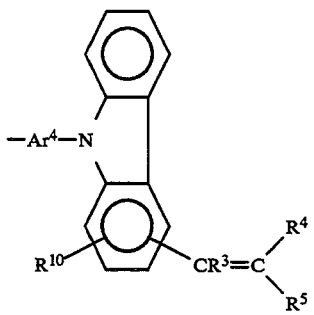
(A-V)
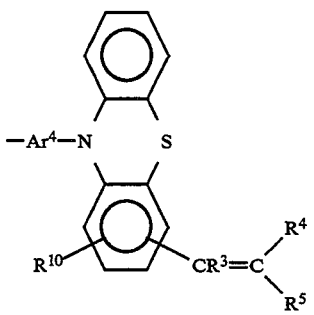
(A-VI)
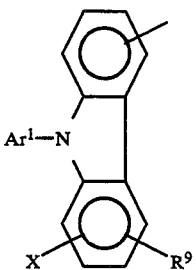
(A-VII)
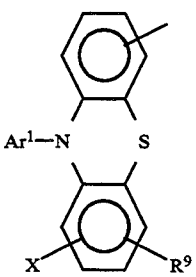
(A-VIII)

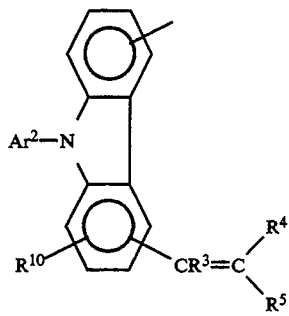

(A-IX)

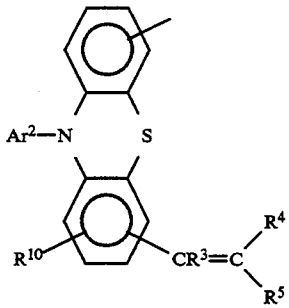

(A-X)

The stilbene compound of the above formula (I) can be prepared by a conventional method. A preferred method will be described with respect to cases where X=H and X is —C$^6$=C(R$^7$)R$^8$.

When X=H

Using a known stilbene compound as the starting material, a conventional carbonyl-introducing reaction is conducted, followed by a Wittig reaction to obtain the desired compound.

This method will be described in further detail as follows:

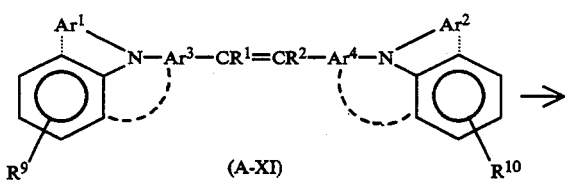

① When R$^3$=H

A stilbene compound of the formula (A-XI) (in the formulas (A-XI) and (A-XII), Ar$^1$, Ar$^2$, Ar$^3$, Ar$^4$, R$^1$, R$^2$, R$^9$ and R$^{10}$ are as defined with respect to the formula (I)) is reacted with a formylating agent such as N,N-dimethylformamide or N-methylformanilide in the presence of phosphorus oxychloride to obtain an aldehyde product of the formula (A-XII).

The formylating agent may be used in a large excess so that it serves as a solvent for the reaction. However, a solvent inert to the reaction such as o-dichlorobenzene or benzene may be employed.

② When R$^3$≠H

The stilbene compound of the formula-(A-XI) is reacted with an acid chloride of the formula Cl—CO—R$^3$ in a solvent such as nitrobenzene, dichloromethane or carbon tetrachloride in the presence of a Lewis acid such as alminum chloride, iron chloride or zinc chloride to obtain a ketone product of the formula (A-XII).

Then, the aldehyde or ketone of the formula (A-XII) and a Wittig reagent obtained by reacting a halide of the formula (A-XIII) (in the formula (A-XIII), R$^4$ and R$^5$ are as defined with respect to the formula (I), and X is a halogen atom such as a chlorine atom or a bromine atom, the same applies hereinafter) with triphenylphosphine in a known organic solvent inert to the reaction such as N,N-dimethylformamide, N,N-dimethylacetamide, tetrahydrofuran, dioxane, benzene or toluene, are reacted at a temperature of from 10° to 200° C., preferably from 20° to 100° C. in the presence of a known base such as butyl lithium, phenyl lithium, sodium methoxide, sodium ethoxide or potassium t-butoxide, to obtain a compound of the formula (I).

Here, a product of cis-form, trans-form or a mixture of cis- and trans-forms may be obtained. (Hereinafter, the formula (I) represents any one of the cis-form, the trans-form and the mixture of the cis- and trans-forms).

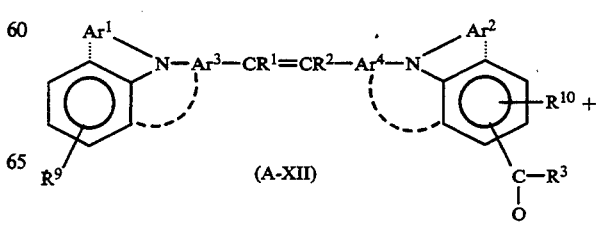

-continued

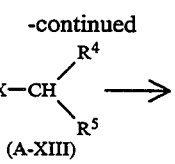
(A-XIII)

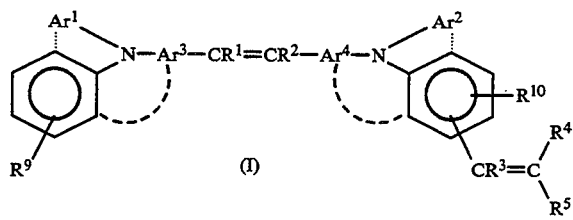

When $X=\!\!-CR^6\!=\!C(R^7)R^8$, there are two methods (1) For example, using a known stilbene compound as the starting material, a conventional carbonyl-introducing reaction is conducted, followed by a Wittig reaction to obtain the desired compound. This method will be described in detail, as follows:

The stilbene compound of the formula (A-XI) is reacted with an acid chloride of the formula Cl—CO—$R^3$ or Cl—CO—$R^6$ in a solvent such as nitrobenzene, dichloromethane or carbon tetrachloride in the presence of a Lewis acid such as aluminum chloride, iron chloride or zinc chloride to obtain a ketone product of the formula (A-XIV).

Further, in a case where $R^3$ and $R^6$ may be the same or different, and $R^6 \neq R^8$, the acid chloride to be added, may be mixed or stepwise added to accomplish the reaction. ③ When one of $R^3$ and $R^6$ is a hydrogen atom, and the other is not a hydrogen atom This can be accomplished by conducting the above two methods stepwisely.

Then, the obtained aldehyde or ketone of the formula (A-XIV) and a Wittig reagent obtained by reacting halides of the formulas (A-XIII) and (A-XV) (in the formula (A-XV), $R^7$ and $R^8$ are as defined with respect to the formula (I), and X is a halogen atom such as a chlorine atom or a bromine atom, the same applies hereinafter) in a known organic solvent inert to the reaction, such as N,N-dimethylformamide, N,N-dimethylaceta-

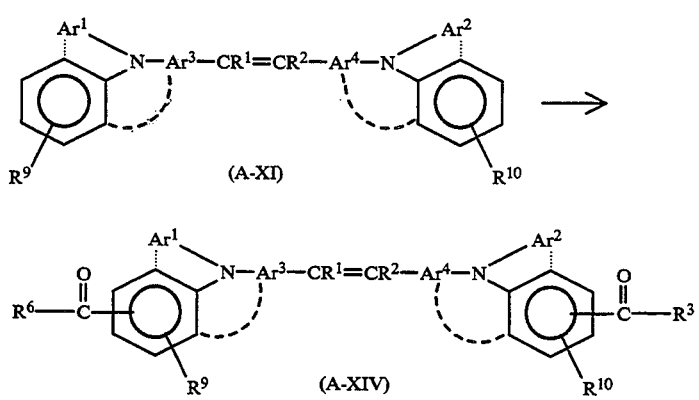

① When $R^3=R^6=H$

The stilbene compound of the formula (A-XI) is reacted with a formylating agent such as N,N-dimethylformamide or N-methylformanilide in the presence of phosphorus oxychloride to obtain an aldehyde product of the formula (A-XIV) (wherein $Ar^1$, $Ar^2$, $Ar^3$, $Ar^4$, $R^1$, $R^2$, $R^3$, $R^6$, $R^9$ and $R^{10}$ are as defined with respect to the formula (I)).

The formylating agent may be used in a large excess, so that it serves as a solvent for the reaction. However, a solvent inert to the reaction, such as o-dichlorobenzene or benzene, may be employed.

② When $R^3 \neq H$, and $R^6 \neq H$ mide, tetrahydrofuran, dioxane, benzene or toluene, are reacted at a temperature of from 10° to 200° C., preferably from 20° to 100° C., in the presence of a known base such as butyl lithium, phenyl lithium, sodium methoxide, sodium ethoxide or potassium t-butoxide, to obtain a compound of the formula (I).

Here, a product of cis-form, trans-form and a mixture of cis- and trans-forms may be obtained. (Hereinafter, the formula (I) represents any one of the cis-form, the trans-form and the mixture of the cis- and trans-forms. The compounds of the formulas (A-XIII) and (A-XV) may be used alone or in combination as a mixture. Otherwise, in some cases, they may be reacted stepwise.

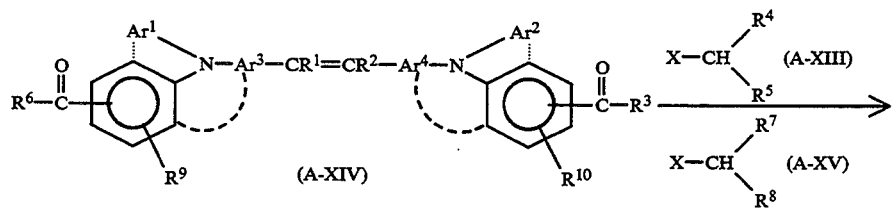

-continued

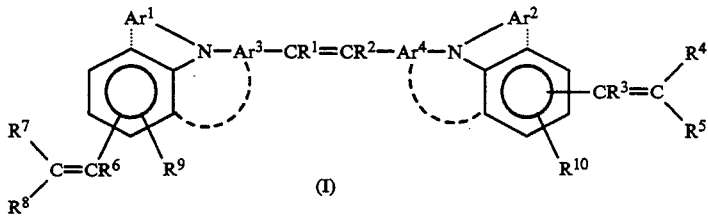

(I)

(2) For example, using a known stilbene compound, a conventional carbonyl-introducing reaction is conducted, followed by a two molecule condensation reaction to obtain the desired compound.

This method will be described in detail, as follows:

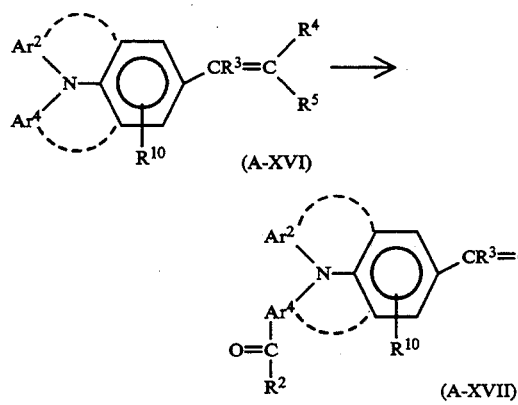

① When $R^2$=H

A stilbene compound of the formula (A-XVI) (in the formulas (A-XVI) and (A-XVII), $Ar^2$, $Ar^4$, $R^2$, $R^3$, $R^4$, $R^5$ and $R^{10}$ are as defined with respect to the formula (I)) is reacted with a formylating agent such as N,N-dimethylformamide or N-methylformanilide in the presence of phosphorus oxychloride to obtain an aldehyde product of the formula (A-XVII).

The formylating agent may be used in a large excess so that it serves as a solvent for the reaction. However, a solvent inert to the reaction, such as o-dichlorobenzene or benzene, may be employed.

② When $R^2 \neq H$

The stilbene compound of the formula (A-XVI) is reacted with an acid chloride of the formula Cl—CO—$R^4$ in a solvent such as nitrobenzene, dichloromethane or carbon tetrachloride in the presence of a Lewis acid such as aluminum chloride, iron chloride or zinc chloride, to obtain a ketone product of the formula (A-XVII).

Then, the aldehyde or ketone of the formulas (A-XVII) or (A-XVIII) (in the formula (A-XVIII), $Ar^1$, $Ar^3$, $R^1$, $R^6$, $R^7$, $R^8$ and $R^9$ are as defined with respect to the formula (I)) is reacted with a reagent prepared from e.g. titanium trichloride and potassium, titanium trichloride and lithium, titanium trichloride and lithium aluminium hydride, titanium trichloride and magnesium, titanium tetrachloride and lithium aluminium hydride, titanium tetrachloride and zinc, tungsten hexachloride and lithium aluminium hydride, or tungsten tetrachloride and butyl lithium, at room temperature or under heating in a known organic solvent inert to the reaction such as tetrahydrofuran or dioxane, or reacted with triethyl phosphite under heating, or reacted with a reagent prepared from chlorodiphenylphosphine and sodium hydride, under heating, to obtain a compound of the formula (I). Here, a product of cis-form, trans-form and a mixture of cis- and trans-forms may be obtained. (Hereinafter, the formula (I) represents any one of the cis-form, the trans-form and the mixture of the cis- and trans-forms.) To suppress side reactions, a tertiary amine such as pyridine, triethylamine, tri-n-butylamine or 1,8-bis(dimethylamino)naphthalene, may be added, as the case requires.

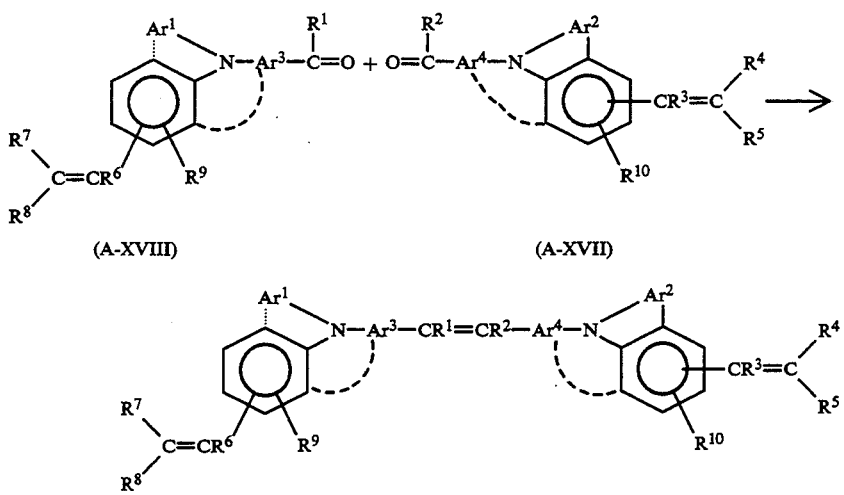

(A-XVIII)    (A-XVII)

In these reactions, after completion of the respective steps or after completion of the entire process, the product can be purified by a conventional purification method such as recrystallization, sublimation or column chromatography to obtain a high purity product, as the case requires. The bishydrazone compound of the above formula (II) can be prepared by a conventional method. For example, using an arylamine compound as the starting material, a conventional carbonyl-introducing reaction is conducted, followed by a dehydration reaction with an optional hydrazine to obtain the desired compound.

(a-1)

In a case where in the formula (II), $R^{16}$ and $R^{18}$ are hydrogen atoms, an amine compound of the formula (B-XIII) (in the formulas (B-XIII) and (B-XIV), $R^{11}$, $R^{12}$, $R^{13}$, $R^{14}$, $Ar^5$, $Ar^6$, $Y^1$, dotted line 5 and dotted line 6 are as defined with respect to the formula (II)) is reacted with a formylating agent such as N,N-dimethylformamide or N-methylformanilide in the presence of In a case where in the formula (I), each of $R^{16}$ and $R^{18}$ is other than a hydrogen atom, an arylamine compound of the formula (B-XIII) (in the formulas (B-XIII) and (B-XVI), $R^{11}$, $R^{12}$, $R^{13}$, $R^{14}$, $R^{16}$, $R^{18}$, $Ar^5$, $Ar^6$, $Y^1$, dotted line 5 and dotted line 6 are as defined with respect to the formula (II), and $R^{16}$ and $R^{18}$ may be the same or different) is reacted with an acid chloride of the formula Cl—CO—$R^{16}$ or Cl—CO—$R^{18}$ in a solvent such as nitrobenzene, dichloromethane or carbon tetrachloride in the presence of a Lewis acid such as aluminum chloride, iron chloride or zinc chloride, as shown below, to obtain a ketone product of the formula (B-XVI).

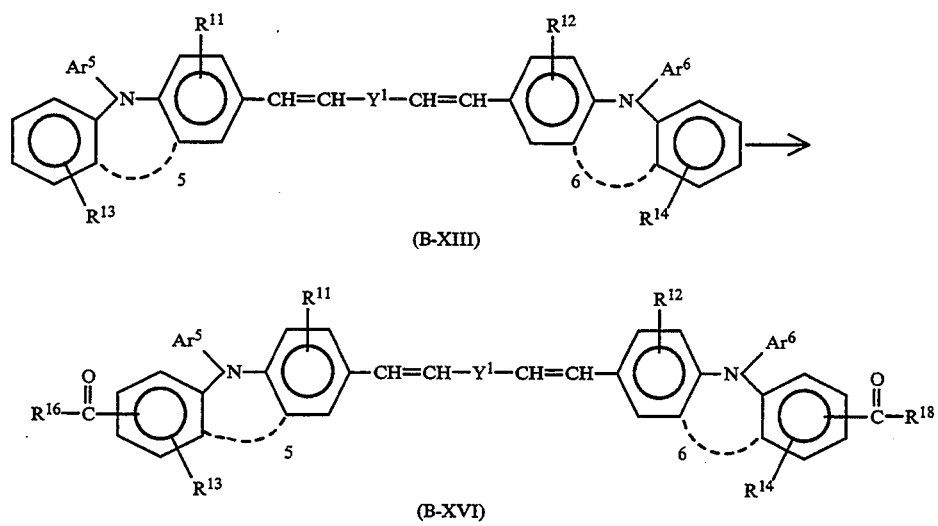

phosphorus oxychloride, as shown below, to obtain an aldehyde product of the formula (B-XIV). (Vilsmeyer reaction)

The formylating agent may be used in a large excess so that it serves as a solvent for the reaction. However, a solvent inert to the reaction such as o-dichlorobenzene or benzene may be employed.

(a-2)

Then, the obtained compound of the formula (B-XIV) is reacted with a hydrazine of the following formula (B-XV) a or b for dehydrative condensation, to obtain bishydrazone of the formula (II).

Here, $R^{17}$ and $R^{15}$, or $R^{19}$ and $R^{20}$ in the formula (B-XV)a or b may form together with the nitrogen atom a heterocyclic ring of the above formula (B-XIV), (B-V), (B-VI) or (B-VII).

The dehydrative condensation reaction may be conducted in a solvent inert to the reaction such as methanol, ethanol, tetrahydrofuran, cellosolve, N,N-dimethylformamide, benzene or toluene, if necessary under heating at a temperature of from 50° to 150° C., optionally by using an agent such as p-toluene sulfonic acid, hydrochloric acid or sodium acetate as a reaction accelerator. (Hydrazone-conversion reaction)

The compounds of the formulas (B-XV)a and (B-XV)b may be used alone or in combination as a mixture. Otherwise, in some cases, they may be reacted stepwisely.

(b-1)

When $R^{16}$ and $R^{18}$ may be the same or different, and $R^{16} \neq R^{18}$, the acid chloride to be added may be mixed or stepwisely added to accomplish the reaction.

(b-2)

(B-XVI)→(II) can be accomplished by the same reaction as in (a-2).

In these reactions, after completion of the respective steps or after completion of the entire process, the product may be purified by a conventional purification method such as recrystallization, sublimation or column chromatography to obtain a high purity product, as the case requires.

The hydrazone compound of the above formula (III) can be prepared by a conventional method.

For example, using a stilbene compound as the starting material, a conventional carbonyl-introducing reaction is conducted, followed by dehydration reaction with an optional hydrazine to obtain the desired compound.

(c-1)

In a case where in the formula (III), each of $R^{23}$ and $R^{24}$ is a hydrogen atom, a stilbene compound of the formula (C-XII) (in the formulas (C-XII) and (C-XIII), $Ar^7$, $Ar^8$, $Ar^9$, $Ar^{10}$, $R^{21}$, $R^{22}$ and $Y^2$ are as defined with respect to the formula (III), and l is 1 or 2) is reacted with a formylating agent such as N,N-dimethylformamide or N-methylformanilide in the presence of phosphorus oxychloride, as shown below, to obtain an aldehyde product of the formula (C-XIII). (Vilsmeyer reaction)

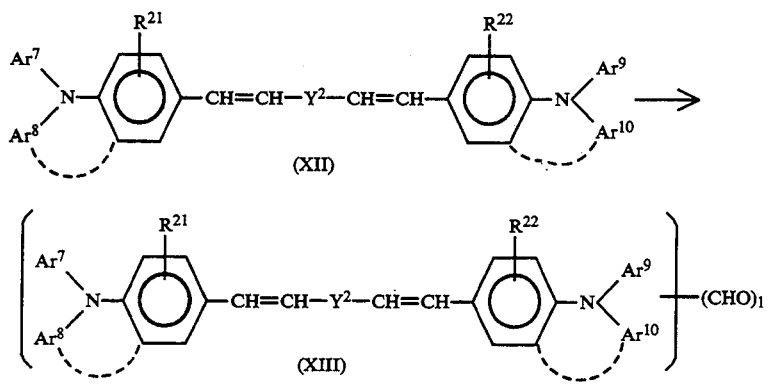

In this reaction, the product may be the one wherein l is 1, l is 2 or l is a mixture of 1 and 2.

The formylating agent may be used in a large excess so that it serves as a solvent for the reaction. However, a solvent inert to the reaction such as o-dichlorobenzene or benzene may be employed.

(c-2)

Then, the obtained compound of the formula (C-XIII) is reacted with hydrazines of the following formulas (C-XIV)a and b for dehydrative condensation to obtain a hydrazone of the formula (III).

Here, $R^{25}$ and $R^{26}$, or $R^{27}$ and $R^{28}$ in the formula (C-XIV)a or b may form together with the nitrogen atom, a heterocyclic ring of the above formula (C-III), (C-IV), (C-V) or (C-VI).

The dehydrative condensation reaction can be conducted in a solvent inert to the reaction such as methanol, ethanol, tetrahydrofuran, cellosolve, N,N-dimethylformamide, benzene or toluene, if necessary under heating at a temperature of from 50° to 150° C., optionally by using an agent such as p-toluene sulfonic acid, hydrochloric acid or sodium acetate as the reaction accelerator. (Hydrazone-conversion reaction)

Further, the compounds of the formulas (C-XIV)a and (C-XIV)b may be used alone or in combination as a mixture. Otherwise, in some cases, they may be reacted stepwisely.

(d-1).

In a case where in the formula (III), each of $R^{23}$ and $R^{24}$ is other than a hydrogen atom, a stilbene compound of the formula (C-XII) (in the formulas (C-XII) and (C-XV), $Ar^7$, $Ar^8$, $Ar^9$, $Ar^{10}$, $R^{21}$, $R^{22}$, $R^{23}$, $R^{24}$, m and n are as defined with respect to the formula (III)) is reacted with an acid chloride of the formula Cl—CO—$R^{23}$ or Cl—CO—$R^{24}$ in a solvent such as nitrobenzene, dichloromethane or carbon tetrachloride in the presence of a Lewis acid such as aluminum chloride, iron chloride or zinc chloride, as shown below, to obtain a ketone product of the formula (C-XV).

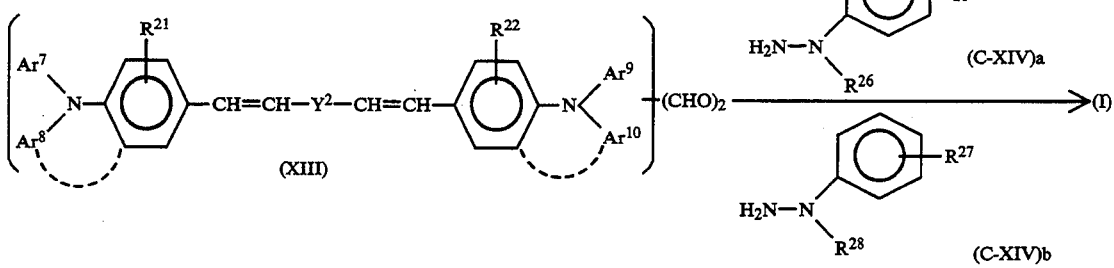

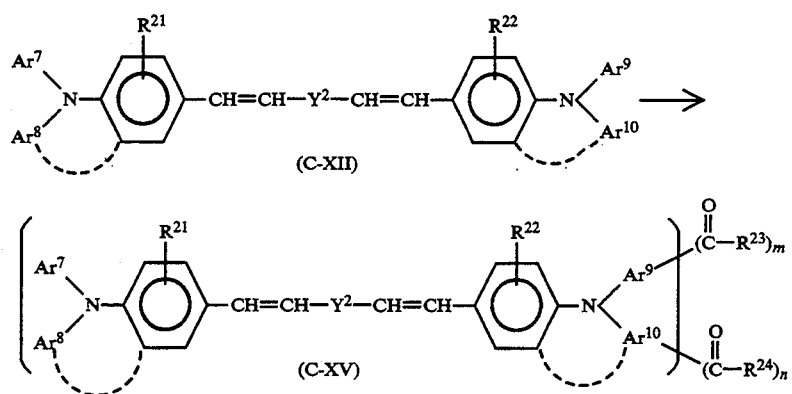

When $R^{23}$ and $R^{24}$ may be the same or different, and $R^{23}=R^{24}$ the acid chloride to be added, may be mixed or stepwisely added to accomplish the reaction.

In this reaction, the product may be a mixture of three compounds of ① (m=1, n=0), ② (m=0, n=1) and ③ (m=1, n=1).

(d-2)

(C-XV)→(III) can be accomplished by the same reaction as in (c-2).

In these reactions, after completion of the respective steps or after completion of the entire process, the product may be purified by a conventional purification method such as recrystallization, sublimation or column chromatography to obtain a highly pure product, as the case requires.

The electrophotographic photoreceptor of the present invention has a light sensitive layer containing at least one member selected from the group consisting of compounds of the above formulas (I), (II) and (III).

The compound of the formula (I), (II) or (III) exhibits excellent performance as an organic photoconductive material. Especially when used as a carrier transporting medium, it presents a photoreceptor having a high sensitivity and excellent durability.

Various formulations are known for photosensitive layers of electrophotographic photoreceptors. Any one of conventional formulations may be used for the photosensitive layer of the electrophotographic photoreceptor of the present invention. For example, it may be a photosensitive layer having at least one member selected from the group consisting of compounds of the formulas (I), (II) and (III) and, as the case requires, a colorant which serves as a sensitizer or an electron attracting compound, incorporated in a binder, a photosensitive layer having photoconductive particles capable of generating electric charge carriers at an extremely high efficiency upon absorption of light and at least one member selected from the group consisting of compounds of the formulas (I), (II) and (III) incorporated in a binder, or a photosensitive layer having a carrier transport layer comprising at least one member selected from the group consisting of compounds of the formulas (I), (II) and (III) and a binder and a carrier-generating layer comprising photoconductive particles capable of generating electric charge carriers at an extremely high efficiency upon absorption of light, or such particles and a binder, laminated.

Such a photosensitive layer may further contain a known other hydrazone compound or stilbenzene compound having excellent performance as an organic photoconductor, together with at least one member selected from the group consisting of compounds of the formulas (I), (II) and (III).

In the present invention, especially when at least one member selected from the group consisting of compounds of the formulas (I), (II) and (III) is used in the carrier transport layer of the photosensitive layer comprising two layers i.e. the carrier generation layer and the carrier transport layer, it is possible to obtain a photoreceptor which has a particularly high sensitivity and a low residual potential and which when used repeatedly, exhibits no substantial change in the surface potential or no substantial deterioration of the sensitivity and no substantial accumulation of the residual potential and has excellent durability.

The electrophotographic photoreceptor of the present invention can be prepared by a conventional method in such a manner that at least one member selected from the group consisting of compounds of the above formulas (I), (II) and (III), is dissolved together with a binder in a suitable solvent, and as the case requires, photoconductive particles capable of generating electric charge carriers at an extremely high efficiency upon absorption of light, a sensitizing dye, an electron attracting compound as well as a plasticizer, a pigment and other additives, are added thereto to obtain a coating solution, and such a coating solution is coated on a conductive support and dried to form a photosensitive layer usually having a film thickness of from a few μm to a few tens μm. In a case of a photosensitive layer comprising two layers i.e. a carrier generation layer and a carrier transport layer, the photoreceptor may be prepared either by coating the above coating solution on a carrier generation layer, or forming a carrier generation layer on a carrier transport layer obtained by coating the above coating solution.

The solvent for the preparation of the coating solution may be a solvent which is capable of dissolving the compound of the above formula (I), (II) or (III), for example, an ether such as tetrahydrofuran, 1,4-dioxane; a ketone such as methyl ethyl ketone or cyclohexanone; an aromatic hydrocarbon such as toluene or xylene; an aprotic polar solvent such as N,N-dimethylformamide, acetonitrile, N-methylpyrrolidone or dimethylsulfoxide; an ester such as ethyl acetate, methyl formate or methyl cellosolve acetate; or a chlorinated hydrocarbon such as dichloroethane or chloroform. Of course, it is necessary to select the one which is capable of dissolving the binder, among these solvents.

As the binder, various polymers compatible with a styrene compound may be employed, including polymers and copolymers of a vinyl compound such as styrene, vinyl acetate, vinyl chloride, an acrylate, a methacrylate or butadiene, polyvinylacetal, polycarbonate, polyester, polysulfone, polyphenylene oxide, polyurethane, cellulose ester, cellulose ether, a phenoxy resin, a silicone resin and an epoxy resin. The binder is used usually in an amount of from 0.5 to 30 times by weight, preferably from 0.7 to 10 times by weight, relative to the amount of at least one member (or the total amount of two or more members) selected from the group consisting of compounds of the above formulas (I), (II) and (III).

As the photoconductive particles, the sensitizing dye and the electron attracting compound to be added to the photosensitive layer, the respective conventional products can be used. The photoconductive particles capable of generating electric charge carriers at an extremely high efficiency upon absorption of light, may, for example, be inorganic photoconductive particles of e.g. selenium, a selenium-tellurium alloy, a sellenium-arsenic alloy, cadmium sulfide or amorphous silicon; or organic photoconductive particles of e.g. metal-containing phthalocyanine, perynone pigment, thioindigo, quinacridone, perylene pigment, anthraquinone pigment, azo pigment, bisazo pigment, trisazo pigment, tetrakisazo pigment or cyanine pigment. (Especially when metal-containing phthalocyanine is incorporated, a photoreceptor having improved sensitivity to a laser beam can be obtained. As the dye, a triphenylmethane dye such as Ethyl Violet, Brilliant Green or Crystal Violet, a thiazine dye such as Methylene Blue, a quirtone dye such as Quinizarin or a cyanine dye as well as a pyrylium salt, a thiapyrilium salt or a benzopyrylium salt, may be mentioned. Further, as the electron attracting compound which forms a carrier-transporting complex together with the stilbene compound, a quinone such as chloranil, 2,3-dichloro-1,4-naphthoquinone, 1-nitroanthraquinone, 1-chloro-5-nitroanthraquinone, 2-chloroanthraquinone or phenanthrenequinone; an aldehyde such as 4-nitrobenzaldehyde; a ketone such as 9-benzoylanthracene, indanedione, 3,5-dinitrobenzophenone, 2,4,7-trinitrofluorenone, 2,4,5,7-tetranitrofluorenone or 3,3',5,5'-tetranitrobenzophenone; an acid anhydride such as phthalic anhydride or 4-chloronaphthalic anhydride; a cyano compound such as tetracyanoethylene, terephthalalmalononitrile, 9-anthrylmethylidenemalononitrile, 4-nitrobenzalmalononitrile or 4-(p-nitrobenzoyloxy)benzalmalononitrile; or a phthalide such as 3-benzalphthalide, 3-(α-cyano-p-nitrobenzal)phthalide or 3-(α-cyano-p-nitrobenzal)-4,5,6,7-tetrachlorophthalide, may be mentioned.

Further, the photosensitive layer of the electrophotographic photoreceptor of the present invention may contain a well-known plasticizer to improve the film-forming properties, the flexibility or the mechanical strength. As the plasticizer to be incorporated to the above coating solution for this purpose, an aromatic compound such as a phthalic acid ester, a phosphoric acid ester, an epoxy compound, chlorinated paraffin, a chlorinated fatty acid ester or methyl naphthalene, may be mentioned. In a case where the stilbene compound is used as the carrier-transporting medium in the carrier transport layer, the coating solution may be of the above composition, but the photoconductive particles, the dye and the electron attracting compound may be eliminated or may be incorporated in small amounts. In this case, the carrier generation layer may be a thin layer formed by coating and drying a coating solution obtained by dissolving or dispersing the above photoconductive particles and optionally a binder polymer, an organic photoconductive material, a dye and an electron attractive compound in a solvent, or a layer obtained by forming the above photoconductive particles into a film by a method such as vapor deposition.

The photoreceptor thus formed, may, of course, have an adhesive layer, an inter layer or a transparent insulating layer, as the case requires. As a conductive substrate on which the photosensitive layer is formed, any substrate which is commonly employed in conventional electrophotographic photoreceptors, may be employed. Specifically, a drum or sheet of metal such as aluminum, stainless steel or copper, or a laminate of foils of such metal or a vapor deposited product of such metal, may be mentioned. Further, a plastic film, a plastic drum, paper or a paper tube having a conductive material such as metal powder, carbon black, copper iodide or polymer electrolyte coated together with a suitable binder for conductive treatment, may be mentioned. Or, a plastic sheet or drum having a conductive material such as metal powder, carbon black or carbon fiber incorporated to have electrical conductivity, may be mentioned.

The electrophotographic photoreceptor of the present invention has a feature that the sensitivity is very high, the residual potential which causes fogging, is small, and light fatigue is little, whereby it is excellent in the durability with no substantial accumulation of the residual potential and no substantial change in the surface potential and the sensitivity.

Now, the present invention will be described in further detail with reference to Examples. However, it should be understood that the present invention is by no means restricted to such specific Preparation Examples and Working Examples. In the following Examples, "parts" means "parts by weight".

Preparation Example 1

1.2 g of bis (p-diphenylamino)-1,2-diphenylethylene of the formula:

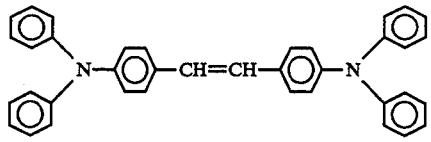

was dissolved in 24 ml of N,N-dimethylformamide, and then 1.1 ml of phosphorus oxychloride was added thereto. The mixture was then reacted at 80° C. for 7 hours.

After cooling, the reaction solution was put into 200 g of ice water and hydrolyzed with sodium hydroxide, followed by extraction, concentration and purification treatments by conventional methods to obtain 0.4 g of a brown oil.

From the following results of the elemental analysis, the mass spectrometry, and the infrared absorption spectrum measurement, this compound was found to have the structure as identified below. Elemental analysis: as $C_{39}H_{30}ON_2$

| Elemental analysis: as $C_{39}H_{30}ON_2$ | | | |
|---|---|---|---|
| | C % | H % | N % |
| Calculated | 86.32 | 5.57 | 5.16 |
| Found | 86.20 | 5.70 | 5.11 |

Results of mass spectrometry: as $C_{39}H_{30}ON_2$, MW=542 M+=542

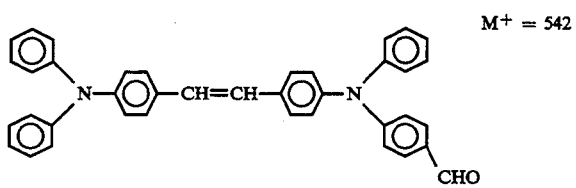

Preparation Example 2

0.4 g of the compound prepared in Preparation Example 1 and 0.6 g of p-methylbenzyltriphenylphosphonium bromide were dissolved in 7 ml of N,N-dimethylformamide, and,0.3 g of a solution containing 28% of sodium methoxide in methanol was dropwise added thereto. Then, the mixture was reacted at 65° C. for two hours. After cooling, the reaction solution was put into 100 g of ice water, followed by extraction, concentration and purification treatments by conventional methods to obtain 0.3 g of a yellow oil.

From the following results of the elemental analysis, the mass spectrometry, and the infrared absorption spectrum measurement (FIG. 1), this compound was found to have the structure as identified below.

| Elemental analysis: as $C_{47}H_{38}ON_2$ | | | |
|---|---|---|---|
| | C % | H % | N % |
| Calculated | 89.49 | 6.07 | 4.44 |

-continued

| Elemental analysis: as $C_{47}H_{38}ON_2$ | | | |
|---|---|---|---|
| | C % | H % | N % |
| Found | 89.46 | 6.23 | 4.31 |

Results of mass spectrometry: as $C_{47}H_{38}ON_2$, MW=630 M+ +1=631

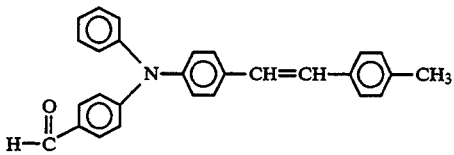

$M^+ = 389$

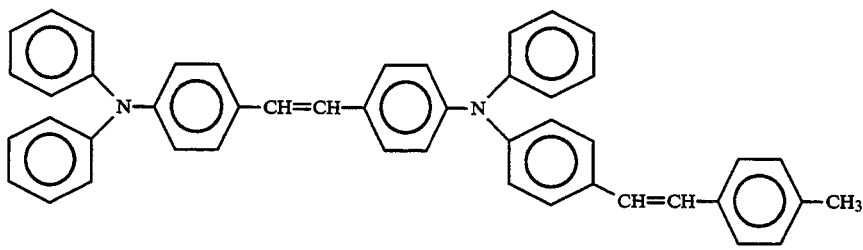

$M^+ + 1 = 631$

Preparation Example 3

2.0 g of the compound of the formula:

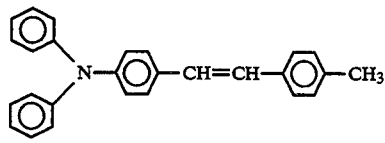

was dissolved in 20 ml of N,N-dimethylformamide, and then 0.8 ml of phosphorus oxychloride was added thereto. The mixture was then reacted at 75° C. for one hour.

After cooling, the reaction solution was put into 200 g of ice water and hydrolyzed with sodium hydroxide, followed by extraction, concentration and purification treatments by conventional methods to obtain 1.1 g of an orange-colored oil.

From the following results of the elemental analysis, the mass spectrometry, and the infrared absorption spectrum measurement, this compound was found to have the structure as identified below.

| Elemental analysis: as $C_{28}H_{23}ON$ | | | |
|---|---|---|---|
| | C % | H % | N % |
| Calculated | 86.34 | 5.95 | 3.60 |
| Found | 86.55 | 6.01 | 3.43 |

Results of mass spectrometry: as $C_{28}H_{23}ON$, MW=389 M+=389

Preparation Example 4

Figure 2:
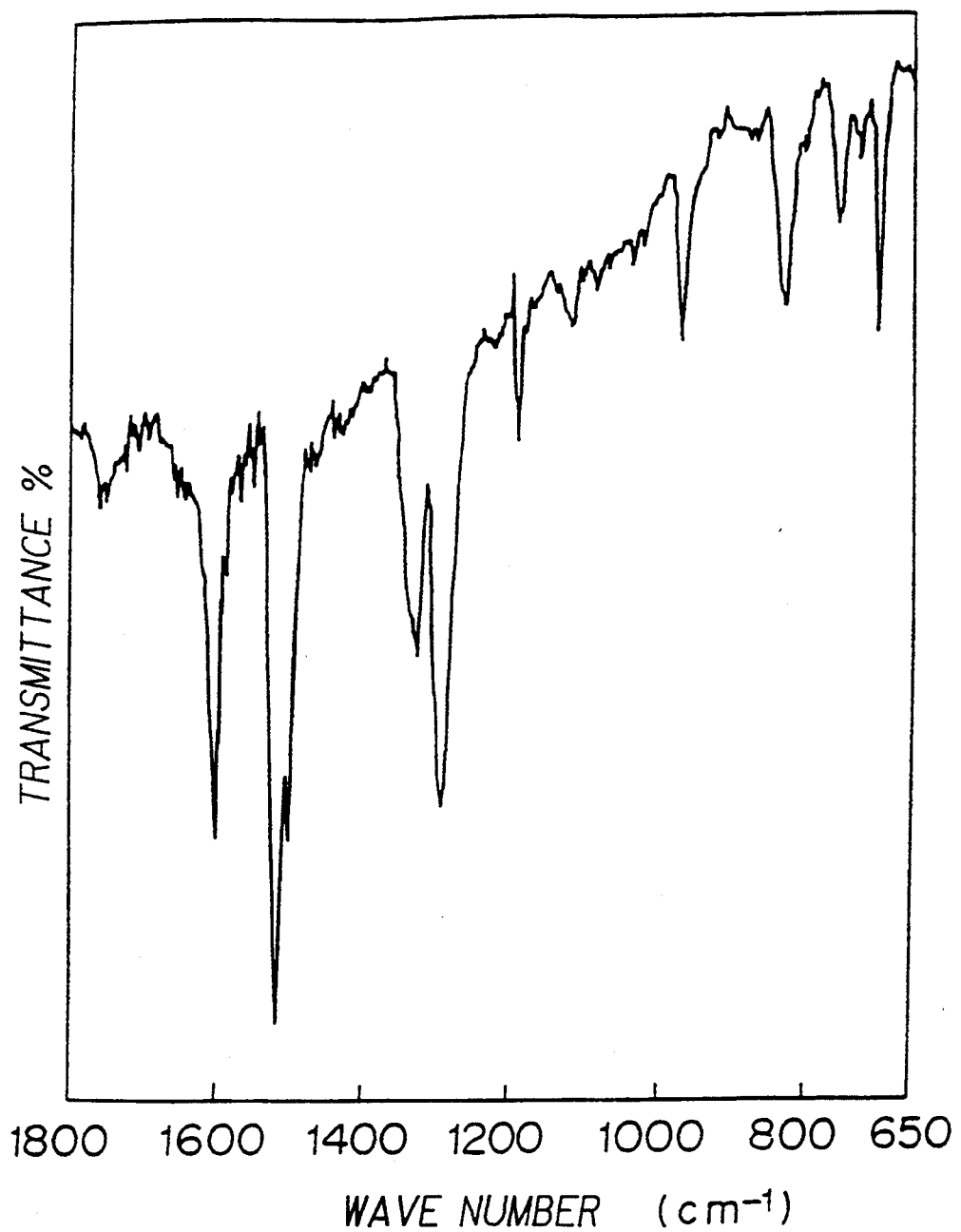
FIG. 2 is an infrared absorption spectrum of the stilbene compound obtained in Preparation Example 4.

Under a nitrogen stream, 1.9 g of titanium tetrachloride was dropwise added to 40 ml of tetrahydrofuran at room temperature. Then, at the same temperature, 0.2 g of lithium aluminium hydride was added thereto. The mixture was then refluxed under heating for 20 minutes. Then, 0.8 g of the compound prepared in Preparation Example 3 and 2 ml of a solution containing 0.4 g of tri-n-butylamine in tetrahydrofuran were dropwise added to the reaction system under reflux by heating. The mixture was then reacted for 20 minutes under reflux by heating. After cooling, a 20% potassium carbonate aqueous solution was added to the reaction solution under cooling with ice until the solution became alkaline. Further, the reaction solution was filtered through Celite, and the filtrate was subjected to liquid separation, concentrated and purification treatments by conventional methods to obtain slightly yellow crystals (melting point: 119°–121° C.). From the following results of the elemental analysis, the mass spectrometry, and the infrared absorption spectrum measurement (FIG. 2), this compound was found to have the structure as identified below. (Compound No. 14)

| Elemental analysis: as $C_{56}H_{46}N_2$ | | | |
|---|---|---|---|
| | C % | H % | N % |
| Calculated | 90.04 | 6.21 | 3.75 |
| Found | 89.91 | 6.43 | 3.66 |

Results of mass spectrometry: as $C_{56}H_{46}N_2$, MW=746 M+=746

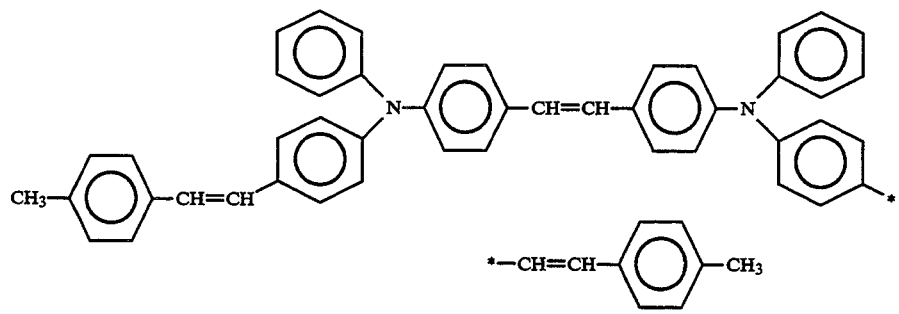

Example 1

1.0 part of titanium oxyphthalocyanine pigment and 0.5 part of polyvinylbutyral (polyvinylbutyral #6000, tradename, manufactured by Denki Kagaku Kogyo K.K.) were dispersed and pulverized in 30 parts of 4-methoxy-4-methylpentanone-2 (manufactured by Mitsubishi Kasei Corporation).

This dispersed liquid was coated by means of a wire bar, on an aluminum layer vapor-deposited on a polyester film having a film thickness of 100 μm, so that the weight after drying would be 0.2 g/m², followed by drying to form a carrier generation layer.

On this layer, a coating solution having 70 parts of the stilbene compound prepared in Preparation Example 2 and 100 parts of a polycarbonate resin of the formula:

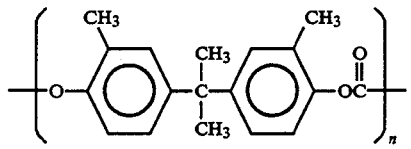

dissolved in 900 parts of dioxane, was coated and dried to form a carrier transport layer having a film thickness of 17 μm.

With respect to the electrophotographic photoreceptor having a photosensitive layer comprising the two layers thus formed, the sensitivity i.e. the half value exposure was measured and found to be 2.2 $(\mu W/cm^2)^{-1}$.

The half value exposure was determined in such a manner that firstly, the photoreceptor was charged by corona discharge at −4.8 kV in a dark place and then subjected to exposure with a light of 775 nm, whereby the exposure required for attenuation of the surface potential from 500 V to 250 V was measured.

Example 2

A photoreceptor was prepared in the same manner as in Example 1 except that disazo pigment of the following formula was used instead of the phthalocyanine pigment used in Example 1. The photoreceptor was subjected to exposure, and the half value exposure was measured and found to be 1.3 lux.sec.

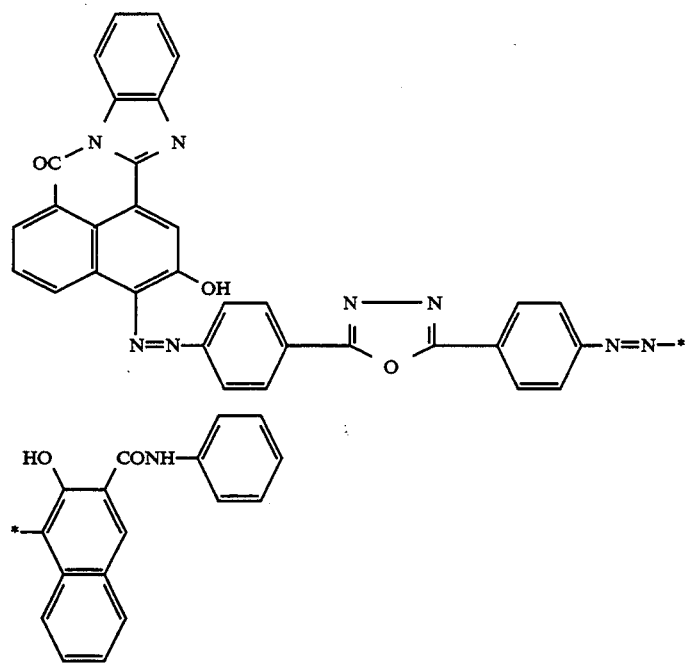

Examples 3 To 10

The sensitivity of the electrophotographic photoreceptor obtained by using the stilbene compound as identified in the following Table 1 prepared in the same manner as in Preparation Example 2 or 4, instead of the stilbene compound used in Example 1, and by using the same titanium oxyphthalocyanine pigment as used in Example 1, is shown in Table 1.

TABLE 1

| Example No. | Compound No. | Sensitivity $(\mu W/cm^2)^{-1}$ |
|---|---|---|
| 3 | 1-2 | 2.2 |
| 4 | 1-6 | 1.3 |
| 5 | 1-7 | 0.9 |
| 6 | 1-12 | 1.3 |
| 7 | 1-14 | 2.8 |
| 8 | 1-18 | 1.0 |
| 9 | 1-21 | 1.7 |
| 10 | 1-25 | 1.5 |

Preparation Example 5

1.0 g of bis(p-diphenylamino)-1,8-diphenyl-1,7-octadiene of the formula:

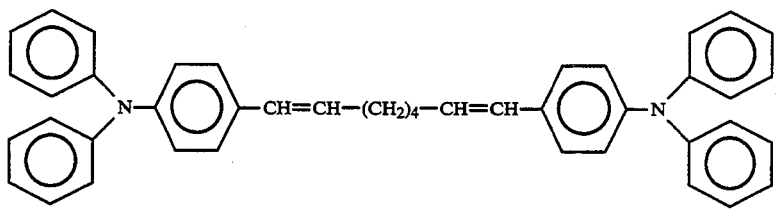

was dissolved in 20 ml of N,N-dimethylformamide, and then 0.53 ml of phosphorus oxychloride was added. The mixture was then reacted at 60° C. for 1 hour and 30 minutes.

After cooling, the reaction solution was put into 150 g of ice water and hydrolyzed with sodium hydroxide, followed by extraction, concentration and purification treatments by conventional methods, to obtain 0.9 g of a yellow oil.

From the following results of the elemental analysis, the mass spectrometry, and the infrared absorption spectrum measurement, this compound was found to have the structure as identified below.

| Elemental analysis: as $C_{46}H_{40}O_2N_2$ | | | |
|---|---|---|---|
| | C % | H % | N % |
| Calculated | 84.63 | 6.18 | 4.29 |
| Found | 84.53 | 6.32 | 4.35 |

Results of mass spectrometry: as $C_{46}H_{40}O_2N_2$, MW=652 M+=652

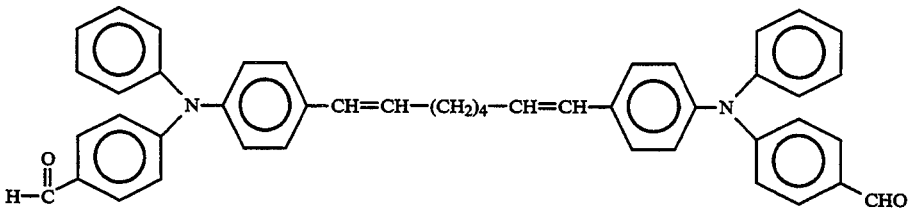

Preparation Example 6

0.9 g of the compound prepared in Preparation Example 5 and 1.0 g of 1,1-diphenylhydrazine were reacted at room temperature for 12 hours in a solvent mixture comprising 9 ml of tetrahydrofuran and 5 ml of methanol in the presence of acetic acid catalyst.

Then, the reaction solution was put into 200 ml of methanol, followed by filtration and purification treatments by conventional methods, to obtain 0.7 g of a yellow oil.

Figure 3:
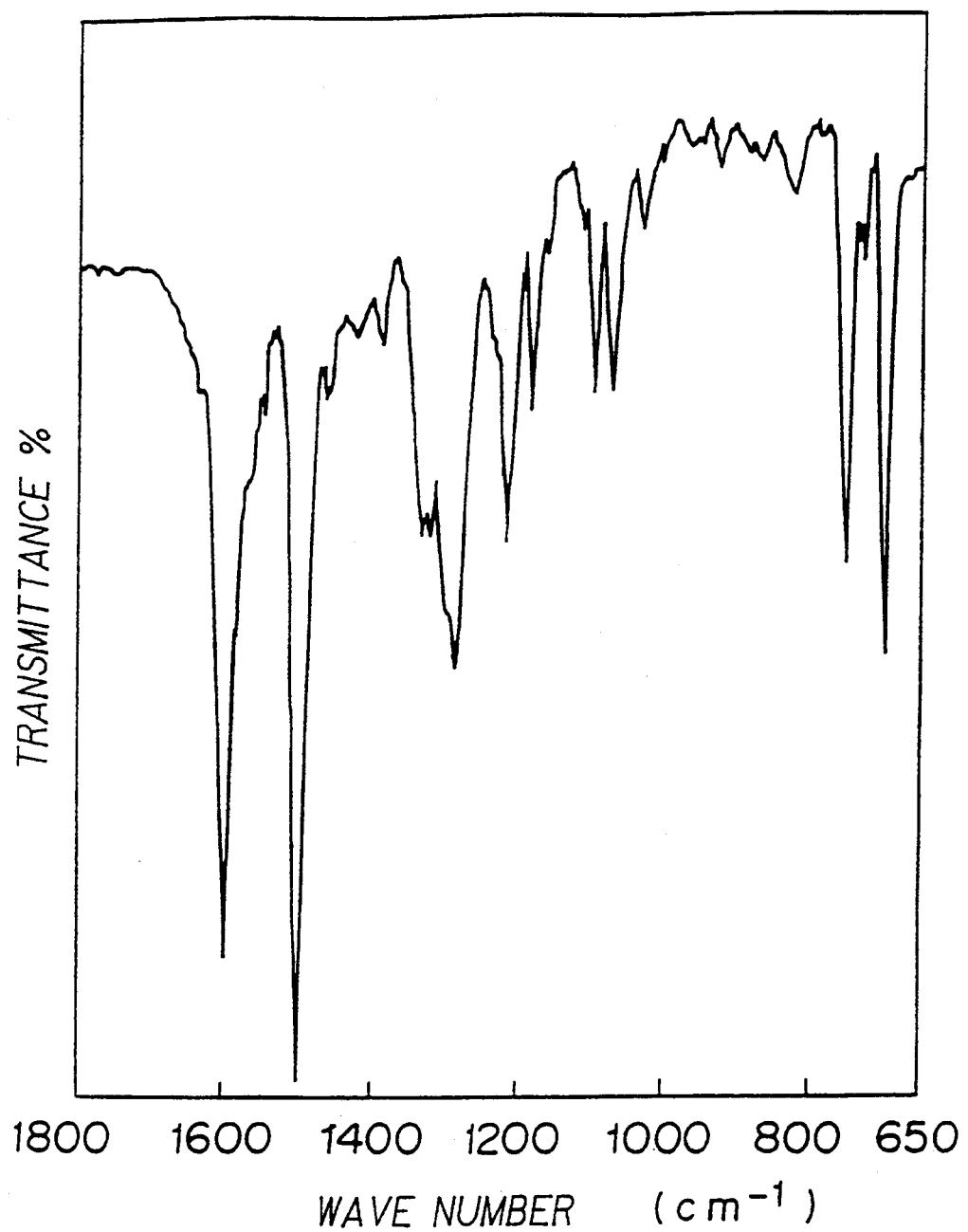
FIG. 3 is an infrared absorption spectrum of the bishydrazone compound obtained in Preparation Example 6.

From the following results of the elemental analysis, the mass spectrometry, and the infrared absorption spectrum measurement (FIG. 3), this compound was found to be a bishydrazone compound of the formula as identified below.

| Elemental analysis: as $C_{70}H_{60}N_6$ | | | |
|---|---|---|---|
| | C % | H % | N % |
| Calculated | 85.33 | 6.14 | 8.53 |
| Found | 85.50 | 6.02 | 8.48 |

Results of mass spectrometry: as $C_{70}H_{60}N_6$, MW=984 M+ +1=985

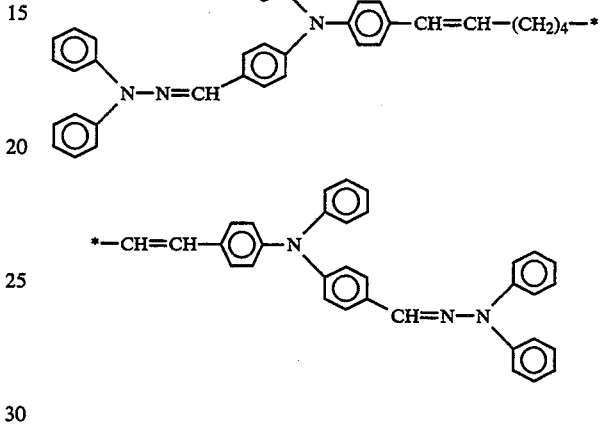

Example 11

1.0 part of titanium oxyphthalocyanine pigment and 0.5 part of polyvinylbutyral (polyvinylbutyral #6000, tradename, manufactured by Denki Kagaku Kogyo K. K.) more dispersed and pulverized in 30 parts of 4-methoxy-4-methylentanone-2 (manufactured by Mitsubishi Kasei Corporation).

This dispersed liquid was coated by means of a wire bar on an aluminum layer vapor-deposited on a polyester film having a film thickness of 100 $\mu$m, so that the weight after drying would be 0.2 g/m$^2$, followed by drying to form a carrier generation layer.

On this layer, a coating solution having 70 parts of the bishydrazone compound prepared in Preparation Example 2 and 100 parts of a polycarbonate resin of the following formula dissolved in 900 parts of dioxane, was coated and dried to form a carrier transport layer having a film thickness of 17 $\mu$m.

With respect to the electrophotographic photoreceptor having a photosensitive layer comprising the two layers thus formed, the sensitivity i.e. the half value exposure was measured and found to be 2.2 ($\mu$W/cm$^2$)$^{-1}$.

The half value exposure was determined in such a manner that firstly the photoreceptor was charged by corona discharge at −4.8 kV in a dark place and then subjected to exposure with a light of 775 nm, whereby the exposure required for attenuation of the surface potential from 500 V to 200 V was measured.

Example 12

A photoreceptor was prepared in the same manner as in Example 1 except that a disazo pigment of the following formula was used instead of the phthalocyanine pigment used in Example 1. The photoreceptor was subjected to exposure, and the half value exposure was measured and found to be 1.3 lux.sec.

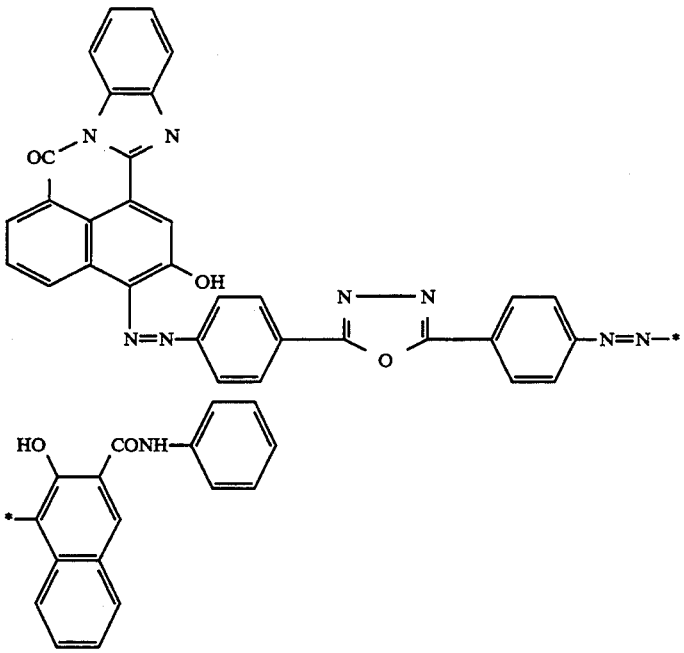

Examples 13 To 20

The sensitivity of the electrophotographic photoreceptor obtained by using a bishydrazone compound as identified in the following Table 2 prepared in the same manner as in Preparation Example 6, instead of the bishydrazone compound used in Example 11, and by using the same titanium oxyphthalocyanine pigment as used in Example 11 for the carrier generation layer, is shown in Table 2.

TABLE 2

| Example No. | Compound No. | Sensitivity $(\mu W/cm^2)^{-1}$ |
|---|---|---|
| 13 | 2-2 | 2.2 |
| 14 | 2-4 | 2.0 |
| 15 | 2-7 | 2.0 |
| 16 | 2-10 | 1.0 |
| 17 | 2-11 | 1.5 |
| 18 | 2-12 | 1.4 |
| 19 | 2-15 | 0.9 |
| 20 | 2-20 | 1.6 |

Comparative Example 1

An electrophotographic photoreceptor was prepared in the same manner as in Example 11 except that bishydrazone compound as identified in the following Table 3 was used instead of the bishydrazone compound used in Example 11.

Each photoreceptor was charged by corona discharge at −4.8 kV in a dark place, and the surface potential at that time was measured as the initial surface potential. Then, in the same manner as in Example 11, the sensitivity was measured, and then the surface potential when the photoreceptor was thoroughly exposed, was measured as the residual potential.

These results are shown in Table 3 together with the results of measurements with respect to the photoreceptor of Example 11.

TABLE 3

| | Initial surface potential (V) | Sensitivity $(\mu W/cm^2)^{-1}$ | Residual Potential (V) |
|---|---|---|---|
| Comparative Example 1 (Above compound) | 701 | 2.1 | 23 |
| Example 11 | 615 | 2.2 | 8 |

It is evident that the present invention is excellent particularly in the residual potential as compared with the Comparative Example.

Preparation Example 7

1.0 g of the compound of the formula:

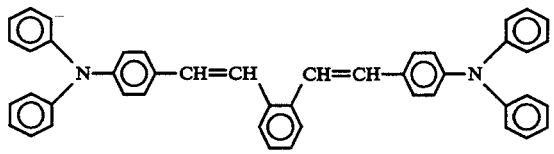

was dissolved in 20 ml of N,N-dimethylformamide, and then 0.53 ml of phosphorus oxychloride was added thereto. The mixture was then reacted at 60° C. for one hour and thirty minutes.

After cooling, the reaction solution was put into 150 g of ice water and hydrolyzed with sodium hydroxide, followed by extraction, concentration and purification treatments by conventional methods to obtain 0.4 g of a monoformylated compound as a brown oil and 0.8 g of a bisformylated compound as a brown oil.

From the following results of the elemental analysis, the mass spectrometry and the infrared spectrum measurement, these compounds were found to have the structures as identified below, respectively.

① Monoformylated compound

| Elemental analysis: as $C_{47}H_{36}N_2O$ | | | |
|---|---|---|---|
| | C % | H % | N % |
| Calculated | 87.55 | 5.63 | 4.34 |
| Found | 87.39 | 5.75 | 4.25 |

Results of mass spectrometry: as $C_{47}H_{36}N_2O$, MW=644 M++1=644

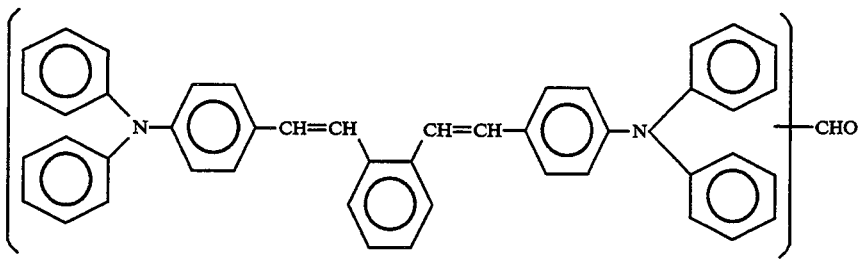

② Bisformylated compound

| Elemental analysis: as $C_{48}H_{36}N_2O_2$ | | | |
|---|---|---|---|
| | C % | H % | N % |
| Calculated | 85.69 | 5.39 | 4.16 |
| Found | 85.79 | 5.30 | 4.01 |

Results of mass spectrometry: as $C_{48}H_{36}N_2O_2$, MW=672 M++1=672

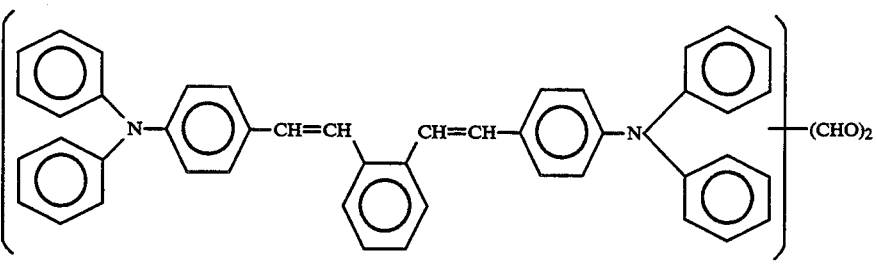

Preparation Example 8

0.4 g of the monoformylated compound prepared in Preparation Example 7 and 0.4 g of 1,1-diphenylhydrazine were reacted at room temperature for 15 hours in a solvent mixture comprising 4 ml of tetrahydrofuran and 2 ml of methanol in the presence of acetic acid catalyst. Then, the reaction solution was put into 200 ml of methanol, followed by filtration and purification treatments by conventional methods to obtain 0.2 g of yellow crystals (melting point: 123°–125° C.).

Figure 4:
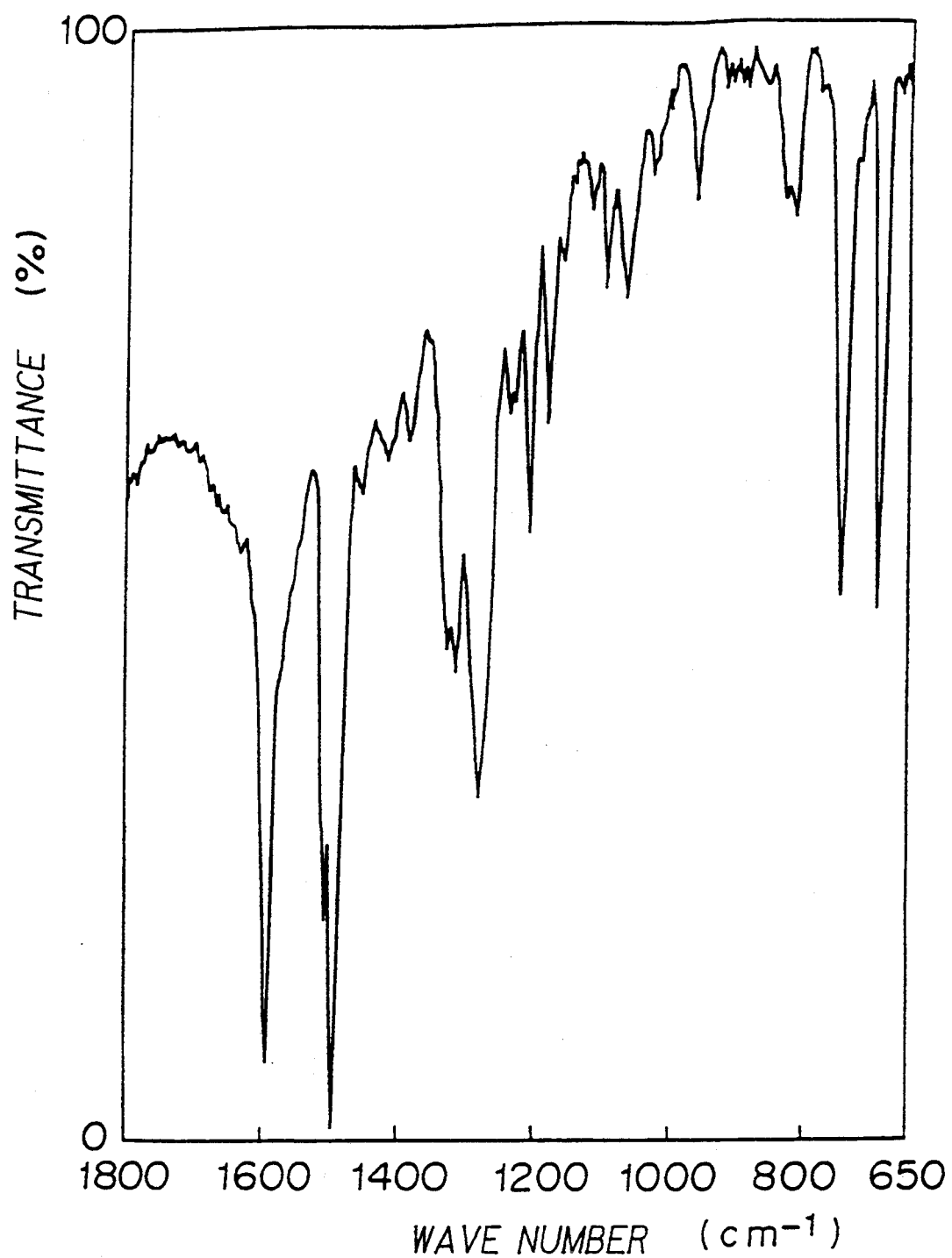
FIG. 4 is an infrared absorption spectrum of the monohydrazone compound obtained in Preparation Example 8.

From the following results of the elemental analysis, the mass spectrometry, and the infrared absorption spectrum measurement (FIG. 4), this compound was found to be a monohydrazone compound (Compound No. 3-5) of the structure as identified below.

| Elemental analysis: as $C_{59}H_{46}N_4$ | | | |
|---|---|---|---|
| | C % | H % | N % |
| Calculated | 87.37 | 5.72 | 6.91 |
| Found | 87.31 | 5.83 | 6.86 |

Results of mass spectrometry: as $C_{59}H_{46}N_4$, MW=810 M+=810

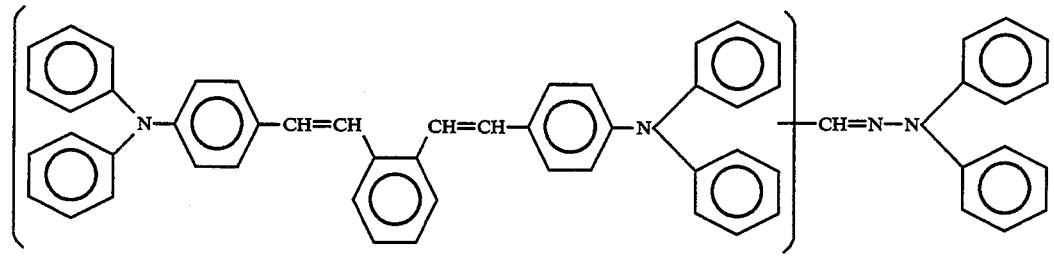

Preparation Example 9

0.8 g of the bisformylated compound prepared in Preparation Example 7 and 0.9 g of 1,1-diphenylhydrazine were reacted at room temperature for 15 hours in a solvent mixture comprising 8 ml of tetrahydrofuran and 4 ml of methanol in the presence of acetic acid catalyst. Then, the reaction solution was put into 200 ml of methanol, followed by filtration and purification treatments by conventional methods to obtain 0.5 g of yellow crystals (melting point: 142°–144° C.).

Figure 5:
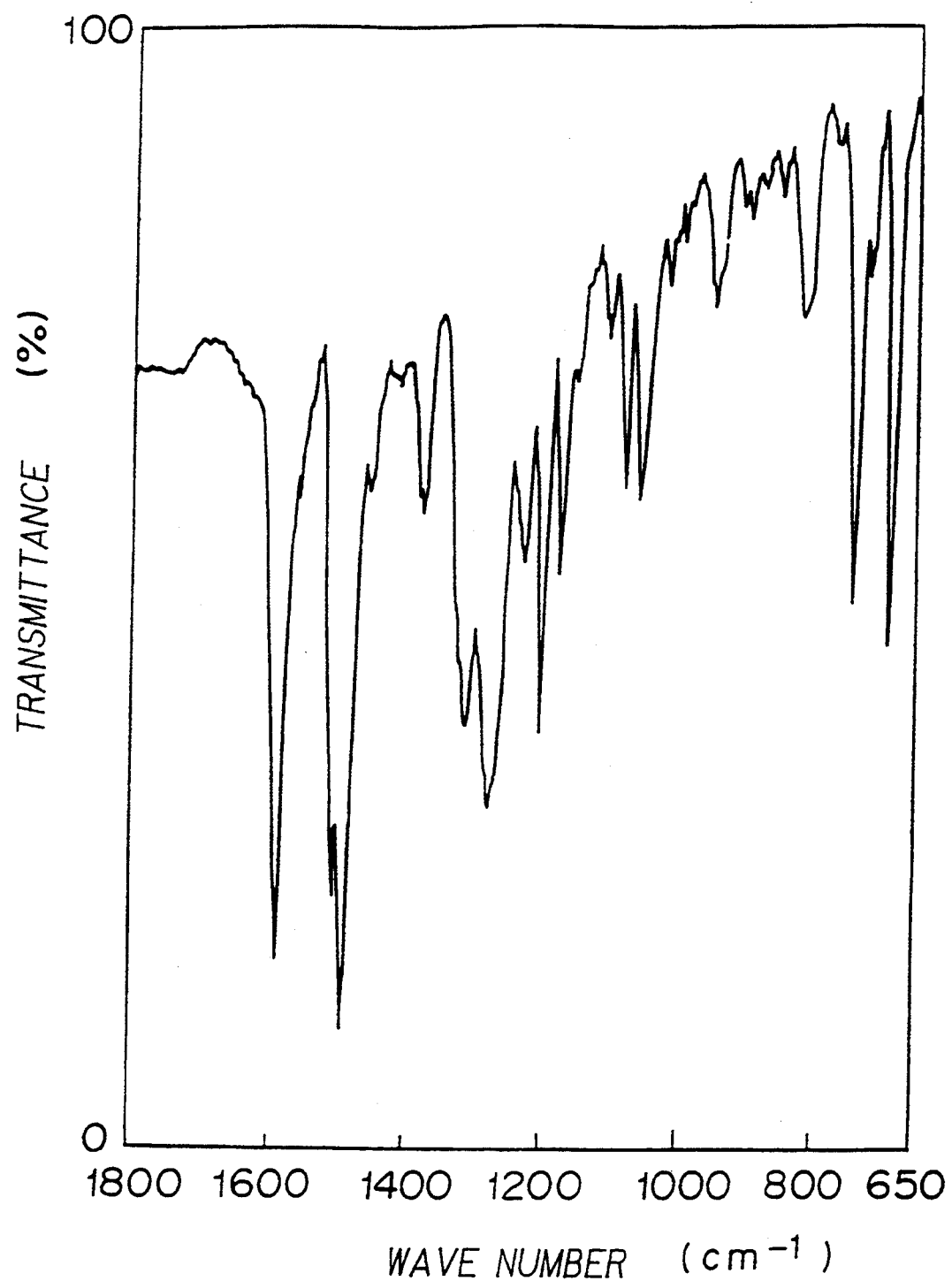
FIG. 5 is an infrared absorption spectrum of the bishydrazone compound obtained in Preparation Example 9.

From the following results of the elemental analysis, the mass spectrometry, and the infrared absorption spectrum measurement (FIG. 5), this compound was found to be a bishydrazone compound (Compound No. 3-20) of the structure as identified below.

| Elemental analysis: as $C_{74}H_{56}N_6$ | | | |
|---|---|---|---|
| | C % | H % | N % |
| Calculated | 86.03 | 5.61 | 8.36 |
| Found | 86.10 | 5.76 | 8.14 |

Results of mass spectrometry: as $C_{74}H_{56}N_6$, MW=1004
$M^+ + 1 = 1005$

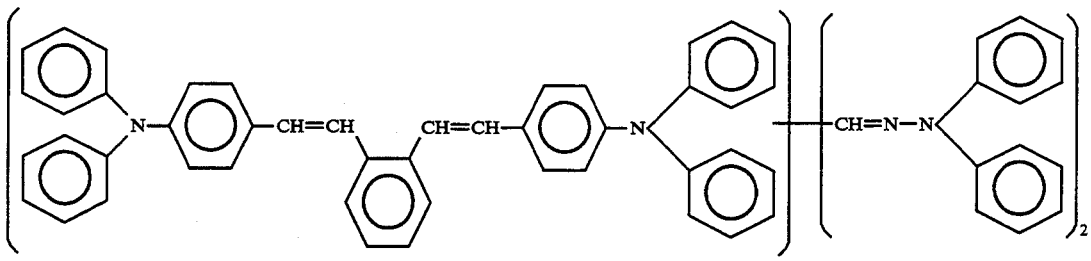

Example 21

1.0 part of titanium oxyphthalocyanine pigment and 0.5 part of polyvinylbutyral (polyvinylbutyral #6000, tradename, manufactured by Denki Kagaku Kogyo K.K.) were dispersed and pulverized in 30 parts of 4-methoxy-4-methylpentanone-2 (manufactured by Mitsubishi Kasei Corporation).

This dispersed liquid was coated by means of a wire bar on an aluminum layer vapor-deposited on a polyester film having a film thickness of 100 μm, so that the weight after drying would be 0.2 g/m², followed by drying to form a carrier generation layer.

On this layer, a coating solution having 70 parts of the hydrazone compound prepared in Preparation Example 9 and 100 parts of a polycarbonate of the following formula dissolved in 900 parts of dioxane, was coated and dried to form a carrier transport layer having a film thickness of 17 μm.

With respect to the electrophotographic photoreceptor having a photosensitive layer comprising the two layers thus formed, the sensitivity i.e. the half value exposure was measured and found to be 1.9 $(\mu W/cm^2)^{-1}$.

The half value exposure was measured in such manner that firstly the photoreceptor was charged by corona discharge at −4.8 kV in a dark place and then subjected to exposure with a light of 775 nm, whereby the exposure required for attenuation of the surface potential from 500 V to 200 V, was measured.

Example 22

A photoreceptor was prepared in the same manner as in Example 21 except that a naphthalic acid disazo pigment of the following formula was used instead of the phthalocyanine pigment used in Example 21. The photoreceptor was subjected to exposure with white light, and the half value exposure was measured and found to be 1.5 lux.sec.

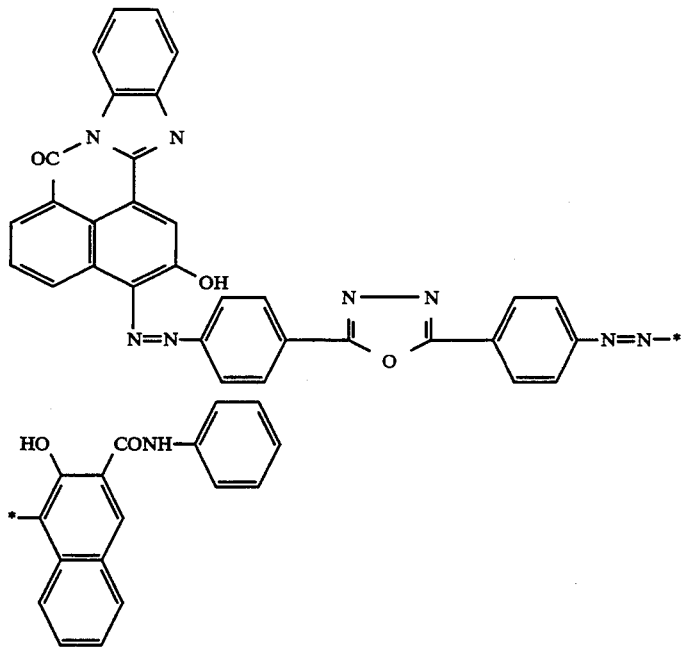

Examples 23 To 32

The sensitivity of the electrophotographic photoreceptor obtained by using the hydrazone compound prepared in Preparation Example 8 or the hydrazone compound as identified in the following Table 4 prepared in the same manner as in Preparation Example 8 or 9, instead of the hydrazone compound used in Example 21, and by using the same titanium oxyphthalocyanine pigment as used in Example 21 for the carrier generation layer, is shown in Table 4.

TABLE 4

| Example No. | Compound No. | Sensitivity $(\mu W/cm^2)^{-1}$ |
|---|---|---|
| 23 | 3-1 | 0.5 |
| 24 | 3-5 | 1.2 |
| 25 | 3-6 | 1.0 |
| 26 | 3-11 | 0.8 |
| 27 | 3-13 | 0.9 |
| 28 | 3-16 | 0.9 |
| 29 | 3-21 | 1.7 |
| 30 | 3-26 | 1.5 |
| 31 | 3-28 | 1.6 |
| 32 | 3-30 | 1.9 |

We claim:

1. An electrophotographic photoreceptor comprising an electrically conductive substrate and a photosensitive layer formed thereon, wherein said photosensitive layer contains at least one member selected from the group consisting of compounds of the following formulas (I), (II) and (III):

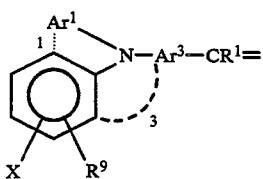

(I)

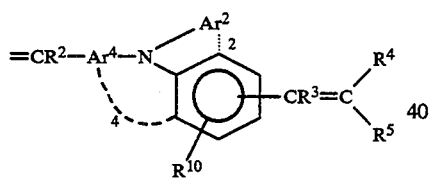

wherein X is a hydrogen atom or a group of $-CR^6=C(R^7)R^8$; each of $Ar^1$ and $Ar^2$ which may be the same or different, is an alkyl group which may have substituents, an aryl group which may have substituents, or a heterocyclic group which may have substituents; each of $Ar^3$ and $Ar^4$ which may be the same or different, is an arylene group which may have substituents, or a bivalent heterocyclic group which may have substituents; each of $R^1$, $R^2$, $R^3$, $R^4$, $R^5$, $R^6$, $R^7$ and $R^8$ which may be the same or different, is a hydrogen atom, an alkyl group which may have substituents, an aryl group which may have substituents, or a heterocyclic group which may have substituents (provided that when either one of $R^4$ and $R^5$ is a hydrogen atom or an alkyl group, the other is an aryl group or a heterocyclic group, and also that when either one of $R^7$ and $R^8$ is a hydrogen atom or an alkyl group, the other is an aryl group or a heterocyclic group); each of $R^9$ and $R^{10}$ which may be the same or different, is a hydrogen atom, a halogen atom, an alkyl group which may have substituents, an alkoxy group which may have substituents, or a substituted amino group; dotted line 1 indicates that $Ar^1$ may bond as shown by the dotted line to the aromatic group bonded to the nitrogen atom to form a structure of the formula (A-III) or (A-IV), dotted line 2 indicates that $Ar^2$ may bond as shown by the dotted line to the aromatic group bonded to the nitrogen atom to form a structure of the formula (A-V) or (A-VI), dotted line 3 indicates that $Ar^3$ may bond as shown by the dotted line to the aromatic group bonded to the nitrogen atom to form a structure of the formula (A-VII) or (A-VIII), and dotted line 4 indicates that $Ar^4$ may bond as shown by the dotted line to the aromatic group bonded to the nitrogen atom to form a structure of the formula (A-IX) or (A-X):

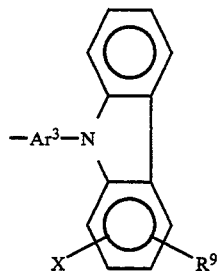

(A-III)

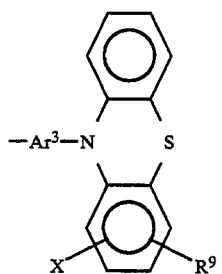

(A-IV)

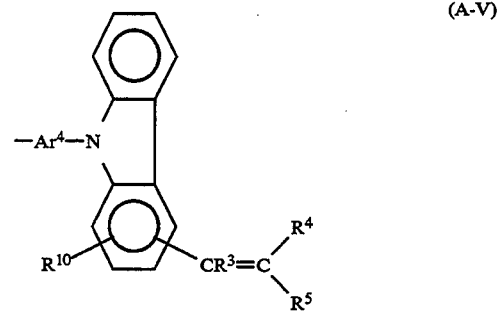

(A-V)

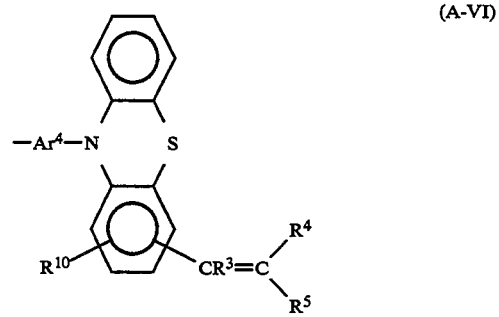

(A-VI)

(A-VII)

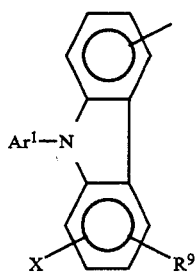

(A-VIII)

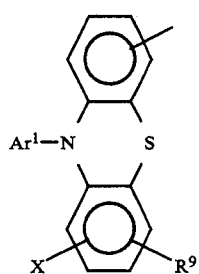

(A-IX)

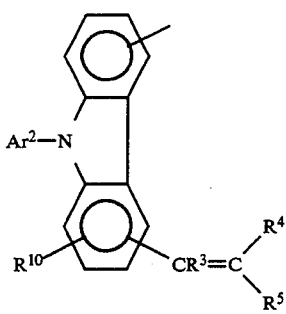

(A-X)

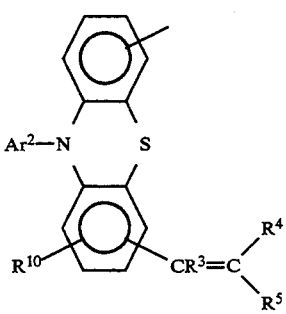

(II)

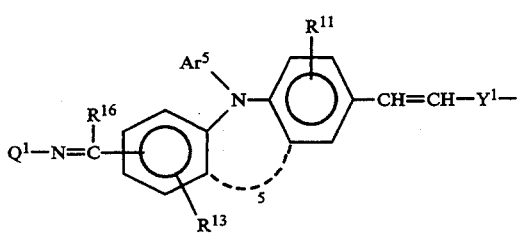

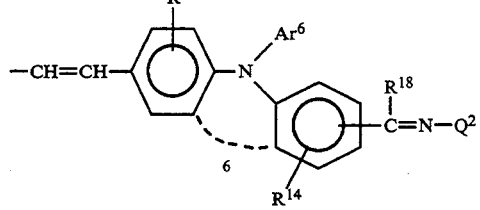

wherein $Q^1$ is any one of the groups of the following formulas (B-III), (B-VI) and (B-VII); $Q^2$ is any one of the groups of the following formula (B-VI), (B-VII) and (B-VIII):

(B-III)

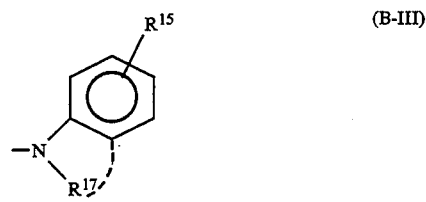

(B-VI)

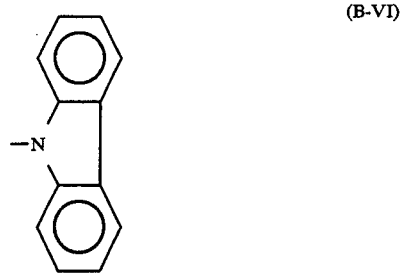

(B-VII)

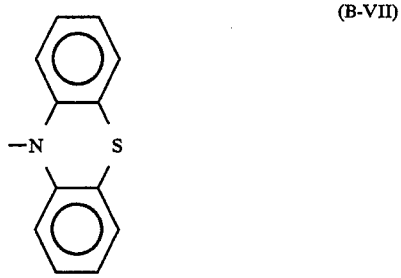

(B-VIII)

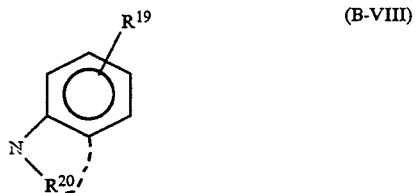

$Y^1$ is an aliphatic linking group which may have substituents, and the main chain of the linking group may contain an oxygen atom or a carbon-carbon double bond; each of $Ar^5$ and $Ar^6$ which may be the same or different, is an alkyl group which may have substituents, an aryl group which may have substituents or a heterocyclic group which may have substituents; each of $R^{11}$, $R^{12}$, $R^{13}$, $R^{14}$, $R^{15}$ and $R^{19}$ which may be the same or different, is a hydrogen atom, an alkyl group which may have substituents, a halogen atom, an alkoxy group which may have substituents, or a substituted amino group; each of $R^{16}$ and $R^{18}$ which may be the same or different, is a hydrogen atom, an alkyl group which may have substituents, an aryl group which may have substituents, or a heterocyclic group which may have substituents; each of $R^{17}$ and $R^{20}$ which may be the same or different, is an aryl group which may have substituents, a heterocyclic group which may have substituents, or an alkyl group which may have substituents (when $R^{17}$ or $R^{20}$ is an alkyl group, $R^{17}$ or $R^{20}$ may be bonded to a benzene ring as indicated by the dotted line); dotted line 5 indicates that the two phenyl groups bonded to the same nitrogen atom may bond as shown by the dotted line to form a structure of the following formula (B-IX) or (B-XI), and dotted line 6 indicates that the two phenyl groups bonded to the same nitrogen atom may bond as shown by the dotted line to form a structure of the following formula (B-X) or (B-XII):

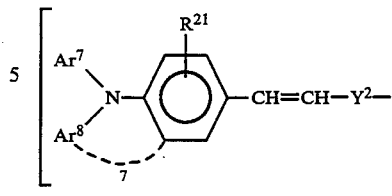
(III)

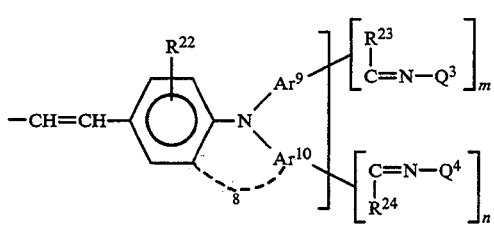

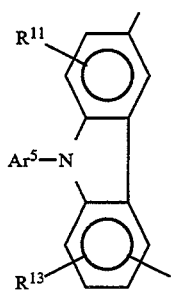
(B-IX)

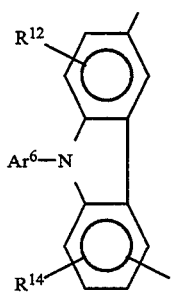
(B-X)

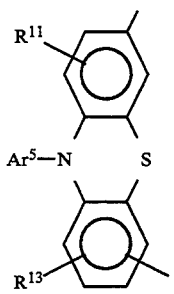
(B-XI)

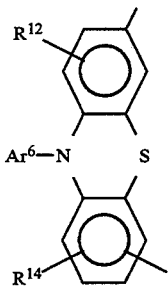
(B-XII)

wherein $Q^3$ is any one of the groups of the following formulas (C-II), (C-V) and (C-VI); $Q^4$ is any one of the groups of the following formulas (C-V), (C-VI) and (C-VII):

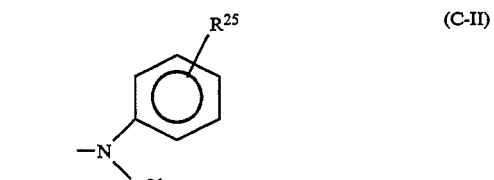
(C-II)

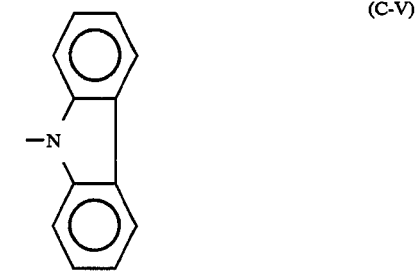
(C-V)

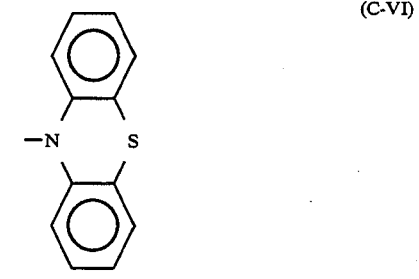
(C-VI)

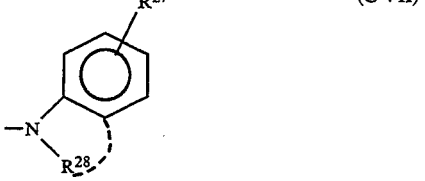
(C-VII)

$Y^2$ is an arylene group which may have substituents, or a bivalent heterocyclic group which may have substituents; each of $Ar^7$, $Ar^9$, $R^{26}$ and $R^{28}$ which may be the same or different, is an alkyl group which may have substituents, an aryl group which may have substituents or a heterocyclic group which may have substituents; each of $Ar^8$ and $Ar^{10}$ which may be the same or different, is an aryl group which may have substituents, or a heterocyclic group which may have substituents; each of $R^{21}$, $R^{22}$, $R^{25}$ and $R^{27}$ which may be the same or different, is a hydrogen atom, a halogen atom, an alkyl group which may have substituents, an alkoxy group which may have substituents, or a substituted amino group; each of $R^{23}$ and $R^{24}$ which may be the same or different, is a hydrogen atom, an alkyl group which may have substituents, an aryl group which may have substituents, or a heterocyclic group which may have substituents (when $R^{26}$ or $R^{28}$ is an alkyl group, $R^{26}$ or $R^{28}$ may be bonded to a benzene ring as indicated by the dotted line); dotted line 7 indicates that $Ar^8$ may bond to the benzene ring to which $R^{21}$ is bonded, as shown by the dotted line to form a structure of the following formula (C-VIII) or (C-IX), and dotted line 8 indicates that $Ar^{10}$ may bond to the benzene ring to which $R^{22}$ is bonded, as shown by the dotted line to form a structure of the following formula (C-X) or (C-XI):

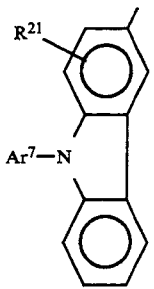
(C-VIII)

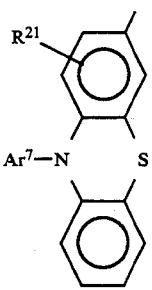
(C-IX)

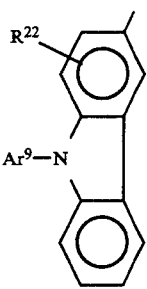
(C-X)

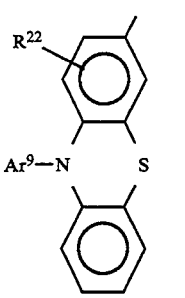
(C-XI)

and each of m and n is an integer of 0 or 1 and $m+n \geq 1$.

2. The electrophotographic photoreceptor according to claim 1, wherein the photosensitive layer contains a compound of the above formula (I).

3. The electrophotographic photoreceptor according to claim 2, wherein in the compound of the formula (I), each of $Ar^1$ and $Ar^2$ is a phenyl group which may have substituents and each of $Ar^3$ and $Ar^4$ is a phenylene or naphthylene group which may have substituents.

4. The electrophotographic photoreceptor according to claim 1, wherein the photosensitive layer comprises a carrier generation layer and a carrier transport layer containing at least one member selected from the group consisting of compounds of the above formulas (I), (II) and (III).

5. The electrophotographic photoreceptor according to claim 4, wherein the carrier transport layer comprises at least one member selected from the group consisting of compounds of the above formulas (I), (II) and (III) and a binder.

6. The electrophotographic photoreceptor according to claim 1, wherein the photosensitive layer comprises photoconductive particles capable of generating electric charge carriers and at least one member selected from the group consisting of compounds of the above formulas (I), (II) and (III), incorporated in a binder.

7. An electrophotographic photoreceptor comprising an electrically conductive substrate and a photosensitive layer formed thereon, wherein said photosensitive layer contains a compound of the formula (II):

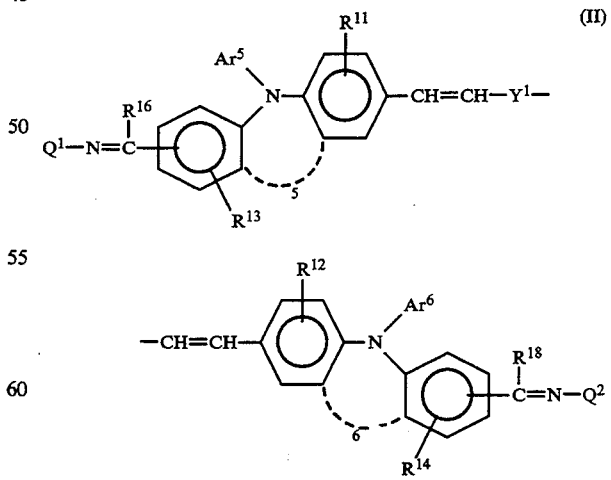
(II)

wherein $Q^1$ is any one of the groups of the following formulas (B-III), (B-VI) and (B-VII); $Q^2$ is any one of the groups of the following formulas (B-VI), (B-VII) and (B-VIII):

(B-III)

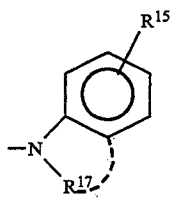

(B-VI)

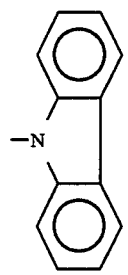

(B-VII)

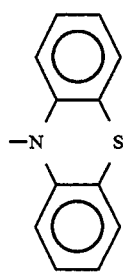

-continued (B-VIII)

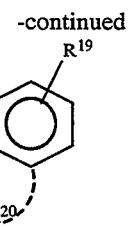

$Y^1$ is an aliphatic linking group which may have substituents, and the main chain of the linking group may contain an oxygen atom or a carbon-carbon double bond; each of $Ar^5$ and $Ar^6$ which may be the same or different, is an alkyl group which may have substituents, an aryl group which may have substituents or a heterocyclic group which may have substituents; each of $R^{11}$, $R^{12}$, $R^{13}$, $R^{14}$, $R^{15}$ and $R^{19}$ which may be the same or different, is a hydrogen atom, an alkyl group which may have substituents, a halogen atom, an alkoxy group which may have substituents, or a substituted amino group; each of $R^{16}$ and $R^{18}$ which may be the same or different, is a hydrogen atom, an alkyl group which may have substituents, an aryl group which may have substituents, or a heterocyclic group which may have substituents; each of $R^{17}$ and $R^{20}$ which may be the same or different, is an aryl group which may have substituents, a heterocyclic group which may have substituents, or an alkyl group which may have substituents (when $R^{17}$ or $R^{20}$ is an alkyl group, $R^{17}$ or $R^{20}$ may be bonded to a benzene ring as indicated by the dotted line); dotted line 5 indicates that the two phenyl groups bonded to the same nitrogen atom may bond as shown by the dotted line to form a structure of the following formula (B-IX) or (B-XI), and dotted line 6 indicates that the two phenyl groups bonded to the same nitrogen atom may bond as shown by the dotted line to form a structure of the following formula (B-X) or (B-XII):

(B-IX)

(B-X)

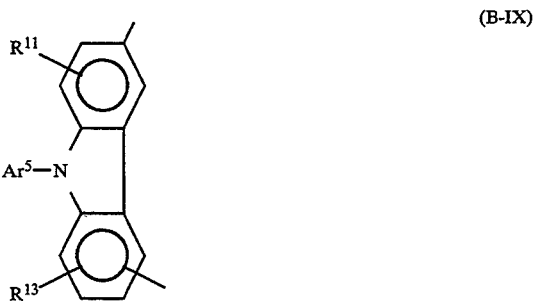

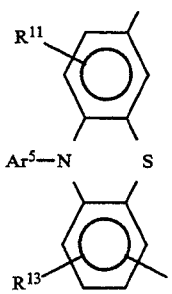
(B-XI)

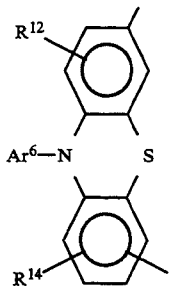
(B-XII)

8. The electrophotographic photoreceptor according to claim 7, wherein in the compound of the formula (II), each of $Ar^5$ and $Ar^6$ is a phenyl group which may have substituents.

9. An electrophotographic photoreceptor comprising an electrically conductive substrate and a photosensitive layer formed thereon, wherein said photosensitive layer contains a compound of the formula (III):

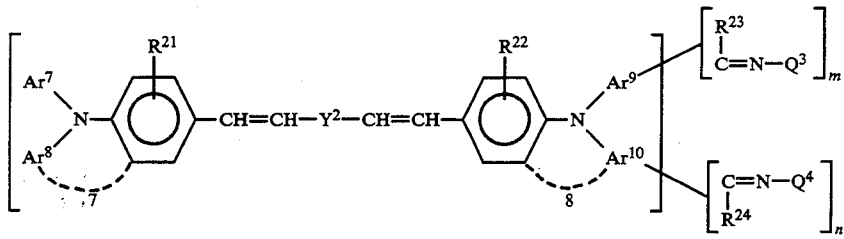
(III)

wherein $Q^3$ is any one of the groups of the following formulas (C-II), (C-V) and (C-VI); $Q^4$ is any one of the groups of the following formulas (C-V), (C-VI) and (C-VII):

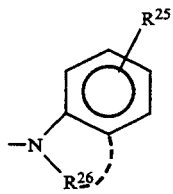
(C-II)

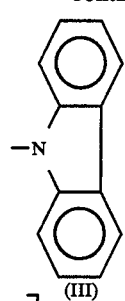
(C-V)

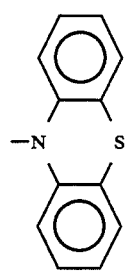
(C-VI)

-continued

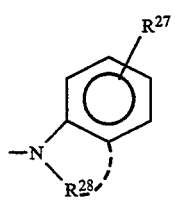 (C-VII)

Y² is an arylene group which may have substituents, or a bivalent heterocyclic group which may have substituents; each of Ar⁷, Ar⁹, R²⁶, and R²⁸ which may be the same or different, is an alkyl group which may have substituents, an aryl group which may have substituents or a heterocyclic group which may have substituents; each of Ar⁸ and Ar¹⁰ which may be the same or different, is an aryl group which may have substituents, or a heterocyclic group which may have substituents; each of R²¹, R²², R²⁵ and R²⁷ which may be the same or different, is a hydrogen atom, a halogen atom, an alkyl group which may have substituents, an alkoxy group which may have substituents, or a substituted amino group; each of R²³ and R²⁴ which may be the same or different, is a hydrogen atom, an alkyl group which may have substituents, an aryl group which may have substituents, or a heterocyclic group which may have substituents (when R²⁶ or R²⁸ is an alkyl group, R²⁶ or R²⁸ may be bonded to a benzene ring as indicated by the dotted line); dotted line 7 indicates that Ar⁸ may bond to the benzene ring to which R²¹ is bonded, as shown by the dotted line to form a structure of the following formula (C-VIII) or (C-IX), and dotted line 8 indicates that Ar¹⁰ may bond to the benzene ring to which R²² is bonded, as shown by the dotted line to form a structure of the following formula (C-X) or (C-XI):

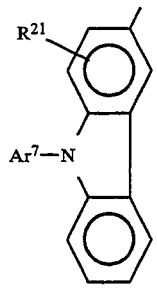 (C-VIII)

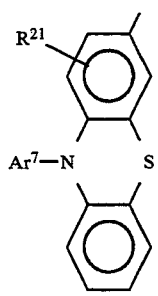 (C-IX)

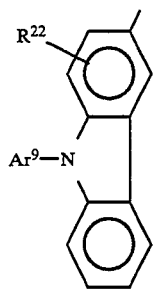 (C-X)

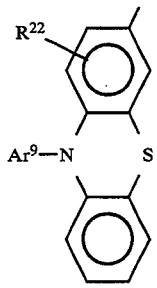 (C-XI)

and each of m and n is an integer of 0 or 1 and m+n≧1.

10. The electrophotographic photoreceptor according to claim 9, wherein in the compound of the formula (III), each of Ar⁷, Ar⁸, Ar⁹ and Ar¹⁰ is a phenyl group which may have substituents.

* * * * *